United States Patent
Watanabe et al.

(10) Patent No.: US 7,417,684 B2
(45) Date of Patent: Aug. 26, 2008

(54) ELECTRONIC IMAGE PICKUP SYSTEM

(75) Inventors: Masahito Watanabe, Hachioji (JP);
Toru Miyajima, Hachioji (JP); Shinichi Mihara, Tama (JP); Yuji Miyauchi, Machida (JP); Toshihide Nozawa, Hachioji (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 88 days.

(21) Appl. No.: 11/503,120

(22) Filed: Aug. 14, 2006

(65) Prior Publication Data
US 2006/0274168 A1 Dec. 7, 2006

Related U.S. Application Data

(62) Division of application No. 10/114,302, filed on Apr. 3, 2002, now Pat. No. 7,212,242.

(30) Foreign Application Priority Data

Apr. 4, 2001 (JP) .............................. 2001-105386
Mar. 5, 2002 (JP) .............................. 2002-058518

(51) Int. Cl.
*H04N 5/238* (2006.01)
(52) U.S. Cl. ............... 348/363; 348/240.99; 348/240.3; 348/335; 348/342; 348/360; 359/676; 359/691; 359/692; 359/739; 359/740; 396/451
(58) Field of Classification Search ........... 348/240.99, 348/240.3, 335, 342, 360, 362, 363; 359/646, 359/676, 691, 692, 722, 723, 738, 739, 740, 359/745, 748, 793, 795, 885, 888, 889; 396/355, 396/357, 451, 462
See application file for complete search history.

(56) References Cited

U.S. PATENT DOCUMENTS

| | | | | | |
|---|---|---|---|---|---|
| 4,196,967 | A | * | 4/1980 | Ohnishi et al. | 359/399 |
| 4,249,798 | A | * | 2/1981 | Moskovich | 359/683 |
| 4,331,389 | A | | 5/1982 | Ogawa et al. | 359/687 |
| 5,046,833 | A | | 9/1991 | Tsuchida | |
| 5,068,679 | A | * | 11/1991 | Kikuchi | 396/506 |

(Continued)

FOREIGN PATENT DOCUMENTS

JP  06-273670  9/1994

(Continued)

*Primary Examiner*—Tuan Ho
*Assistant Examiner*—Chriss S Yoder, III
(74) *Attorney, Agent, or Firm*—Kenyon & Kenyon LLP

(57) ABSTRACT

The invention makes a suitable selection from zoom modes and lens elements so thin that the thickness of each lens group can reduced, thereby slimming down a zoom lens with great thoroughness and, hence, an electronic image pickup system. The electronic image pickup system a zoom lens and an electronic image pickup device located on the image plane side of the zoom lens. The zoom lens comprises, in order from the object side, a first lens group G1 comprising two lens components and having generally negative power and a second lens group G2 comprising two lens components and having generally positive power. The focal length of the zoom lens can be varied by varying the air separation between the first lens group G1 and the second lens group G2. The zoom lens should satisfy at least one of conditions (a) to (n).

11 Claims, 34 Drawing Sheets

U.S. PATENT DOCUMENTS

| | | | |
|---|---|---|---|
| 5,083,149 A * | 1/1992 | Kudo et al. | 396/80 |
| 5,087,988 A * | 2/1992 | Nakayama | 359/689 |
| 5,283,693 A | 2/1994 | Kohno et al. | |
| 5,534,696 A * | 7/1996 | Johansson et al. | 250/330 |
| 5,541,779 A * | 7/1996 | Choi | 359/885 |
| 5,557,470 A | 9/1996 | Shibayama | 359/687 |
| 5,646,788 A * | 7/1997 | Bietry | 359/740 |
| 5,764,425 A * | 6/1998 | Ohshita | 359/748 |
| 5,982,423 A * | 11/1999 | Sekiguchi | 348/216.1 |
| 6,025,961 A | 2/2000 | Kohno et al. | |
| 6,081,389 A | 6/2000 | Takayama et al. | |
| 6,086,267 A * | 7/2000 | Tsuzuki et al. | 396/459 |
| 6,124,984 A | 9/2000 | Shibayama et al. | 359/689 |
| 6,124,987 A | 9/2000 | Kayanuma et al. | 359/692 |
| 6,154,322 A * | 11/2000 | Nakayama | 359/691 |
| 6,297,915 B1 * | 10/2001 | Kaneko et al. | 359/718 |
| 6,308,011 B1 | 10/2001 | Wachi et al. | 396/72 |
| 6,331,917 B1 | 12/2001 | Ishii et al. | 359/687 |
| 6,341,901 B1 * | 1/2002 | Iwasa et al. | 396/355 |
| 6,377,404 B1 * | 4/2002 | Goosey, Jr. | 359/682 |
| 6,449,105 B1 * | 9/2002 | Dou | 359/793 |
| 6,536,960 B2 * | 3/2003 | Kubo et al. | 396/355 |
| 6,560,040 B2 * | 5/2003 | Kaneko et al. | 359/739 |
| 6,741,760 B2 * | 5/2004 | Hayashi et al. | 382/321 |
| 6,833,864 B1 * | 12/2004 | Ashida | 348/229.1 |
| 6,862,408 B2 | 3/2005 | Watanabe | 396/72 |
| 2002/0015238 A1 * | 2/2002 | Koike | 359/794 |
| 2002/0021511 A1 * | 2/2002 | Lee et al. | 359/888 |
| 2002/0141076 A1 * | 10/2002 | Lee | 359/738 |
| 2004/0080655 A1 | 4/2004 | Watanabe et al. | 348/335 |
| 2005/0083587 A1 * | 4/2005 | Ueyama | 359/738 |

FOREIGN PATENT DOCUMENTS

| | | |
|---|---|---|
| JP | 09-033810 | 2/1997 |
| JP | 11-194274 | 7/1999 |

* cited by examiner

C: Cyan   M: Magent
Ye: Yellow   G: Green

FIG. 41(a)
FIG. 41(b)
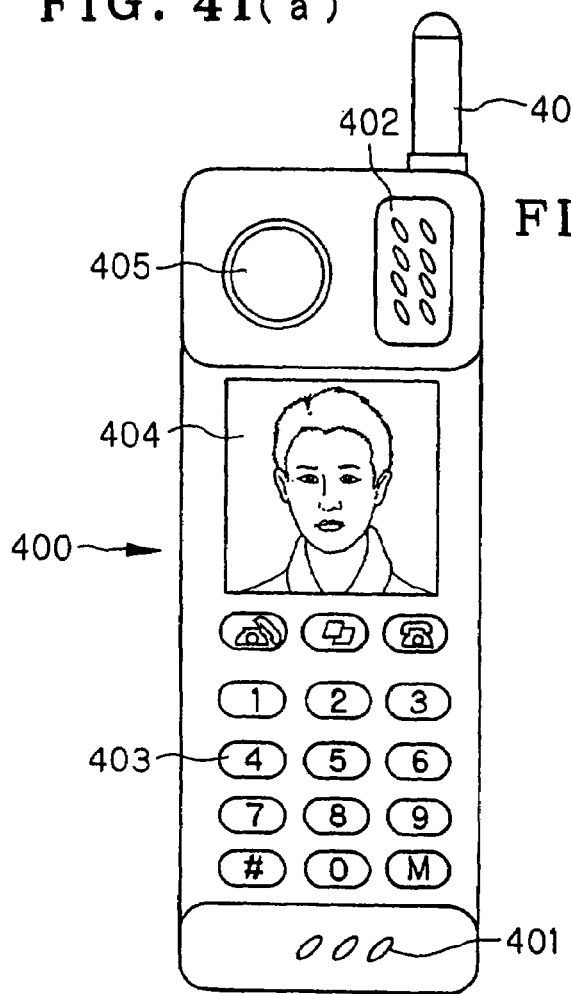
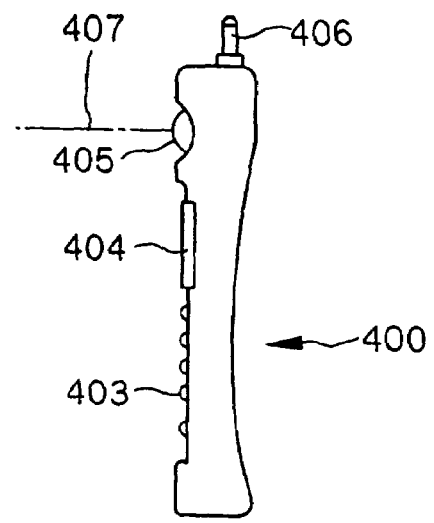
FIG. 41(c)
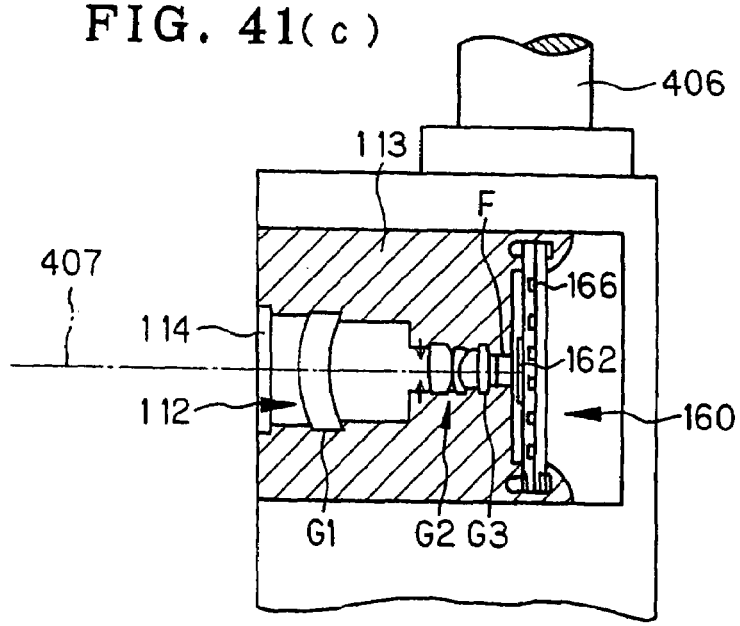

ELECTRONIC IMAGE PICKUP SYSTEM

This application is a division of application Ser. No. 10/114,302 filed 03 Apr. 2002 now U.S. Pat. No. 7,212,242, which claims priority to Japanese Patent Application No. 2001-105,386 filed in Japan on 04 Apr. 2001 and No. 2002-058,518 filed in Japan on 05 Mar. 2002, the contents of which are incorporated herein by reference.

BACKGROUND OF THE INVENTION

The present invention relates generally to an electronic image pickup system, particularly to an image pickup system comprising a zoom lens and an image pickup device such as a CCD, and more particularly to a digital camera capable of obtaining electronic images. The present invention is also directed to a video camera or digital camera, the depth dimension of which is reduced by contriving an optical system portion thereof, e.g., a zoom lens. A part of the zoom lens is designed to operate in a rear-focusing mode.

In recent years, digital cameras (electronic cameras) have received attention as cameras of the next generation, an alternative to silver-salt 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while ensuring high image quality.

The gravest bottleneck in making the depth dimension of cameras thin is the thickness of an optical system, especially a zoom lens from the surface located nearest to its object side to an image pickup plane. To make use of a collapsible lens mount that allows the optical system to be taken out of a camera body for phototaking and received therein for carrying now becomes mainstream.

However, the thickness of an optical system received in a collapsible lens mount varies largely with the lens type or filter used. Especially in the case of a so-called+precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507).

A-precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are composed of an increased number of lens elements, and the thickness of lens elements is large.

Among zoom lenses known so far in the art, those set forth typically in JP-A's 11-194274, 11-287953 and 2000-9997 are suitable for use with electronic image pickup systems with improved image-formation capabilities including zoom ratios, field angles and F-numbers, and may possibly be reduced in thickness upon received in collapsible lens mounts.

To make the first lens group thin, it is preferable to make the entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction. To obtain a camera body whose depth dimension is reduced, a rear focusing mode wherein the rear lens group is moved for focusing is effective in view of the layout of a driving system. It is then required to single out an optical system less susceptible to aberration fluctuations upon rear focusing.

Referring here to a conventional image pickup system using a zoom lens and an electronic image pickup device, a so-called variable stop with variable aperture diameters has been used primarily for adjusting the quantity of light passing through the zoom lens.

With a view to image quality improvements, on the other hand, image pickup devices of today are required to have ever higher pixel densities. The more the pixels of an image pickup device, the hither the optical performance demanded for an optical system becomes.

A problem with use of a conventional variable stop is, however, that when it is intended to decrease the diameter of the stop thereby adjusting the quantity of light, resolution drops under the influence of diffraction. In other words, it is still difficult to reconcile light quantity adjustment with high image quality. Even when it is intended to shorten the overall length of the zoom lens, the thickness of mechanical construction for the variable stop often puts limitation on the reduction in the whole length of the zoom lens.

SUMMARY OF THE INVENTION

In view of such problems as referred to above, one object of the invention is to slim down an electronic image pickup system by singling out a zoom mode or zoom construction wherein a reduced number of lens elements are used to reduce the size of a zoom lens and simplify the layout thereof and stable image-formation capabilities are kept over an infinite-to-nearby range, and optionally making lens elements thin thereby shortening the total thickness of each lens group and slimming down a zoom lens thoroughly by selection of filters.

Another object of the invention is to provide an electronic image pickup system that can control the quantity of light while the influences of diffraction are suppressed to maintain the quantity of light, and enables the overall length of a zoom lens to be made short.

The aforesaid objects are achievable by the provision of an electronic image pickup system characterized by comprising a zoom lens comprising, in order from an object side thereof, a first lens group consisting of two lenses and having generally negative power and a second lens group consisting of two lenses and having generally positive power so that an air separation between said first lens group and said second lens group is varied to vary the focal lengths of all the lens groups and satisfying at least one of the following conditions (a) to (n), and an electronic image pickup device located on an image plane side of said zoom lens:

$$7 < d_{NP} \cdot A < 27 \tag{a}$$

$$20 < t_1 \cdot A < 50 \tag{b}$$

$$20 < D_2 \cdot A < 45 \tag{c}$$

$$30<(t_1+D_2)\cdot A<90 \tag{d}$$

$$30<-f_{11}\cdot A<70 \tag{e}$$

$$90<f_{12}\cdot A<250 \tag{f}$$

$$20<f_{21}\cdot A<42 \tag{g}$$

$$0.6<\Phi_{21}/\Phi_W<1.05 \tag{h}$$

$$19.5<R_{21}\cdot A<45 \tag{i}$$

$$40<-f_{22}\cdot A<140 \tag{j}$$

$$0.33<-\Phi_{22}/\Phi_W<0.80 \tag{k}$$

$$-1<(R_{21}+R_{22})/(R_{21}-R_{22})<0 \tag{l}$$

$$0.25<(R_{23}+R_{24})/(R_{23}-R_{24})<3.4 \tag{m}$$

$$72<\nu_{d21}<100 \tag{n}$$

Here A is equal to 43.2/L wherein L is the diagonal length of an effective image pickup area of the electronic image pickup device, $t_1$ is the total axial thickness of the first lens group, $D_2$ is the total axial thickness of the second lens group, $f_{11}$ is the focal length of an object-side lens in the first lens group, $f_{12}$ is the focal length of an image-side lens in the first lens group, $f_{21}$ is the focal length of an object-side lens in the second lens group, $f_{22}$ is the focal length of an image-side lens in the second lens group, $\Phi_{21}$ is the refracting power of the object-side lens in the second lens group, $\Phi_{22}$ is the refracting power of the image-side lens in the second lens group, $\Phi_W$ is the refracting power of the zoom lens at a wide-angle end thereof, $R_{21}$, $R_{22}$, $R_{23}$ and $R_{24}$ are the radii of curvature of refracting surfaces forming the second lens group as viewed in order from the object side of the zoom lens, and $\nu_{d21}$ is the Abbe's number of a medium of the object-side positive lens in the second lens group.

According to another aspect of the invention, there is provided an electronic image pickup system characterized by comprising a zoom lens comprising a first lens group consisting of a negative lens and a positive lens in order from an object side thereof and having generally negative power and a second lens group consisting of an aperture stop, a positive lens and a negative lens in order from an object side thereof and having generally positive power so that upon zooming from a wide-angle end to a telephoto end of said zoom lens, a spacing between said first lens group and said second lens group becomes narrow, with said first lens group including an aspheric surface and said second lens group having an aspheric surface at a surface nearest to the object side, and satisfying the following conditions (1) and (2), and an electronic image pickup device located on an image plane side of said zoom lens:

$$0.6<(R_{23}+R_{24})/(R_{23}-R_{24})<3.0 \tag{1}$$

$$0.08<t_{2N}/D_2<0.28 \tag{2}$$

Here $R_{23}$ is the paraxial radius of curvature of an object-side surface of the negative lens in the second lens group, $R_{24}$ is the paraxial radius of curvature of an image plane-side surface of the negative lens in the second lens group, $D_2$ is the axial thickness of the second lens group from an object-side surface of the positive lens therein to an image plane-side surface of the negative lens therein, and $t_{2N}$ is the axial distance from an image-side surface of the positive lens in the second lens group to an image-side surface of the second lens group.

According to yet another aspect of the invention, there is provided an electronic image pickup system characterized by comprising a zoom lens comprising a first lens group having generally negative power, wherein, in order from an object side of said zoom lens, a negative lens is located nearest to an object side thereof and a positive lens is located nearest to an image side thereof, a second lens group consisting of, in order from an object side thereof, an aperture stop, a positive lens and a negative lens and having generally positive power and a third lens group consisting of one positive lens, so that upon zooming from a wide-angle end to a telephoto end thereof, a spacing between said first lens group and said second lens group becomes narrow and a spacing between said second lens group and said third lens group becomes wide, with said first lens group including an aspheric surface, said second lens group including an aspheric surface located nearest to the object side thereof, and said negative lens in said second lens group being configured in such a way as to satisfy the following condition (1), and an electronic image pickup device located on an image plane-side of said zoom lens:

$$0.6<(R_{23}+R_{24})/(R_{23}-R_{24})<3.0 \tag{1}$$

Here $R_{23}$ is the paraxial radius of curvature of an object-side surface of the negative lens in the second lens group, and $R_{24}$ is the paraxial radius of curvature of an image plane-side surface of the negative lens in the second lens group.

According to a further aspect of the invention, there is provided an electronic image pickup system characterized by comprising a zoom lens comprising a first lens group having generally negative power, wherein, in order from an object side of said zoom lens, a negative lens element is located nearest to an object side thereof and a positive lens element is located nearest to an image side thereof, a second lens group consisting of, in order from an object side thereof, an aperture stop, a positive lens and a negative lens and having generally positive power and a third lens group consisting of one positive lens, so that upon zooming from a wide-angle end to a telephoto end thereof, a spacing between said first lens group and said second lens group becomes narrow and a spacing between said second lens group and said third lens group becomes wide, with said first lens group including an aspheric surface, and said second lens group including an aspheric surface located nearest to the object side thereof and satisfying the following condition (2), and an electronic image pickup device located on an image plane-side of said zoom lens:

$$0.08<t_{2N}/D_2<0.28 \tag{2}$$

Here $D_2$ is the axial thickness of the second lens group from an object-side surface of the positive lens therein to an image-side surface of the negative lens therein, and $t_{2N}$ is the axial distance from an image-side of the positive lens element in the second lens group to an image-side surface of the second lens group.

According to a further aspect of the invention, there is provided an electronic image pickup system characterized by comprising a first lens group consisting of, in order from an object side thereof, a negative lens and a positive lens, too lenses in all or a negative lens, a negative lens and a positive lens, three lenses in all, and having generally negative power and a second lens group consisting of, in order from an object side thereof, an aperture stop, a positive lens and a negative lens and having generally positive power, so that upon zooming from a wide-angle end to a telephoto end thereof, a spacing between said first lens group and second lens group becomes narrow, with said first lens group including an aspheric surface and said second lens group including an aspheric surface located nearest to the object side thereof and satisfying the following conditions (1) and (2), and an electronic image pickup device located on an image plane-side of said zoom lens.

$$0.6 < (R_{23}+R_{24})/(R_{23}-R_{24}) < 3.0 \quad (1)$$

$$0.08 < t_{2N}/D_2 < 0.28 \quad (2)$$

Here $R_{23}$ is the paraxial radius of curvature of the object-side surface of the negative lens in the second lens group, $R_{24}$ is the paraxial radius of curvature of the image plane-side surface of the negative lens in the second lens group, $D_2$ is the axial thickness of the second lens group from the object-side surface of the positive lens therein to the image-side surface of the negative lens therein, and $t_{2N}$ is the axial distance from the image-side of the positive lens in the second lens group to the image-side surface of the second lens group.

Reference is now made to why the aforesaid embodiments are used herein and how they work.

The electronic image pickup system according to the present invention comprises a zoom lens comprising, in order from the object side thereof, a first lens group consisting of two lenses and having generally negative power and a second lens group consisting of two lenses and having generally positive power, wherein the focal length of all the lens groups can be varied by varying the air separation between the first lens group and the second lens group, and an electronic image pickup device located on the image plane side of the zoom lens.

That zoom lens should then satisfy at least one of the aforesaid conditions (a) to (n).

For the purpose of shortening the length of the zoom lens upon received in a collapsible lens mount, it is effective to narrow the spacing between the two lens elements in the first lens group. However, when the lower limit of 7 to condition (a) is not reached, any effective ray-transmitting portion of the air lens defined by the two lens elements does not physically hold. When the upper limit of 27 is exceeded, the length of the zoom lens upon received in the lens mount becomes long and so there is not much point in reducing the number of lenses to the limit.

It is here noted that the capital letter "A" in condition (a) is the ratio of the effective image pickup area of the electronic image pickup device with respect to the diagonal length of 43.2 mm on one frame of a silver salt 35-mm film, indicating an image plane size conversion coefficient.

From another point of view, it is effective to make the total thickness of the first lens group thin. At less than the lower limit of 20 to condition (b) regarding the total axial thickness of the first lens, any effective ray-transmitting portion of an air lens defined by the edge or center thickness of lenses or two lenses does not physically hold. If this is not the case, distortions and comae remain undercorrected. At greater than 50, an added thickness does not only make the length of the zoom lens long upon received in the lens mount but also renders the position of the entrance pupil deep and the lens diameter larger. There is thus not much point in reducing the number of lenses to the limit.

Alternatively, the same effect is also obtained when the whole thickness of the second lens group is reduced. In this case, too, falling below the lower limit of 20 to condition (c) does not allow the edge or central thickness of lenses to hold physically. Exceeding the upper limit of 45 makes the length of the zoom lens long upon received in the lens mount; there is not much point in reduced the number of lenses to the limit.

From yet another point of view, the sum of the total axial thickness of the first and second lens groups should preferably satisfy condition (d). Any deviation from the lower limit of 30 and the upper limit of 90 to this condition offers such problems as appreciated from the foregoing.

In addition to reducing the thickness of lens elements or lens groups, there is another approach to making the length of the zoom lens short upon received in the lens mount. According to this approach, the focal length of the first lens group is reduced to near the geometric mean of the focal length of the zoom lens at its wide-angle end and the focal length of the zoom lens at its telephoto end. It is thus possible to make the spacing between the first lens group and the second lens group short all over the zooming zone. This in turn can reduce the length of a lens barrel and the diameter and thickness of the first lens group, so that the length of the zoom lens can be easily shortened upon received in the lens mount. It follows that exceeding the upper limit of 70 to condition (e) for the negative lens in the first lens group is unfavorable to reduce the length of the zoom lens upon received in the lens mount because the diameter of the first lens group becomes large, etc., and falling short of the lower limit of 30 makes distortions, comae, field curvatures, chromatic aberrations or the like likely to occur.

On the other hand, the positive lens in the first lens group is inevitable for correction of chromatic aberrations. When the upper limit of 250 to condition (f) is exceeded, chromatic aberrations cannot be corrected, and falling below the lower limit of 90 is not preferred because the power of the first lens group is canceled out. It is here noted that where small field angles are used with low zoom ratios, correction of chromatic aberrations is feasible even when the positive lens in the first lens group has no power, and so this condition does not matter to cases where the zoom ratio is 2.5 or lower and the field angle at the wide-angle end is 66° or smaller.

The focal length of the second lens group, too, should preferably be reduced as much as possible. This is because the total amount of movement of the second lens group from the wide-angle end to the telephoto end during zooming can be so reduced that the lens barrel can be shortened and the length of the zoom lens upon received in the lens mount can be shortened accordingly. It follows that exceeding the upper limit of 42 to condition (g) is unfavorable for shortening the length of the zoom lens upon received in the lens mount because, in use, the total lens length becomes long, and falling short of the lower limit of 20 makes spherical aberrations, comae, chromatic aberrations or the like likely to occur.

It is understood that condition (g) is applied to cases where the zoom ratio is 2.5 or lower, and with a zoom ratio of 2.5 or higher, it is preferable to use condition (h) that gives a definition of the ratio of the power of the positive lens in the second lens group to the focal length of the zoom lens at the wide-angle end. Falling below the lower limit of 0.6 to this condition is unfavorable for shortening the length of the zoom lens upon received in the lens mount because, in use, the total lens length becomes long, and exceeding the lower limit of 1.05 makes spherical aberrations, comae, chromatic aberrations or the like likely to occur.

According to another approach, the object-side radius of curvature of the positive lens in the second lens group should preferably be reduced within the range defined by condition (i). Exceeding the upper limit of 45 to this condition is unfavorable for shortening the length of the zoom lens upon received in the lens mount because, in use, the total lens length becomes long, and falling short of the lower limit of 19.5 makes spherical aberrations, comae, chromatic aberrations or the like likely to occur.

On the other hand, the negative lens in the second lens group is inevitable for correction of chromatic aberrations. When the upper limit of 140 to condition (j) is exceeded, correction of chromatic aberrations is impossible, and falling below the lower limit of 40 is not preferred because the power of the second lens group is canceled out. It is noted that at a zoom ratio of 2.5 or lower, any deviation from condition (j) offers no problem; condition (j) does not matter.

Alternatively, it is acceptable to define the ratio of the power of the negative lens in the second lens group to the focal length of the zoom lens at the wide-angle end, as given by condition (k) as an example. Falling short of the lower limit of 0.33 to this condition makes it impossible to correct chromatic aberrations, and exceeding the upper limit of 0.80 is not preferred because the power of the second lens group is canceled out. It is here noted that where the zoom ratio is 2.5 or lower and the wide-angle end field angle is 66° or smaller, condition (k) does not matter.

To shorten the length of the zoom lens upon received in the lens mount, it is effective to reduce the thickness of each group or increase the power of each group. Generally in this case, however, correction of aberrations becomes difficult. Conversely, if correction of aberrations can be made by some means such as the introduction of aspheric surfaces, it is then possible to reduce the zoom lens length physically as much as possible. It is thus effective to put a definition on the shape of lens elements in the second lens group. As the upper limit of 0 to condition (1) that defines the shape of the positive lens in the second lens group is exceeded, the magnification tends to become low because the principal point of the second lens group becomes close to the image plane side. As the lower limit of −1 is not reached, comae tend to have a positive value with increased spherical aberrations. It is here noted that where the zoom ratio is 2.5 or lower, both spherical aberrations and comae can be well corrected even when there is any deviation from condition (1); this condition does not matter. As the upper limit of 3.4 to condition (m) that defines the shape of the negative lens in the second lens group is exceeded, it is impossible to keep the image plane flat, and as the lower limit of 0.25 is not reached, there is an increase in spherical aberrations due to higher-order components.

Regarding chromatic aberrations, too, correction of longitudinal chromatic aberration and chromatic aberration of magnification becomes difficult when the lower limit of 72 to condition (n) is not reached. Lens materials exceeding the upper limit of 100 are less available. It is noted that where the field angle is small and the zoom ratio is low, i.e., where the zoom ratio is 2.5 or lower and the wide-angle end field angle is 66° or smaller, correction of chromatic aberrations is feasible even when there is any deviation from condition (n); this condition does not matter.

As explained above, the more the conditions (a) to (n) satisfied, the shorter the length of the zoom lens upon received in the lens mount can be.

Preferably for making the length of the zoom lens upon received in the lens mount shorter, conditions (a) to (n) should be independently or simultaneously reduced to the following conditions (a)' to (n)':

$7 < d_{NP} \cdot A < 24.6$ (a)'

$20 < t_1 \cdot A < 45.2$ (b)'

$20 < D_2 \cdot A < 42.5$ (c)'

$30 < (t_1 + D_2) \cdot A < 84$ (d)'

$30 < -f_{11} \cdot A < 66.7$ (e)'

$90 < f_{12} \cdot A < 240$ (f)'

$20 < f_{21} \cdot A < 41$ (g)'

$0.6 < \Phi_{21}/\Phi_W < 1.02$ (h)'

$19.5 < R_{21} \cdot A < 40$ (i)'

$47 < -f_{22} \cdot A < 140$ (j)'

$0.33 < -\Phi_{22}/\Phi_W < 0.75$ (k)'

$-1 < (R_{21} + R_{22})/(R_{21} - R_{22}) < -0.1$ (l)'

$0.5 < (R_{23} + R_{24})/(R_{23} - R_{24}) < 3$ (m)'

$72 < \nu_{d21} < 96$ (n)'

More preferably, conditions (a)' to (n)' should be reduced as follows:

$7 < d_{NP} \cdot A < 20$ (a)''

$20 < t_1 \cdot A < 40$ (b)''

$20 < D_2 \cdot A < 40$ (c)''

$30 < (t_1 + D_2) \cdot A < 80$ (d)''

$30 < -f_{11} \cdot A < 55$ (e)''

$90 < f_{12} \cdot A < 110$ (f)''

$20 < f_{21} \cdot A < 40$ (g)''

$0.6 < \Phi_{21}/\Phi_W < 0.8$ (h)''

$19.5 < R_{21} \cdot A < 34$ (i)''

$75 < -f_{22} \cdot A < 140$ (j)''

$0.33 < -\Phi_{22}/\Phi_W < 0.49$ (k)''

$-1 < (R_{21} + R_{22})/(R_{21} - R_{22}) < -0.5$ (l)''

$0.8 < (R_{23} + R_{24})/(R_{23} - R_{24}) < 2.5$ (m)''

$72 < \nu_{d21} < 90$ (n)''

Another electronic image pickup system having similar objects is now explained.

This electronic image pickup system comprises any one of the following four types of zoom lenses.

The first type zoom lens comprises a first lens group consisting of two lenses or, in order from its object side, a negative lens and a positive lens and having generally negative power and a second lens group consisting of, in order from its object side, an aperture stop, a positive lens and a negative lens (two lenses in all) and having generally positive power. Upon zooming from the wide-angle end to the telephoto end of the zoom lens, the spacing between the first lens group and the second lens group becomes narrow. The first lens group has an aspheric surface and in the second lens group the surface located nearest to the object side is defined by an aspheric surface. Further, the second lens group satisfies conditions (1) and (2) given later.

The second type zoom lens comprises a first lens group having generally negative power, in which a negative lens is located nearest to its object side and a positive lens is located nearest to its image, a second lens group consisting of, in order form its object side, an aperture stop, a positive lens and a negative lens (two lenses in all) and having generally positive power and a third lens group consisting of one positive lens. Upon zooming from the wide-angle end to the telephoto end of the zoom lens, the spacing between the first lens group and the second lens group becomes narrow and the spacing between the second lens group and the third lens group becomes wide. The first lens group has an aspheric surface, and in the second lens group the surface located nearest to the object side is defined by an aspheric surface. The shape of the negative lens in the second lens group satisfies condition (1) given later.

The third type zoom lens comprises a first lens group having generally negative power, in which a negative lens is located nearest to its object side and a positive lens is located nearest to its image, a second lens group consisting of, in order form its object side, an aperture stop, a positive lens and a negative lens (two lenses in all) and having generally positive power and a third lens group consisting of one positive lens. Upon zooming from the wide-angle end to the telephoto end of the zoom lens, the spacing between the first lens group and the second lens group becomes narrow and the spacing between the second lens group and the third lens group becomes wide. The first lens group has an aspheric surface, and in the second lens group the surface located nearest to the object side is defined by an aspheric surface. The second lens group satisfies condition (2) given later.

The fourth type zoom lens comprises a first lens group consisting of two positive lenses or, in order from its object side, a negative lens, a negative lens and a positive lens (three lenses in all) and having generally negative power and a second lens group consisting of, in order from its object side, an aperture stop, a positive lens and a negative lens and having generally positive power. Upon zooming from the wide-angle end to the telephoto end of the zoom lens, the spacing between the first lens group and the second lens group becomes narrow. The first lens group has an aspheric surface, and in the second lens group the surface located nearest to the object side is defined by an aspheric surface. Further, the second lens group satisfies conditions (1) and (2) given later.

By allowing the first lens group to have negative power and the second lens group to have positive power, it is easy to make the back focus so long that there can be easily provided space for locating a low-pass filter, etc. before the image-formation plane. By locating the aperture stop on the position nearest to the object side of the second lens group that is a zoom group, said aperture stop being movable together with the second lens group, it is possible to reduce the effective diameter and, hence, thickness of the second lens group, so that the zoom lens can be slimmed down. By constructing the second lens group of two lenses, positive and negative, it is possible to make correction for chromatic aberrations and achieve thickness reductions.

In the zoom lens used with the electronic image pickup system of the invention, the first lens group has an aspheric surface, and the second lens group has an aspheric surface at the surface located nearest to its object side. The aspheric surface in the first lens group is effective for correction of distortions, astigmatisms and comae, and the aspheric surface located nearest to the object side of the second lens group is effective for correction of comae. It is noted that the use of an aspheric surface at the surface located nearest to the image plane side of the second lens group is effective for correction of astigmatisms.

Conditions (1) and (2) are now explained.

$$0.6 < (R_{23}+R_{24})/(R_{23}-R_{24}) < 3.0 \tag{1}$$

$$0.08 < t_{2N}/D_2 < 0.28 \tag{2}$$

Here $R_{23}$ is the paraxial radius of curvature of the object-side surface of the negative lens in the second lens group, $R_{24}$ is the paraxial radius of curvature of the image plane-side surface of the negative lens in the second lens group, $D_2$ is the axial thickness of the second lens group from the object-side surface of the positive lens therein to the image-side surface of the negative lens therein, and $t_{2N}$ is the axial distance from the image-side surface of the positive lens in the second lens group to the image-side surface of the second lens group.

By allowing the negative lens in the second lens group to have a meniscus shape concave on the image side, comae can be well corrected. When the curvature of that concave surface is too steep, however, the angle of incidence of light rays on the image plane becomes large, often resulting in a shading problem. It follows that as the upper limit of 3.0 to condition (1) is exceeded, shading is likely to occur, and as the lower limit of 0.6 is not reached, correction of comae is likely to become less than satisfactory.

Preferably, condition (1) should be reduced as follows:

$$0.8 < (R_{23}+R_{24})/(R_{23}-R_{24}) < 2.5 \tag{1'}$$

More preferably, condition (1)' should be reduced as follows:

$$0.9 < (R_{23}+R_{24})/(R_{23}-R_{24}) < 2.0 \tag{1''}$$

Condition (2) provides a definition of the axial distance $t_{2N}$ from the image side-surface of the positive lens in the second lens group to the image side-surface of the negative lens in the second lens group. Unless this site has some thickness, astigmatisms then remain under-corrected. However, such thickness becomes rather an encumbrance for the purpose of reducing the thickness of each lens element in the optical system. Accordingly, astigmatisms are corrected by an aspheric surface used at the image side-surface of the negative lens. Still, if the lower limit of 0.08 is not reached, the astigmatisms then remain under-corrected. When the upper limit of 0.28 is exceeded, the thickness of the zoom lens system becomes unacceptably large.

Preferably, condition (2) should be reduced as follows:

$$0.1 < t_{2N}/D_2 < 0.25 \tag{2'}$$

More preferably, condition (2)' should be reduced as follows:

$$0.12 < t_{2N}/D_2 < 0.22 \tag{2''}$$

Instead of or in addition to condition (2), at least one of the following conditions (3) and (4) should be met:

$$0.3 < D_2/f_W < 1.5 \tag{3}$$

$$0.24 < D_2/L < 1.2 \tag{4}$$

Here $D_2$ is the axial thickness from the object-side surface of the positive lens in the second lens group to the image-side surface of the negative lens in the second lens group, $f_W$ is the focal length of the zoom lens at the wide-angle end (upon focused on an object point at infinity), and L is the diagonal length of an effective image pickup area (in a substantially rectangular form) of the electronic image pickup device.

When the lower limits of 0.3 and 0.24 to conditions (3) and (4) are not reached, correction of astigmatisms becomes difficult. In addition, the lenses are difficult to fabricate because of a decreased edge thickness. When the upper limits of 1.5 and 1.2 are exceeded, the thickness of the zoom lens increases upon received in the lens mount.

Preferably, condition (3) and/or condition (4) should be reduced as follows:

$$0.5 < D_2/f_W < 1.4 \tag{3}'$$

$$0.4 < D_2/L < 1.12 \tag{4}'$$

More preferably, condition (3)' and/or condition (4)' should be reduced as follows:

$$0.7 < D_2/f_W < 1.3 \tag{3}''$$

$$0.56 < D_2/L < 1.04 \tag{4}''$$

The refractive index $n_{21}$ of the positive lens in the second lens group should preferably be high for the purpose of keeping spherical aberrations, comae and Petzval sum in good conditions while achieving size reductions. That is, it is desirable to satisfy the following condition (5):

$$1.6 < n_{21} < 1.9 \tag{5}$$

When the lower limit of 1.6 to this condition is not reached, these aberrations are likely to remain under-corrected. If corrected, size reductions are difficult to achieve. The upper limit is set at 1.9 because no actually available vitreous material is found.

Preferably, condition (5) should be reduced as follows:

$$1.65 < n_{21} < 1.9 \tag{5}'$$

More preferably, condition (5)' should be reduced as follows:

$$1.68 < n_{21} < 1.9 \tag{5}''$$

While the second lens group consists of four refracting surfaces, all contiguous to air, it is understood that it is of vital importance to properly determine the shape of each refracting surface for the purpose of reducing aberration fluctuations all over the zooming zone and, hence, keeping aberrations in satisfactory conditions. It follows that the paraxial radii of curvature $R_{21}$, $R_{22}$, $R_{23}$ and $R_{24}$ of the respective surfaces, as viewed in order from the object side, satisfy independently or simultaneously the following conditions:

$$-1.5 < R_{21}/R_{22} < 0.2 \tag{6}$$

$$-1.0 < R_{22}/R_{23} < 0.5 \tag{7}$$

$$-0.3 < R_{24}/R_{23} < 0.5 \tag{8}$$

$$0.5 < R_{24}/R_{21} < 2.0 \tag{9}$$

When the upper limit of 0.2 to condition (6) is exceeded, spherical aberrations tend to occur, and when the lower limit of −1.5 is not reached, comae tend to occur. By allowing the negative lens in the second lens group to have a meniscus shape concave on the image side as already explained, comae are well corrected. When the upper limits of 0.5 and 0.5 to conditions (7) and (8), respectively, are exceeded, comae are likely to become worse. When the lower limit of −1.0 to condition (7) is not reached, spherical aberrations are likely to occur, and when the lower limit of −0.1 to condition (8) is not reached, the angle of light rays on the image plane becomes large, often resulting in a shading problem. The basic power of the second lens group, for the most part, is determined by $R_{21}$ and $R_{24}$. Falling short of the lower limit of 0.5 to condition (9) may be favorable for correction of spherical aberrations, comae, etc.; however, this is not preferred for size reductions because the refracting power of the second lens group becomes weak. When the upper limit of 2.0 is exceeded, correction of not only spherical aberrations and comae but also chromatic aberrations becomes sufficient. Any deviation from any one of the aforesaid four conditions causes the stability of aberrations all over the zooming zone to become worse.

Preferably, conditions (6) to (9) should preferably be independently or simultaneously reduced as follows:

$$-1.2 < R_{21}/R_{22} < 0 \tag{6}'$$

$$-0.7 < R_{22}/R_{23} < 0.35 \tag{7}'$$

$$-0.2 < R_{24}/R_{23} < 0.3 \tag{8}'$$

$$0.7 < R_{24}/R_{21} < 1.5 \tag{9}'$$

More preferably, conditions (6)' to (9)' should be reduced as follows:

$$-0.9 < R_{21}/R_{22} < -0.2 \tag{6}''$$

$$-0.5 < R_{22}/R_{23} < 0.25 \tag{7}''$$

$$-0.15 < R_{24}/R_{23} < 0.2 \tag{8}''$$

$$0.9 < R_{24}/R_{21} < 1.2 \tag{9}''$$

Where the zoom lens mounted on the electronic image pickup system of the invention comprises a third lens group (the second or third type zoom lens) composed of one positive lens, it is effective to meet the following conditions.

The first condition, which is applied only to the case where the third lens group has a focusing function, is that each refracting surface be defined by a spherical surface alone or an aspheric surface having a reduced amount of bias, as given by $$|abs(Z)|/L < 1.5 \times 10^{-2} \tag{10}$$

Here L is the diagonal length of an effective image pickup area of the electronic image pickup device, and abs(Z) is the amount of bias, as measured at a position having a height of 0.35L from the optical axis, of each refracting surface in the third lens group from a spherical surface having an axial radius of curvature in the optical axis direction to the refracting surface.

Where this third lens group is used for focusing purposes, aberration fluctuations become a problem. When an aspheric surface is incorporated in the third lens group in an amount than required, astigmatisms remaining in the first and second lens groups must be corrected at the third lens group to take advantage of that aspheric surface. However, the focusing movement of the third lens group in this state is not preferred because that balance is upset. For focusing with the third lens group, the astigmatisms should thus be substantially cut off all over the zooming zone at the first and second lens groups. Preferably to this end, the third lens group is constructed of a spherical system or a reduced amount of aspheric surface, the aperture stop is located on the object side of the second lens group, and an aspheric surface is used for the lens that is located nearest to the image side of the second lens group and has a particular effect on off-axis aberrations. In this type zoom lens wherein the diameter of the front lens is kept substantially small, it is preferable to integrate the aperture stop with the second lens group (in the examples given later, the aperture stop is located just before the second lens group and made integral therewith). This is because the mechanism is not only simplified, but also any dead space is less likely to occur upon the zoom lens received in the lens mount and there is a small difference in F-number between the wide-angle end and the telephoto end.

Exceeding the upper limit of $1.5\times10^{-2}$ to condition (10) is not preferred because the balance of astigmatisms is largely upset upon rear focusing with the third lens group.

More preferably, condition (10) should be reduced as follows:

$$|abs(Z)|/L < 1.5 \times 10^{-3} \tag{10}'$$

Even more preferably, condition (10)' should be reduced as follows:

$$|abs(Z)|/L < 1.5 \times 10^{-4} \tag{10}''$$

Optionally, the third lens group should comply with the following condition (11):

$$-2.0 < (R_{31}+R_{32})/(R_{31}-R_{32}) < 1.0 \tag{11}$$

Here $R_{31}$ is the axial radius of curvature of the object-side surface of the positive lens in the third lens group, and $R_{32}$ is the axial radius of the image side-surface of the positive lens in the third lens group. This condition may help stabilize various aberrations such as astigmatisms and chromatic aberrations all over the zooming zone in every distance from infinity to nearby distance, even when rear focusing is introduced in the optical system while the thickness of the optical system is reduced.

When the upper limit of 1.0 to condition (11) is exceeded, astigmatism fluctuations with rear focusing become too large. For instance, even when astigmatisms with respect to object points at infinity can be well corrected, astigmatisms with respect to nearby object points are likely to become worse. When the lower limit of −2.0 is not reached, astigmatism fluctuations with rear focusing are limited, but correction of aberrations with respect to object points at infinity becomes difficult.

More preferably, condition (11) should be reduced as follows:

$$-1.6 < (R_{31}+R_{32})/(R_{31}-R_{32}) < 0.7 \tag{11}'$$

Even more preferably, condition (11)' should be reduced as follows:

$$-1.2 < (R_{31}+R_{32})/(R_{31}-R_{32}) < 0.4 \tag{11}''$$

If, upon zooming from the wide-angle end to the telephoto end of the zoom lens, the amount of movement, $x_3$, of the third lens group toward the object side thereof is designed to comply with the following condition (12), it is then possible to keep aberrations in good condition all over the zooming zone.

$$-0.5 < x_3/\sqrt{(f_W f_T)} < 0.5 \tag{12}$$

When the upper limit of 0.5 to condition (12) is exceeded, there is degradation in the stability of aberrations such as spherical aberrations, comae and astigmatisms all over the zooming zone. When the lower limit of −0.5 is not reached, the difference in the exit pupil position between the wide-angle end and the telephoto end becomes too large to maintain shading in good condition all over the zooming zone.

More preferably, $$-0.5 < x_3/\sqrt{(f_W f_T)} < 0.4 \tag{12}'$$

Even more preferably, $$-0.3 < x_3/\sqrt{(f_W f_T)} < 0.3 \tag{12}''$$

Preferably, there is provided an electronic image pickup system, characterized by comprising a zoom lens comprising, in order from its object side, a first lens group having negative power and a second lens group having positive power, wherein said first lens group comprises a negative meniscus lens and a positive meniscus lens, each having an axial surface convex on its object side and the object-side surface of said positive meniscus lens is defined by an aspheric surface in which the outermost periphery of an effective refracting surface is of concave shape in the direction opposite to a direction with the paraxial center of curvature found therein, and an electronic image pickup device located on the image plane-side of the zoom lens.

By using the aforesaid aspheric surface, correction of aberrations is allocated to an axial bundle and an off-axis bundle at the wide-angle end. Since, in this case, the negative lens and the positive lens in the first lens group have each an axial surface convex on its object side, the angle of bending of light rays with respect to the axial bundle is so small that longitudinal aberrations from the wide-angle end to the telephoto end can be well corrected.

Alternatively, there is provided an electronic image pickup system, characterized by comprising a zoom lens comprising, in order from its object side, a first lens group having negative power and a second lens group having positive power, wherein said first lens group comprises a negative lens concave on its image plane side and a positive meniscus lens having an axial surface convex on its object side, the object-side surface of said positive meniscus lens is defined by an aspheric surface in which the outermost periphery of an effective refracting surface is of concave shape in the direction opposite to a direction with the paraxial center of curvature found therein and said positive lens complies with the following condition (A), and an electronic image pickup device located on the image plane-side of the zoom lens.

$$-5.0 < (R_{13}+R_{14})/(R_{13}-R_{14}) < -1.7 \tag{A}$$

Here $R_{13}$ is the radius of curvature of the object-side surface of the positive meniscus lens in the first lens group, and $R_{14}$ is the radius of curvature of the image plane-side surface of the positive meniscus lens in the first lens group.

By use of the aforesaid aspheric surface, correction of aberrations can be allocated to an axial bundle and an off-axis bundle at the wide-angle end. By complying with the aforesaid condition (A) in particular, correction of longitudinal aberrations or off-axis aberrations at the wide-angle end can be well corrected. When the upper limit of −1.7 to condition (A) is exceeded, the meniscus shape of a central portion of the positive lens becomes obtuse, whereas when the lower limit of −5.0 is not reached, that meniscus shape becomes too steep to make correction for longitudinal or off-axis aberrations. More preferably, the following condition (A)' should be satisfied in place of condition (A).

$$-5.0 < (R_{13}+R_{14})/(R_{13}-R_{14}) < -2.4 \tag{A}'$$

Even such optical systems can be reduced in size and cost and enhanced in performance by satisfying two or more of the aforesaid conditions or arrangements.

Regarding fluctuations of the exit pupil position upon zooming from the wide-angle end to the telephoto end of the zoom lens while focused on an object point at infinity, the amount of change in the reciprocal of the exit pupil position, $\Delta(1/\text{EXP})=|(1/\text{EXPT})-(1/\text{EXPW})|$, complies with the following condition (13):

$$\Delta(1/\text{EXP})\cdot\sqrt{(f_W f_T)} < 1 \tag{13}$$

Here EXPT is the exit pupil position at the telephoto end, and EXPW is the exit pupil position at the wide-angle end.

When the upper limit of 1 to condition (13) is exceeded, it is difficult to keep shading in good condition all over the zooming zone.

More preferably, $$\Delta(1/\text{EXP})\cdot\sqrt{(f_W f_T)} < 0.8 \tag{13}'$$

Even more preferably, $$\Delta(1/\text{EXP}) \cdot \sqrt{(f_W \cdot f_T)} < 0.7 \quad (13)''$$

Preferably, the aforesaid conditions (1) through (13)" should be applied to an electronic image pickup system comprising a zoom lens having a zoom ratio of at least 2.4 or at least 2.8.

Upon zooming from the wide-angle end to the telephoto end, it also desired that the amount of zooming movement, $x_3$, of the third lens group comply with the following condition (B) with respect to the amount of change, $x_{2-3}$, in the air separation between the second lens group and the third lens group.

$$0.005 < |x_3/(\gamma \times x_{23})| < 0.05 \quad (B)$$

Here $\gamma$ is the zoom ratio from the wide-angle end to the telephoto end.

When the lower limit of 0.005 to condition (B) is not reached or the amount of zooming movement of the third lens group is reduced, the action on exit pupil position adjustment dwindles. On the other hand, when the upper limit of 0.05 is exceeded, the amount of movement of the third lens group increases, resulting in an increase in the whole size of the optical system.

This effect is more enhanced by complying with $$0.01 < |x_3/(\gamma \times x_{2-3})| < 0.035 \quad (B)'$$

More preferably for reducing the size of the optical system, the third lens group should be designed to move toward the image side at the telephoto end rather than at the wide-angle end.

If the following conditions are additionally applied to the zoom lenses explained so far, it is then possible to achieve a smaller zoom lens composed of a more reduced number of lenses yet with more satisfactorily corrected aberrations.

First Condition

Aspheric surfaces are introduced at the surfaces located nearest to the object side and image side of the first lens group, thereby making correction for barrel distortion on the wide-angle side as is often the case with this type of zoom lens (especially when the first lens group consists of one lens, this barrel distortion is necessarily produced because to allow the first lens group to have power is of absolute necessity) without making astigmatisms and comae as well as spherical aberrations on the telephoto side worse. Particularly remarkable effects are obtained by using aspheric surfaces at both surfaces.

Second Condition

Aspheric surfaces should be introduced at the surfaces located nearest to the object side and image side of the second lens group, so that spherical aberrations, comae and astigmatisms can be kept in good condition all over the zooming zone. To maintain focusing in good condition all over the zooming zone, it is acceptable to use condition (10) in addition to this requirement.

Third Condition

Aspheric surfaces should be introduced at both surfaces of the positive lens in the first lens group, so that barrel distortion on the wide-angle side as is often the case with this type of zoom lens can be corrected without making astigmatisms and comae as well as spherical aberrations on the telephoto side worse.

Fourth Condition

All the negative lenses in the first and second lens groups should be of meniscus shape convex on the object sides. The first lens group is favorable for a tradeoff between correction of barrel distortion on the wide-angle side, astigmatisms and comae and correction of spherical aberrations on the telephoto side, and the second lens group is advantageous for correction of spherical aberrations, coame and astigmatisms all over the zooming zone.

Fifth Condition

The object-side surface of the positive lens in the second lens group should be defined by a strong convex surface. By configuring the positive lens in the second lens group in such a way as to have a strong convex surface on its object side, size reductions can be achieved simultaneously with correction of comae.

Sixth Condition

By allowing the object-side surface of the negative lens in the first lens group to comply with the following condition (14) with respect to its paraxial radius of curvature, so that barrel distortion on the wide-angle side as is often the case with this type of zoom lens can be corrected without worsening astigmatisms and comae as well as spherical aberrations on the telephoto side. More satisfactory results are obtainable by the introduction of an aspheric surface.

$$-0.3 < f_W/R_{11} < 0.4 \quad (14)$$

Here $R_{11}$ is the paraxial (axial) radius of curvature of the first lens surface in the first lens group, as counted from its object side, and $f_W$ is the focal length of the zoom lens at the wide-angle end (upon focused on an object point at infinity).

When the upper limit of 0.4 to this condition (14) is exceeded, correction of astigmatisms and spherical aberrations on the telephoto side becomes difficult, and when the lower limit of −0.3 is not reached, correction of barrel distortion at the wide-angle end becomes difficult. Preferably, distortions should be corrected by the introduction of an aspheric surface in the first lens group while astigmatisms be corrected with the remaining spherical component. Exceeding the upper limit is unfavorable for correction of astigmatisms and spherical aberrations on the telephoto side, and falling short of the lower limit causes distortions to remain under-corrected even with an aspheric surface.

More preferably, $$-0.2 < f_W/R_{11} < 0.30 \quad (14)'$$

Even more preferably, $$-0.15 < f_W/R_{11} < 0.25 \quad (14)''$$

Seventh Condition

An axial air separation contiguous to the object side of the positive lens in the first lens group should comply with the following condition, so that correction of distortions can be reconciled with correction of astigmatisms while the thickness of the first lens group itself is reduced in the optical axis direction.

$$0.3 < d_{NP}/f_W < 1 \quad (15)$$

Here $d_{NP}$ is an axial air separation contiguous to the object side of the positive lens in the first lens group.

Exceeding the upper limit of 1 to condition (15) may be favorable for correction of astigmatisms, but this is contradictory to size reductions because of an increase in the thickness of the first lens group. When the lower limit of 0.3 is not reached, correction of astigmatisms becomes difficult.

More preferably, $$0.4 < d_{NP}/f_W < 0.9 \quad (15)'$$

Even more preferably, $$0.5 < d_{NP}/f_W < 0.8 \quad (15)''$$

Alternatively, it is acceptable to comply with either one of the following condition (15)* or (15)** with the proviso that $d_{NP}$ is defined by the focal length, $f_1$, of the first lens group.

$$1 < |d_{NP}/f_1| < 3 \quad (15)*$$

$$1.5 < |d_{NP}/f_1| < 2.5 \quad (15)**$$

By permitting the axial thickness of the first lens group from the lens surface located nearest to its object side to the lens surface located nearest to its image side to satisfy the following condition, the desired zoom lens requirements and performance are ensured while size and thickness reductions are achieved.

$$0.4 < t_1/L < 2.2 \quad (16)$$

Here $t_1$ is the axial thickness of the first lens group from the lens surface located nearest to its object side to the lens surface located nearest to its image side, and L is the diagonal length of an effective image pickup area (in a substantially rectangular form) of the electronic image pickup device.

Exceeding the upper limit of 2.2 to condition (16) renders thickness reductions difficult, and when the lower limit of 0.4 is not reached, there is no other choice but to make the radius of curvature of each lens surface obtuse, and so it is difficult to set up the desired paraxial relations or correct various aberrations.

It is noted that the range defined by condition (16) must vary depending on the value of L, because there must be space for edge thickness and mechanical considerations.

$$0.6 < t_1/L < 2.2 \text{ when } L < 6.2 \text{ mm}$$

$$0.5 < t_1/L < 2.0 \text{ when } 6.2 \text{ mm} < L < 9.2 \text{ mm}$$

$$0.4 < t_1/L < 1.8 \text{ when } 9.2 \text{ mm} < L \quad (16)'$$

Eighth Condition

At least one of the aspheric surfaces introduced in the first lens group should be configured such that the outermost periphery of an effective refracting surface area is of concave shape in the direction opposite to a direction with the paraxial center of curvature found therein (i.e., the sectional shape of at least one aspheric surface inclusive of the optical axis has a primary point of inflection in its effective area), so that even when the number of the negative lens in the first lens group is one, astigmatisms and comae including barrel distortion on the wide-angle side can be well reconciled with spherical aberrations on the telephoto side. Preferably, that aspheric surface should be configured such that an off-axis effective surface includes an area where the normal thereto is parallel with the optical axis.

Ninth Condition

At least two of the aspheric surfaces introduced in the first lens group should be each configured such that the outermost periphery of an effective refracting surface area is of concave shape in the direction opposite to a direction with the paraxial center of curvature found therein, so that even when the number of the negative lens in the first lens group is one, astigmatisms and comae including barrel distortion on the wide-angle side can be more satisfactorily reconciled with spherical aberrations on the telephoto side. Preferably, each aspheric surface should be configured such that an off-axis effective surface includes an area where the normal thereto is parallel with the optical axis.

Tenth Condition

The following condition (17) should be satisfied:

$$1 < f_1/R_{11} < 0.5 \quad (17)$$

Here $f_1$ is the focal length of the first lens group, and $R_{11}$ is the paraxial (axial) radius of curvature of the surface located nearest to the object side of the first lens group.

When the upper limit of 0.5 to condition (17) is exceeded, some complicated, if not barrel, distortions are produced with adverse influences on other off-axis aberrations. This is true even when a refracting surface having an extreme value in an effective range other than the optical axis is introduced in the first lens group. When the lower limit of −1 is not reached, the effect of the refracting surface introduced dwindles.

More preferably, $$-0.8 < f_1/R_{11} < 0.3 \quad (17)'$$

Even more preferably, $$-0.7 < f_1/R_{11} < 0.2 \quad (17)''$$

The positive lens in the first lens group should be configured such that the paraxial radii of curvature of both its surfaces have a positive value and there is an area on the periphery of an optically effective range of each surface, where the surface is concave on the object side, so that even when the number of the negative lens in the first lens group is one, astigmatisms and comae including barrel distortion on the wide-angle side can be well reconciled with spherical aberrations-on the telephoto side.

In addition, the following conditions should be satisfied:

$$-2.5 < f_1/R_{13} < -0.5 \quad (18)$$

$$-1.5 < f_1/R_{14} < 0.5 \quad (19)$$

Here $f_1$ is the focal length of the first lens group, $R_{13}$ is the radius of curvature of the object-side surface of the positive lens in the first lens group, and $R_{14}$ is the radius of curvature of the image plane-side surface of the positive lens in the first lens group.

When the lower limits of −2.5 and −1.5 to conditions (18) and (19), respectively, are not reached, some complicated, if not barrel, distortions are produced with adverse influences on other off-axis aberrations. This is true even when a refracting surface having an extreme value in an effective range other than the optical axis is introduced in the first lens group. When the respective upper limits of −0.5 and 0.5 are exceeded, the effect of the refracting surface introduced dwindles.

More preferably, $$-2.0 < f_1/R_{13} < -0.6 \quad (18)'$$

$$-1.2 < f_1/R_{14} < 0.2 \quad (19)'$$

Even more preferably, $$-1.7 < f_1/R_{13} < -0.7 \quad (18)''$$

$$-1 < f_1/R_{14} < 0 \quad (19)''$$

It is understood that when the zoom lens of the invention is used for focusing on a nearby object, it is preferable to move the first lens group toward the object side along the optical axis.

To use the foregoing zoom lens for the electronic image pickup system, the zoom lens should preferably comply with such conditions as set forth hereinafter.

Regarding the requirements, the appropriate range of half field angles at the wide-angle end, full-aperture F-numbers at the telephoto end and zoom ratios γ are first given below.

$$28° < \omega_W < 40° \quad (20)$$

$$2.7 < F_T < 5 \quad (21)$$

$$2 < \gamma < 4 \quad (22)$$

Here $\omega_W$ is the half field angle at the wide-angle end, $F_T$ is the full-aperture F-number at the telephoto end, and γ is the zoom ratio.

When the upper limit of 40° to condition (20) is exceeded, correction of off-axis aberrations becomes difficult and it is required to increase the diameter and thickness of the zoom lens, contrary to size reduction requirements. When the lower limit of 28° is not reached, no general-purpose half field angle at the wide-angle end is available. The invention can conform well to the field angle in this range.

When the lower limit of 2.7 to condition (21) is not reached, correction of longitudinal aberrations becomes difficult and the diameter and thickness of the zoom lens must be increased contrary to size reduction requirements. When the upper limit of 5 is exceeded, no general-purpose F-number is available. Especially in consideration of the application of the zoom lens to small imager size, problems may arise in connection with diffraction and sensitivity.

When the upper limit of 4 to condition (22) is exceeded, correction of Seidel aberrations and chromatic aberrations becomes impossible. A zoom lens falling short of the lower limit of 2 is of no useless, because systems for trimming images with a single-focus lens having a higher number of pixels are more inexpensive and easier to achieve high image quality.

Next, how and why the thickness of filters is reduced is now explained. In an electronic image pickup system, an infrared absorption filter having a certain thickness is usually inserted between an image pickup device and its object side and positioned nearer to the object side, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance of at least 80% at 600 nm and a transmittance of up to 10% at 700 nm is introduced between an image pickup device in the rear of the zoom lens system and the object side of the system and nearer to the object side, the transmittance on the red side is relatively higher that that of the absorption type, so that the tendency of bluish purple to turn into magenta—a defect of a complementary mosaic filter-inserted CCD—is diminished by gain control and there can be obtained color reproduction comparable to that by a CCD having a primary colors filter. On the other hand, a complementary filter is higher in substantial sensitivity and more favorable in resolution than a primary colors filter-inserted CCD due to its high transmitted energy, and provides a great merit when used in combination with a small-size CCD. Regarding an optical low-pass filter that is another filter, too, its total thickness, $t_{LPF}$, should preferably comply with the following condition:

$$0.15a < t_{LPF} < 0.5a \text{ (mm)} \quad (23)$$

Here a is the horizontal pixel pitch (in μm) of the electronic image pickup device.

Reducing the thickness of the optical low-pass filter, too, is effective for making the thickness of the zoom lens upon received in the lens mount; however, this is generally not preferred because the moiré preventive effect becomes slender. On the other hand, as the pixel pitch becomes small, the contrast of frequency components greater than Nyquist criterion decreases under the influence of diffraction of an image-formation lens and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by a μm in the horizontal and by SQRT(½)*a μm in the ±45° directions. Here SQRT means a square root. The then filter thickness is approximately given by [1+2*SQRT(½)]*a/5.88 (mm).

This is the specification where the contrast is reduced down to zero at a frequency corresponding just to Nyquist criterion. At a thickness a few % to a few tens of % smaller than this, a little more contrast of the frequency corresponding to Nyquist criterion appears; however, this can be suppressed under the influence of the aforesaid diffraction. In other filter embodiments where two filters are placed one upon another or one single filter is used, too, it is preferable to comply with condition (23). When the upper limit of 0.5a is exceeded, the optical low-pass filter becomes too thick, contrary to size reduction requirements. When the lower limit of 0.15a is not reached, moiré removal becomes insufficient. In this condition, a should be 5 μm or less.

When a is 4 μm or less or where the optical low-pass filter is more susceptible to diffraction, it is preferable that $$0.13a < t_{LPF} < 0.5a \text{ (mm)} \quad (23)'$$

It is also acceptable that when a is 4 μm or greater, $0.3a < t_{LPF} < 0.5a$ (mm) provided that three filters are placed one upon another and a<5 μm $0.2a < t_{LPF} < 0.28a$ (mm) provided that two filters are placed one upon another and a<5 μm $0.1a < t_{LPF} < 0.16a$ (mm) provided that one filter is used and a<5 mm when a is 4 μm or less, $0.25a < t_{LPF} < 0.5a$ (mm) provided that three filters are placed one upon another $0.16a < t_{LPF} < 0.25a$ (mm) provided that two filters are placed one upon another $0.08a < t_{LPF} < 0.14a$ (mm) provided that one filter is used When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a (μm)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

As already mentioned, another object of the present invention is to provide an electronic image pickup system that ensures high image quality while the influence of diffraction is suppressed as well as light quantity adjustments, and enables the length of a zoom lens used thereon to be shortened. This object is achieved by such embodiments as set forth below.

According to the first embodiment, there is provided an electronic image pickup system comprising a zoom lens and an electronic image pickup device located on the image plane side of the zoom lens, wherein the zoom lens comprises a plurality of lens groups in which the spacing between adjacent lens groups is varied to change a focal length and an aperture stop located in an optical path to limit the diameter of an axial light beam, characterized in that:

said aperture stop is of fixed stop shape, and a filter for making light quantity adjustments by changing transmittance is located on an optical axis in a space at a position different from that of a space where said aperture stop is located.

In this embodiment, the light quantity adjustments are carried out by changing transmittance and the stop is of fixed shape. It is thus possible to prevent degradation in electronic images due to diffracted light that has occurred with a stop having a decreased diameter.

Referring to a conventional mechanism for controlling the quantity of light at a stop position using a stop of variable shape or the like, that mechanism is responsible for limitations on the degree of freedom in the location of an optical system. According to the present invention, however, the stop mechanism itself can be thinned because the stop used is of fixed shape. It is thus possible to make the spacing between the lenses with the stop interleaved between them shorter than usual and, hence, shorten the length of the zoom lens.

It is acceptable to locate the aperture stop in a lens group, i.e., between lenses the spacing between which is kept constant during zooming.

The shape of the aperture stop is not always limited to a circle. In a conventional variable stop that is necessarily of circular shape, a number of stop plates are used. In the present invention, too, it is preferable to use a stop of circular aperture shape because regardless of what state the quantity of light is adjusted in, it is possible to easily obtain clearly blurred images with little or no image variations at unfocused areas.

The chief ray of an off-axis light beam is determined by the aperture stop, and there is nothing wrong with the shading of that chief ray at other site. In general, light quantity adjustment means of the type having a reduced aperture stop area must be located at a position where upon stop down, there is no extreme decrease in the quantity of light at a peripheral portion of the picture plane. In the present invention, however, there is no need of such location and so a high degree of flexibility in design is achievable.

By configuring the aperture stop of fixed shape as defined below, an electronic image of high resolution can be obtained.

According to the second embodiment of the invention, the electronic image pickup system of the first embodiment is further characterized in that when the full-aperture F-number, F, of the zoom lens at its telephoto end is $1.5 \times 10^3 \times a/1 \text{ mm} < F$ with respect to the minimum pixel pitch $\underline{a}$ (in mm) of the electronic image pickup device, the length of the aperture stop in a direction vertical or horizontal to the image pickup plane is longer than the length of the aperture stop in a diagonal direction with respect to the image pickup plane or when the full-aperture F-number, F, of the zoom lens at its telephoto end is $1.5 \times 10^3 \times a/1 \text{ mm} > F$ with respect to the minimum pixel pitch $\underline{a}$ (in mm) of the electronic image pickup device, the length of the aperture stop in a direction vertical or horizontal to the image pickup plane is shorter than the length of the aperture stop in a diagonal direction with respect to the image pickup plane.

For instance, when the length of the pixel pitch is the first half of 2 mm, there is a diffraction limit at an F-number of about 5.6. According to the invention wherein the stop used is of fixed shape, it is thus possible to enhance resolution by the arbitrary determination of aperture shape.

Rayleigh limit frequency is approximately represented by $1/(1.22F\lambda)$, where F is the F-number of the phototaking lens used and $\lambda$ (nm) is the wavelength of light used.

On the other hand, the resolution limit of an image pickup device comprising a plurality of pixels is given by $1/(2a)$, where $\underline{a}$ is a pixel pitch in mm.

To keep Rayleight limit frequency from becoming lower than the resolution limit of the image pickup device, it is thus a requirement to satisfy $1.22F\lambda < 2a$ or $F < 1.64a/\lambda$.

Here assume that the wavelength used is $\lambda = 546$ (nm) in consideration of phototaking with visible light. Then, a theoretical limit to F-number is given by $F < 3.0 \times 10^{-3} \times a/1 \text{ mm}$ On the other hand, it is recognized that as the aperture size becomes small, image degradation starts in a state that is bright by a two-stage amount with respect to the theoretical limit. It is thus preferable to set an actual limit at $F < 1.5 \times 10^3 \times a/1 \text{ mm}$ where F is four-fold faster than Rayleigh limit.

The image quality of an electronic image is effectively improved by bettering its frequency characteristics in the horizontal and vertical directions. Accordingly, when the full-aperture F-number is given by $1.5 \times 10^3 \times a/1 \text{ mm} < F$, it is preferable that the length of the aperture stop in the direction vertical or horizontal to the image pickup plane is longer than the length of the aperture stop in the diagonal direction with respect to the image pickup plane, so that the F-number is less susceptible to diffraction.

On the other hand, when the full-aperture F-number is given by $1.5 \times 10^3 \times a/1 \text{ mm} > F$, it is preferable that the length of the aperture stop in the direction vertical or horizontal to the image pickup plane is shorter than the length of the aperture stop in the diagonal direction with respect to the image pickup plane, so that the F-number is less susceptible to diffraction.

Moreover, it is possible to increase the cutoff frequency of a conventional low-pass filter or dispense with that low-pass filter itself.

According to the third embodiment of the invention, the electronic image pickup system of the first embodiment is further characterized in that said filter is located within the minimum air separation among variable air separations in said zoom lens or within the longest air separation among certain air separations in said zoom lens, thereby shortening the length of said zoom lens.

With this embodiment, the filter can be located at a site where wide space is always ensured during zooming. This arrangement is favorable for shortening the length of the zoom lens.

This also goes true for the embodiments wherein the shutter is located as will be described later.

Since the stop used is of fixed shape, light beams are shaded by a lens barrel or the like when the size of the stop is enlarged to ensure the quantity of light. This may lead to brightness variations between the central area and the peripheral area of an image.

To suppress such brightness variations by a light quantity adjustment filter, the fourth embodiment of the invention is provided. That is, the electronic image pickup system of the first embodiment is further characterized in that said light quantity adjustment filter comprises at least one transmitting surface having a transmittance higher at its peripheral portion than at its central portion.

With such an embodiment, it is possible to perform phototaking with little or no brightness variations.

To reduce ghosts due to light reflected from the filter, the fifth embodiment of the invention is provided. That is, the electronic image pickup system of the first embodiment is further characterized in that said light quantity adjustment filter may be tilted with respect to the optical axis.

According to the sixth embodiment of the invention, the electronic image pickup system of the first embodiment is further characterized in that said aperture stop is positioned between adjacent lens groups with a variable air separation therebetween upon zooming or focusing, and said light quantity adjustment filter is located at a position different from that of said air separation.

With this embodiment, the amount of zooming movement of the lens group is so increased that high zoom ratios can be easily achieved.

According to the seventh embodiment of the invention, the electronic image pickup system of any one of the 1st to 6th embodiments is further characterized in that a position where a perpendicular coming down from said aperture stop towards the optical axis intersects said optical axis is found in a lens medium in the lens groups.

The reason such an embodiment is feasible is that the aperture stop used is of invariable shape.

According to the eighth embodiment of the invention, the electronic image pickup system of the 7th embodiment is further characterized in that said aperture stop is located contiguously to any one of lens surfaces in said lens groups.

With this embodiment, even higher precision can be achievable due to no need of making stop position adjustment. Especially if a black-painted form of stop is formed on the lens surface, this embodiment can then be more easily achieved.

According to the ninth embodiment of the invention, the electronic image pickup system of any one of the 1st to 8th embodiments is further characterized in that said aperture stop is defined by an aperture plate open on the optical axis side.

With this embodiment, the stop can be thinned.

According to the tenth embodiment of the invention, the electronic image pickup system of any one of the 1st to 9th embodiments are further characterized in that said zoom lens comprises, at least, a lens group having negative refracting power and a lens group located just after the image side thereof and having positive refracting power, the spacing between said lens group having negative refracting power and said lens group having positive refracting power is narrower at the telephoto end than at the wide-angle end, said aperture stop is located between the surface located nearest to the image plane side of said lens group having negative refracting power and the surface located nearest to the image plane side of said lens group having positive refracting power, and said light quantity adjustment filter is located nearer to the image plane side rather than to said aperture stop.

When the aperture stop is located at the aforesaid position in the zoom lens arrangement comprising a negative lens group and a positive lens group in this order, it is possible to make the whole zoom lens arrangement compact and easily ensure the desired field angle at the wide-angle end.

When the aperture stop is located at such a position, the divergence of a light beam on the image side with respect thereto is prevented from becoming excessively large. This in turn enables the light quantity adjustment filter to be located at the aforesaid position, thereby making the filter itself compact, and so is favorable for size reductions.

More specifically, according to the 11th embodiment of the invention, the electronic image pickup system of the 10th embodiment is further characterized in that said negative lens group is located nearest to the object side of the zoom lens.

With such an embodiment, at least one of wider field angles, higher zoom ratios and size reductions is achievable.

According to the 12th embodiment of the invention, the electronic image pickup system of the 10th embodiment is further characterized in that said zoom lens comprises, in order from the object side thereof, said lens group having negative refracting power and said lens group having positive refracting power, and lens groups movable for zooming are defined by two lens groups alone or said lens group having negative refracting power and said lens group having positive refracting power.

With such an embodiment, at least one of wider field angles, higher zoom ratios and size reductions is achievable.

According to the 13th embodiment of the invention, the electronic image pickup system of the 10th embodiment is further characterized in that said zoom lens consists of two lens groups alone or, in order from an object side thereof, said lens group having negative refracting power and said lens group having positive refracting power.

With such an embodiment, additional structural simplification is achievable.

According to the 14th embodiment of the invention, the electronic image pickup system of any one of the 10th 13th embodiments is further characterized in that said aperture stop is located in an air separation just before said lens group having positive refracting power.

With such an embodiment, light rays incident on the electronic image pickup device can be made substantially vertical to the image pickup plane.

Especially when the zoom lens is constructed of, in order from its object side, a negative lens group and a positive lens group, it is then possible to bring the first or negative lens group closer to the second lens group at the telephoto end, thereby shortening the length of the zoom lens in an amount larger than the amount of the decrease in the spacing between the first lens group and the second lens group.

If the lens group having positive refracting power and the aperture stop are formed as a one-piece, it is then possible to simplify the construction of the lens barrel.

According to the 15th embodiment of the invention, the electronic image pickup system of any one of 10th to 14th embodiments is further characterized in that said light quantity adjustment filter is located in an air separation just after said lens group having positive refracting power.

Such an embodiment is more preferable because the filter can be located at a position where a light beam is less divergent. In particular, the application of this embodiment to a two-group zoom lens comprising a negative lens group and a positive lens group is most preferable because a light beam is less divergent.

According to the 16th embodiment of the invention, the electronic image pickup system of any one of the 1st to 15th embodiments are further characterized by constantly satisfying the following condition (24):

$$0.01 < \alpha/\beta < 1.0 \quad (24)$$

where $\alpha$ is the axial distance from said aperture stop to the entrance surface of said light quantity adjustment filter located nearer to the image side of the zoom lens, and $\beta$ is the axial distance from the entrance surface of said light quantity adjustment filter to the image pickup plane of said electronic image pickup device.

Locating the filter at a position nearer to the aperture stop is preferable because the size of the filter itself can be reduced. When the upper limit of 1.0 to this condition is exceeded, it is difficult to make the size of the filter small. When the lower limit of 0.01 is not reached, on the other hand, it is difficult to make the whole zoom lens compact because the filter is too close to the stop.

More preferably in this condition, the lower limit should be set at 0.1 or 0.2. The upper limit should be set at preferably 0.8, more preferably 0.6, and even more preferably 0.4.

Preferably, this condition should be satisfied all over the zooming zone or in the state where the stop is positioned nearest to the image side during zooming.

According to the 17th embodiment of the invention, the electronic image pickup system of any one of the 1st to 16th embodiments is further characterized by satisfying the following condition (25):

$$0.5 < \phi\beta/+\phi\alpha < 1.5 \quad (25)$$

where $\phi\alpha$ is the maximum aperture diameter of said aperture stop, and $\phi\beta$ is the maximum effective length (diagonal length) of said light quantity adjustment filter.

When the lower limit of 0.5 to this condition is not reached, there is a great possibility that light beams used for phototaking are shaded. When the upper limit of 1.5 is exceeded, on the other hand, the size of the filter becomes large.

More preferably in this condition, the lower limit should be set at 0.7 or 0.8. The upper limit should be set at preferably 1.2, and more preferably 1.05.

Preferably, this condition should be satisfied all over the zooming zone or in the state where the stop is positioned nearest to the image side during zooming.

According to the 18th embodiment of the invention, the electronic image pickup system of any one of the 1st to 17th embodiments is further characterized in that said aperture stop is located in a variable spacing, both lens surfaces located just before and just after said aperture stop are concave on the image side, and said aperture stop has a funnel-form outer shape in which its inclination with respect to the image side becomes steeper off and off the optical axis.

In this embodiment, the outside shape of the stop conforms to the lens surfaces located after and before it, so that those lens surfaces can be more easily brought close to each other.

As a matter of course, a black-painted stop on the lens surface is included in this embodiment.

According to the 19th embodiment of the invention, the electronic image pickup system of the 19th embodiment is further characterized in that said light quantity adjustment filter is insertable in or removable from an optical path.

According to the 20th embodiment of the invention, the electronic image pickup system of the 19th embodiment is further characterized in that said light quantity adjustment filter has a surface rocking parallel with and towards the optical axis upon coming off the optical axis.

With such an embodiment, there is no need of providing space for receiving the filter, which is located around the zoom lens and becomes large in a direction coming off the optical axis, and the size of the zoom lens can be reduced.

The 1st to 20th embodiments of the invention have been described primarily with reference to the light quantity adjustment shutter. In some embodiments, however, conventional variable stops are used as shutters. For this reason, instead of or in addition to the filter, it is preferable to locate a shutter in the vicinity of the filter. Alternatively, it is acceptable to locate the shutter in another space with at least one lens inserted between them.

For instance, the present invention may be embodied as shown below by the 21st to 34th embodiments. It is here understood that the actions of these embodiments are much the same as explained with the aforesaid shutters.

According to the 21st embodiment of the invention, there is provided an electronic image pickup system comprising a zoom lens and an electronic image pickup device located on the image plane side of said zoom lens, wherein said zoom lens comprises a plurality of lens groups in which the spacing between adjacent lens groups is varied to change a focal length and an aperture stop located in an optical path to limit an axial light beam, characterized in that:

said aperture stop is of fixed stop shape, and a shutter is located on an optical axis in a space at a position different from that of a space where said aperture stop is located.

According to the 22nd embodiment of the invention, the electronic image pickup system of the 21st embodiment is further characterized in that said aperture stop is positioned between adjacent lens groups with a variable air separation therebetween upon zooming or focusing, and said shutter is located at a position different from that of said air separation.

According to the 23rd embodiment of the invention, the electronic image pickup system of the 21st or 22nd embodiment is further characterized in that a position where a perpendicular coming down from said aperture stop towards an optical axis intersects said optical axis is found in a lens medium in the lens groups.

According to the 24th embodiment of the invention, the electronic image pickup system of the 23rd embodiment is further characterized in that said aperture stop is located contiguously to any one of lens surfaces in said lens groups.

According to the 25th embodiment of the invention, the electronic image pickup system of any one of the 21st to 24th embodiments is further characterized in that said aperture stop is defined by an aperture plate open on an optical axis side.

According to the 26th embodiment of the invention, the electronic image pickup system of any one of the 21st to 24th embodiments is further characterized in that said zoom lens comprises, at least, a lens group having negative refracting power and a lens group located just after an image side thereof and having positive refracting power, the spacing between said lens group having negative refracting power and said lens group having positive refracting power is narrower at a telephoto end than at a wide-angle end, said aperture stop is located between the surface located nearest to the image plane side of said lens group having negative refracting power and the surface located nearest to the image plane side of said lens group having positive refracting power, and said shutter is located nearer to the image plane side rather than to said aperture stop.

According to the 27th embodiment of the invention, the electronic image pickup system of the 26th embodiment is further characterized in that said negative lens group is located nearest to the object side.

According to the 28th embodiment of the invention, the electronic image pickup system of the 26th embodiment is further characterized in that said zoom lens comprises, in order from the object side thereof, said lens group having negative refracting power and said lens group having positive refracting power, and lens groups movable for zooming are defined by two lens groups alone or said lens group having negative refracting power and said lens group having positive refracting power.

According to the 29th embodiment of the invention, the electronic image pickup system is further characterized in that said zoom lens consists of two lens groups alone or, in order from the object side thereof, said lens group having negative refracting power and said lens group having positive refracting power.

According to the 30th embodiment of the invention, the electronic image pickup system of any one of the 26th to 29th embodiments is further characterized in that said aperture stop is located in an air separation just before said lens group having positive refracting power.

According to the 31st embodiment of the invention, the electronic image pickup system of any one of the 26th to 30th embodiments is further characterized in that said shutter is located in an air separation just after said lens group having positive refracting power.

According to the 32nd embodiment of the invention, the electronic image pickup system is further characterized by constantly satisfying the following condition (26):

$$0.01 < \alpha'/\beta' < 1.0 \quad (26)$$

where $\alpha'$ is the axis distance from said aperture stop to said shutter located nearer to the image side, and $\beta'$ is the axis distance from said shutter to the image pickup plane of said electronic image pickup device.

More preferably in this condition, the lower limit should be set at 0.1 or 0.2. The upper limit should be set at preferably 0.8, more preferably 0.6, and even more preferably 0.4.

Preferably, this condition should be satisfied all over the zooming zone or in the state where the stop is positioned nearest to the image side during zooming.

According to the 33rd embodiment of the invention, the electronic image pickup system of any one of the 21st to 32nd embodiments is further characterized by satisfying the following condition (27):

$$0.5 < \phi\beta'/\phi\alpha < 1.5 \quad (27)$$

where $\phi\alpha$ is the maximum aperture diameter of said aperture stop, and $\phi\beta'$ is the maximum effective length (diagonal length) of said shutter.

More preferably in this condition, the lower limit should be set at 0.7 or 0.8. The upper limit should be set at preferably 1.2, and more preferably 1.05.

Preferably, this condition should be satisfied all over the zooming zone or in the state where the stop is positioned nearest to the image side during zooming.

According to the 34th embodiment of the invention, the electronic image pickup system of any one of the 21st to 33rd embodiments is further characterized in that said aperture stop is located in a variable spacing, both lens surfaces located just before and just after said aperture stop are concave on an image side, and said aperture stop has a funnel-form outer shape in which its inclination with respect to the image side becomes steeper off and off the optical axis.

It is noted that the numerical example regarding the invention relating to the fixed stop corresponds to Example 12 given later.

It is understood that the shape of the aforesaid fixed stop may be approximately square (with the azimuth angle being in the vicinity of zero; generally, the dimension in approximately the horizontal or vertical direction is shortest) when the substantial full-aperture F-number, for instance, is four-fold faster than Rayleigh limit, and approximately square (with the azimuth angle being in the vicinity of 45°; generally, the dimension in approximately the horizontal or vertical direction is longest) when the substantial full-aperture F-number, for instance, is found at less than the value that is four-fold faster than Rayleigh limit, because such shapes are favorable for resolution in the horizontal and vertical directions.

The aforesaid conditions for the stop and filter or the stop and shutter should preferably be satisfied all over the zooming zone or in the state where the stop is positioned nearest to the image size in the zooming zone.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 19(a) to 16(c) are aberration diagrams of Example 12 upon focused on an object point at infinity.

FIGS. 41(a) to 41(c) are a front and a side view of a cellular phone with the inventive zoom lens built in as an objective optical system, and a sectional view of a phototaking optical system therefore, respectively.

DESCRIPTION OF THE PREFERRED EMBODIMENTS

Examples 1 to 12 of the zoom lens used with the electronic image pickup system of the invention are now explained. Sectional lens configurations of these examples at the wide-angle end (a), intermediate state (c) and telephoto end (b) upon focused on an object point at infinity are shown in FIGS. 1 through 12 wherein G1 represents a first lens group, G2 a second lens group, G3 a third lens group, capital F an optical low-pass filter comprising three optical low-pass filter elements stacked one upon another and having a near-infrared cut coat located on the first surface thereof (facing an object), and capital C a cover glass of an electronic image pickup device CCD, capital I the image plane of the CCD. The optical low-pass filter F and cover glass located on the object side of the zoom lens in that order are fixedly located between the second lens group G2 or the third lens group G3 and the image plane I.

Figure 1:
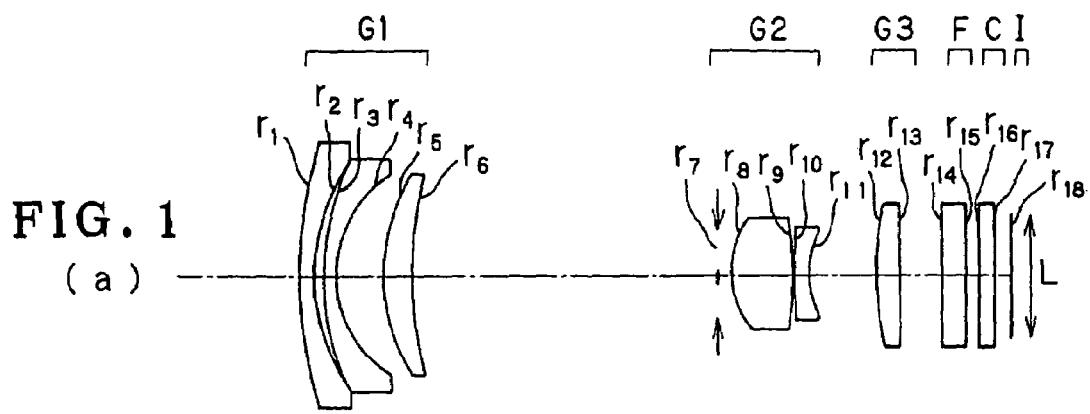
FIGS. 1(a) to 1(c) are sections in schematic illustrative of Example 1 of the zoom lens used with the electronic image pickup system of the invention at the wide-angle end when the zoom lens is focused on an object point at infinity.
Figure 1:
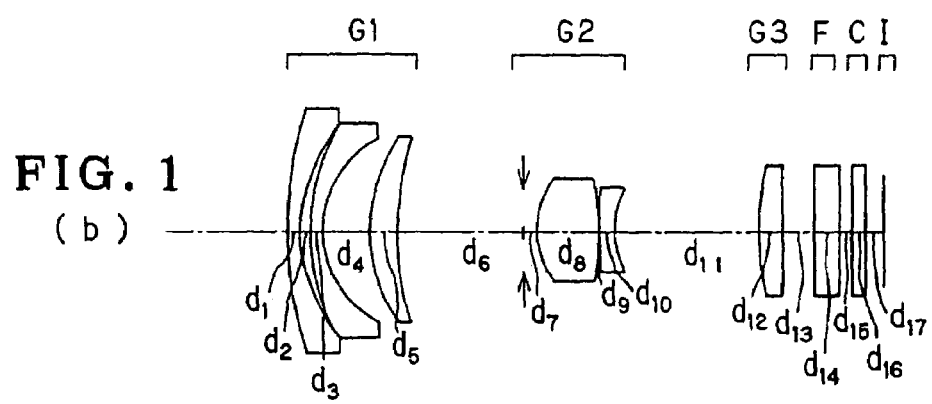
Figure 1:
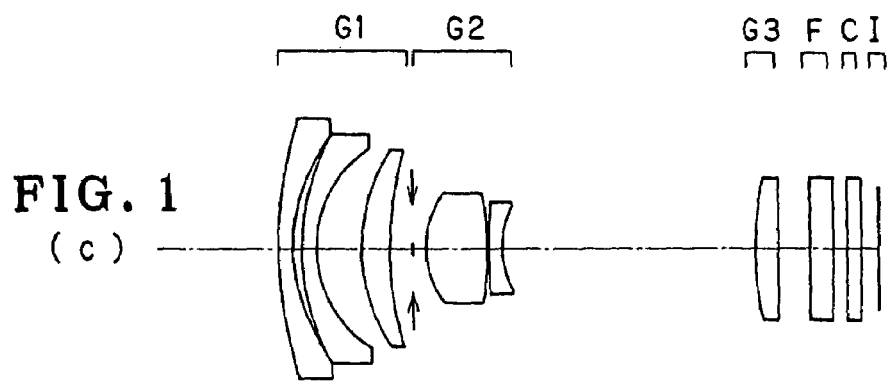

Example 1 is directed to a zoom lens consisting of the first lens group G1 having negative refracting power, the second lens group G2 having positive refracting power and the third lens group G3 having positive refracting power, as shown in FIG. 1. For zooming from the wide-angle end to the telephoto end of the zoom lens upon focused on an object point at infinity, the first lens group G1 moves once to the image side thereof and then turns back toward the object side thereof so that it is located slightly close to the object side rather than at the position of the intermediate state at the telephoto end. The second lens group G2 moves to the object side while the spacing between the first lens group G1 and the second lens group G2 becomes narrow, and the third lens group G3 moves slightly toward the image plane side.

The first lens group G1 in Example 1 consists of two negative meniscus lens elements each convex on its object side and a positive meniscus lens element convex on its object side, the second lens group G2 consists of a stop, a double convex lens element located in the rear thereof and a negative meniscus lens element convex on its object side, and the third lens group G3 consists of one positive meniscus lens element convex on its object side. Three aspheric surfaces are used, one at the image plane-side surface of the negative meniscus lens element located on the object side of the first lens group G1, one at the object side-surface of the double convex lens element in the second lens group G2 and one at the image plane-side surface of the negative meniscus lens element in the second lens group G2.

Figure 2:
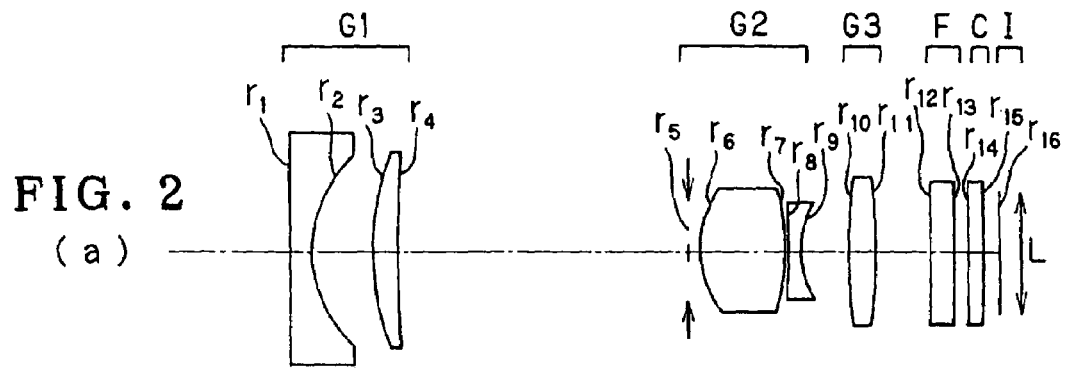
FIGS. 2(a) to 2(c) are sections in schematic illustrative of Example 2 of the zoom lens, similar to FIGS. 1(a) to 1(c).
Figure 2:
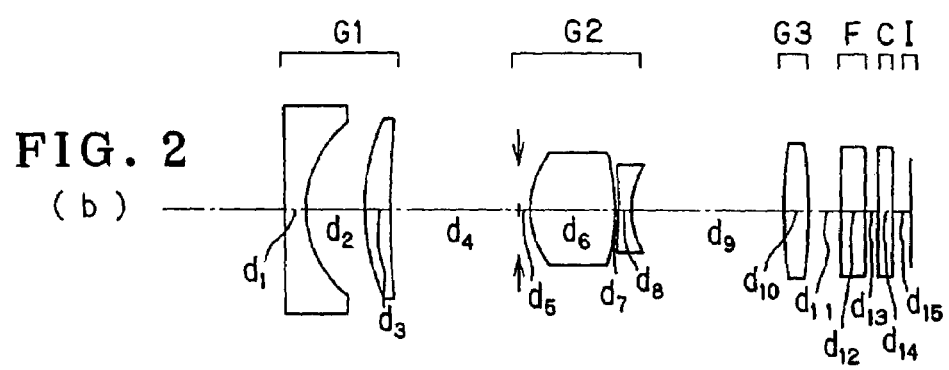
Figure 2:
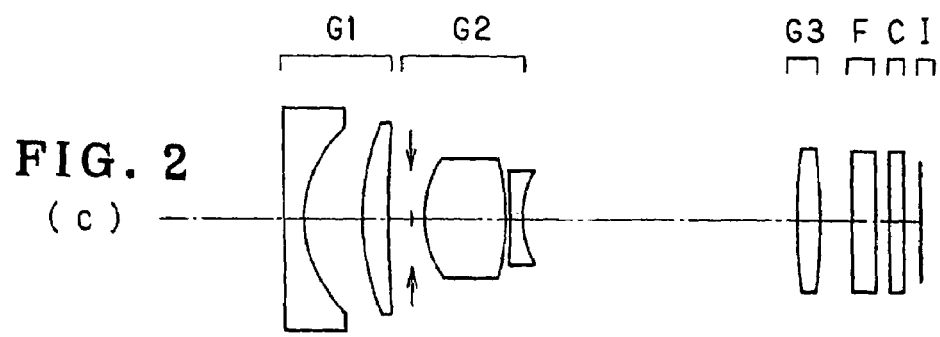

Example 2 is directed to a zoom lens consisting of the first lens group G1 having negative refracting power, the second lens group G2 having positive refracting power and the third lens group G3 having positive refracting power, as shown in FIG. 2. From zooming from the wide-angle end to the telephoto end of the zoom lens upon focused on an object point at infinity, the first lens group G1 moves once to the image side thereof and then turns back toward the object side thereof so that it is located slightly close to the object side rather than at the position of the intermediate state at the telephoto end. The second lens group G2 moves to the object side while the spacing between the first lens group G1 and the second lens group G2 becomes narrow, and the third lens group G3 moves slightly toward the image plane side.

The first lens group G1 in Example 2 consists of a negative meniscus lens element convex on its object side and a positive meniscus lens element convex on its object side, the second lens group G2 consists of a stop, a double-convex lens element located in the rear thereof and a double-concave lens element, and the third lens group G3 consists of one double-convex lens element. Three aspheric surfaces are used, one at the image plane-side surface of the negative meniscus lens element in the first lens group G1, one at the object-side surface of the double-convex lens element in the second lens group G2 and one at the image plane-side surface of the double-concave lens element in the second lens group G2.

Figure 3:
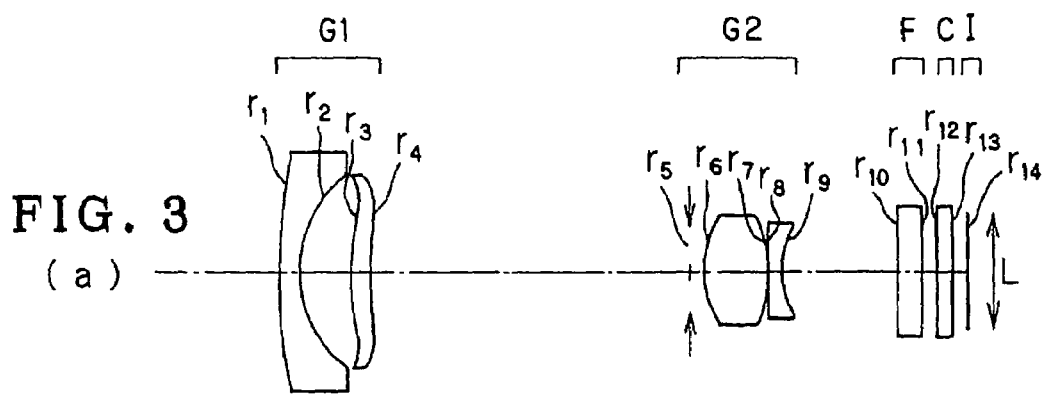
FIGS. 3(a) to 3(c) are sections in schematic illustrative of Example 3 of the zoom lens, similar to FIGS. 1(a) to 1(c).
Figure 3:
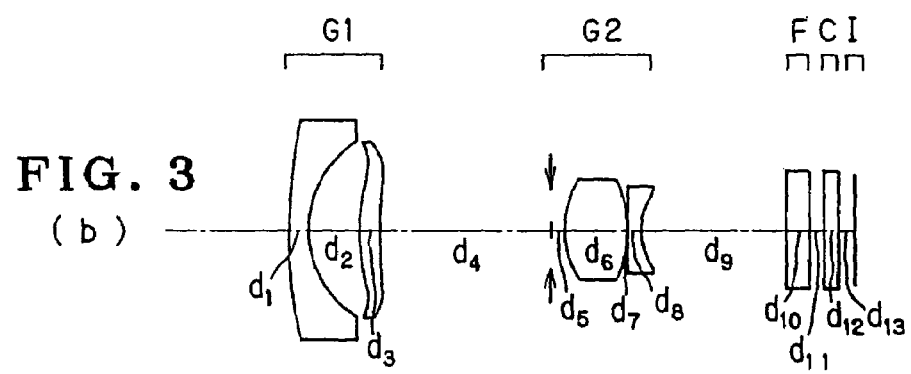
Figure 3:
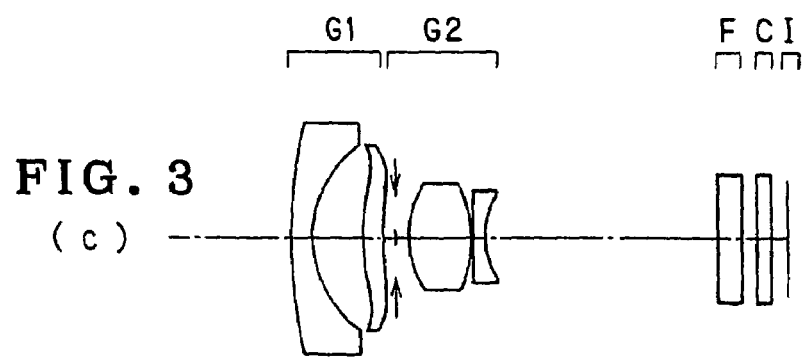

Example 3 is directed to a zoom lens consisting of the first lens group G1 having negative refracting power and the second lens group G2 having positive refracting power, as shown in FIG. 3. For zooming from the wide-angle end to the telephoto end of the zoom lens upon focused on an object point at infinity, the first lens group G1 moves to the image plane side thereof and the second lens group G2 moves to the object side thereof, so that the spacing between the first lens group G1 and the second lens group G2 becomes narrow.

The first lens group G1 in Example 3 consists of a negative meniscus lens element convex on its object side and a positive meniscus lens element convex on its object side, and the second lens group G2 consists of a stop, a double-convex lens element located in the rear thereof and a double-concave lens element. There are seven aspheric surfaces, four of which are used at all the surfaces in the first lens group G1, two at both surfaces of the double-convex lens element in the second lens group G2 and one at the image plane-side surface of the double-concave lens element in the second lens group G2.

Figure 4:
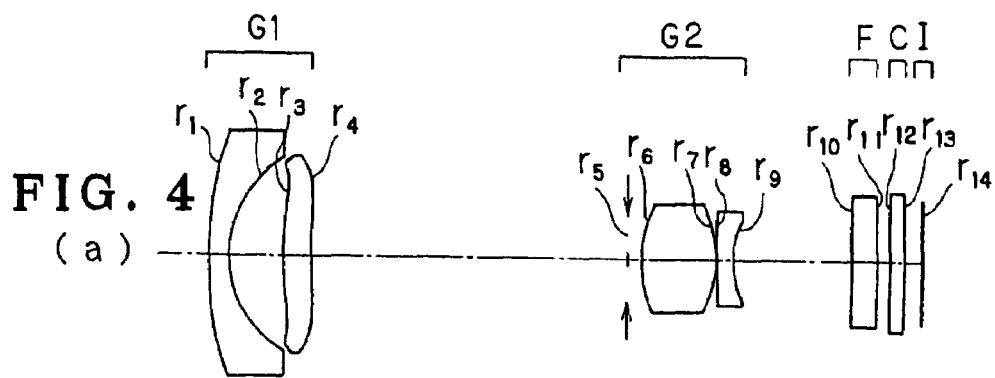
FIGS. 4(a) to 4(c) are sections in schematic illustrative of Example 4 of the zoom lens, similar to FIGS. 1(a) to 1(c).
Figure 4:
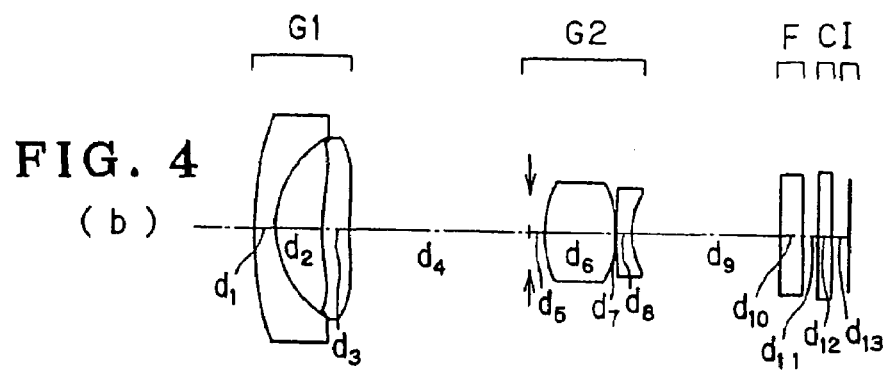
Figure 4:
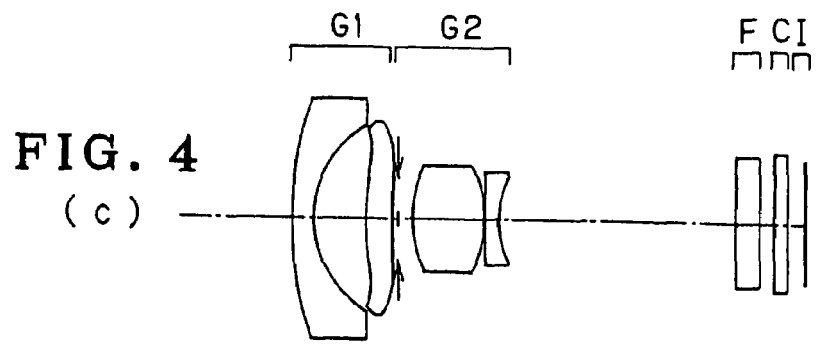

Example 4 is directed to a zoom lens consisting of the first lens group G1 having negative refracting power and the second lens group G2 having positive refracting power, as shown in FIG. 4. For zooming from the wide-angle end to the telephoto end of the zoom lens upon focused on an object point at infinity, the first lens group G1 moves to the image plane side thereof and the second lens group G2 moves to the object side thereof, so that the spacing between the first lens group G1 and the second lens group G2 becomes narrow. It is here noted, however, that for zooming from the wide-angle end to the telephoto end, the spacing between the negative meniscus lens element and the positive meniscus lens element in the first lens group G1 is designed to become once narrow and then wide. Accordingly, this may be called a three-group zoom lens of −++ construction wherein the negative meniscus lens defines a first lens group, the positive meniscus lens a second lens group and the second lens group G2 a third lens group.

The first lens group G1 in Example 4 consists of a negative meniscus lens element convex on its object side and a positive meniscus lens element convex on its object side, and the second lens group 2 consists of a stop, a double-convex lens element located in the rear thereof and a negative meniscus lens element convex on its object side. Aspheric surfaces are used at all of eight lens surfaces.

Figure 5:
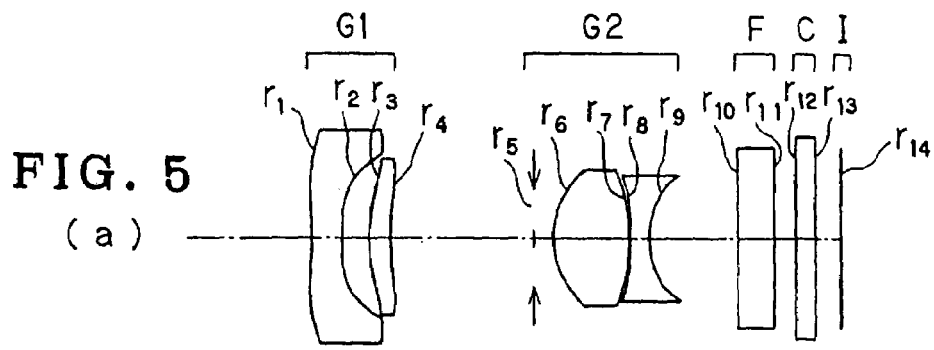
FIGS. 5(a) to 5(c) are sections in schematic illustrative of Example 5 of the zoom lens, similar to FIGS. 1(a) to 1(c).
Figure 5:
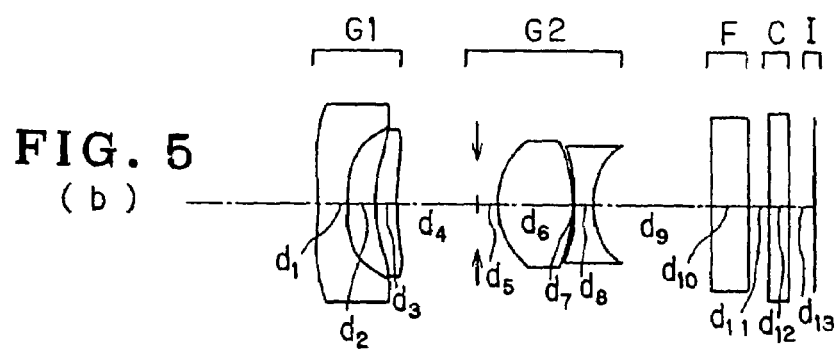
Figure 5:
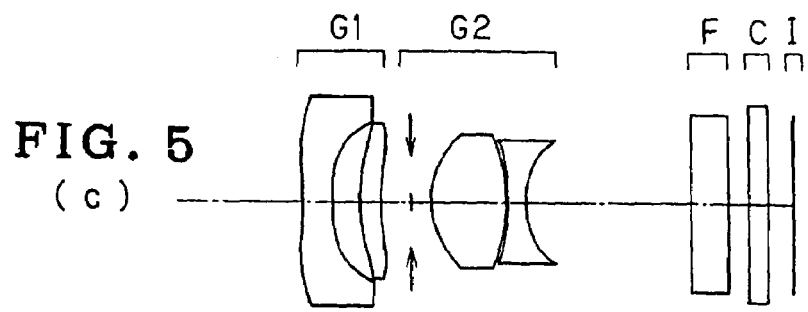

Example 5 is directed to a zoom lens consisting of the first lens group G1 having negative refracting power and the second lens group G2 having positive refracting power, as shown in FIG. 5. For zooming from the wide-angle end to the telephoto end of the zoom lens upon focused on an object point at infinity, the first lens group G1 moves to the image plane side thereof and the second lens group G2 moves to the object side thereof, with a narrowing spacing between the first lens group G1 and the second lens group G2.

The first lens group G1 in Example 5 consists of a double-concave lens element and a positive meniscus lens element convex on its object side, and the second lens group G2 consists of a stop, a double-convex lens element located in the rear thereof and a negative meniscus lens element convex on its object side. Aspheric surfaces are used at all of eight lens surfaces.

Figure 6:
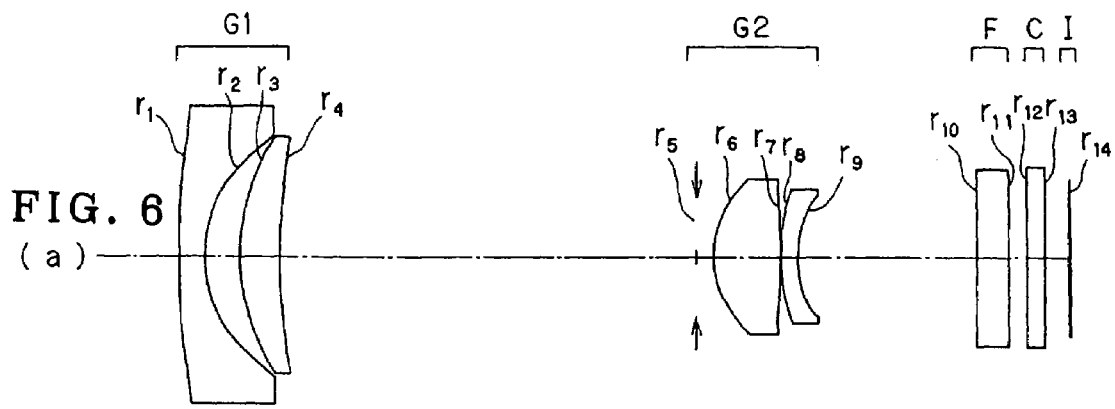
FIGS. 6(a) to 6(c) are sections in schematic illustrative of Example 6 of the zoom lens, similar to FIGS. 1(a) to 1(c).
Figure 6:
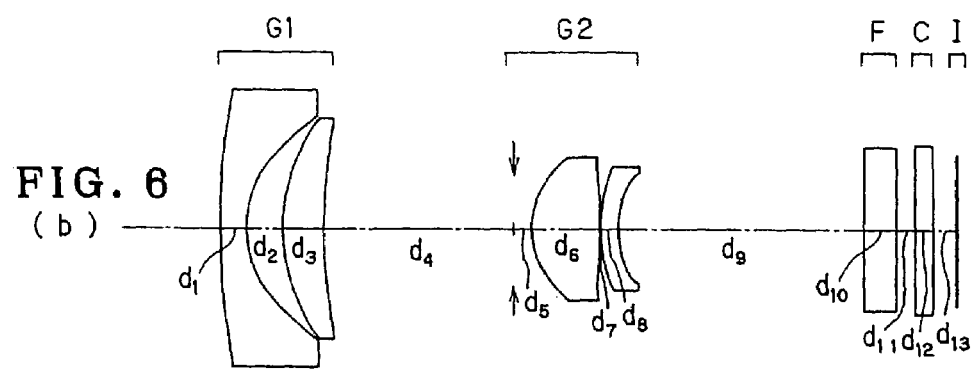
Figure 6:
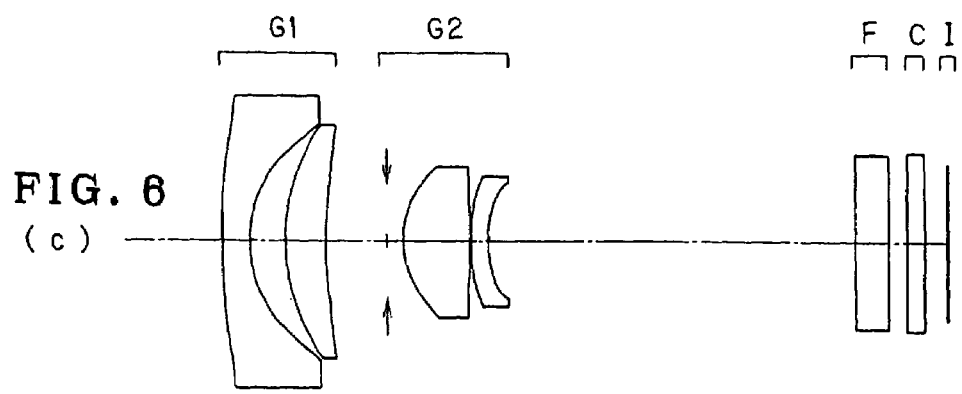

Example 6 is directed to a zoom lens consisting of the first lens group G1 having negative refracting power and the second lens group G2 having positive refracting power, as shown in FIG. 6. For zooming from the wide-angle end to the telephoto end of the zoom lens upon focused on an object point at infinity, the first lens group G1 moves to the image plane side thereof and the second lens group G2 moves to the object side thereof, with a narrowing spacing between the first lens group G1 and the second lens group G2.

The first lens group G1 in Example 6 consists of a negative meniscus lens element convex on its object side and a positive meniscus lens element convex on its object side, and the second lens group G2 consists of a stop, a double-convex lens element and a negative meniscus lens element convex on its object side. Aspheric surfaces are used at all of eight lens surfaces.

Figure 7:
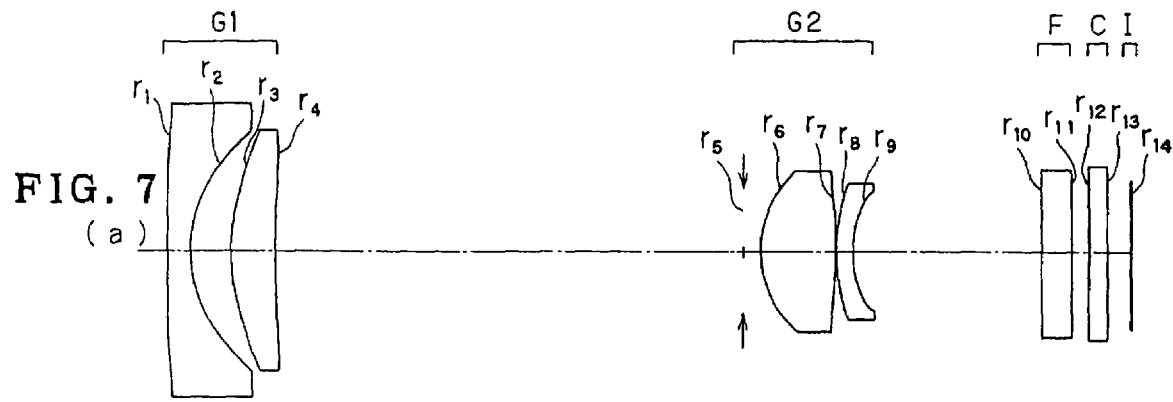
FIGS. 7(a) to 7(c) are sections in schematic illustrative of Example 7 of the zoom lens, similar to FIGS. 1(a) to 1(c).
Figure 7:
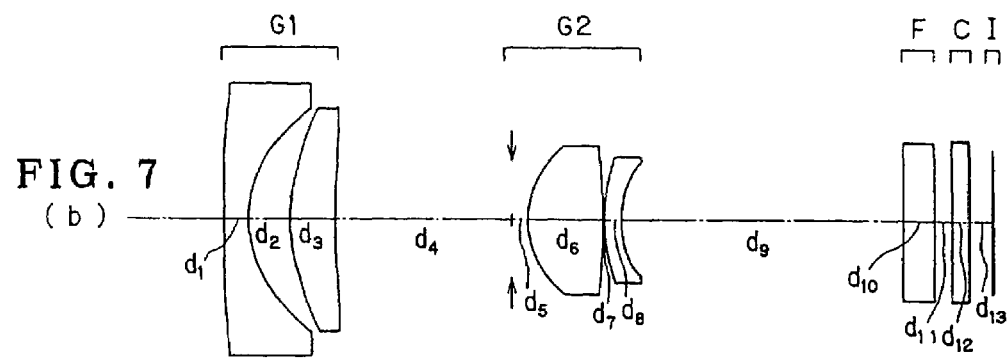
Figure 7:
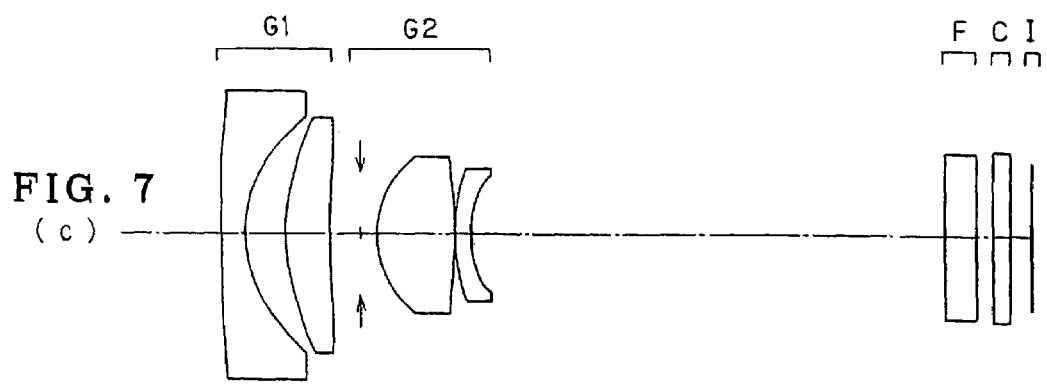

Example 7 is directed to a zoom lens consisting of the first lens group G1 having negative refracting power and the second lens group G2 having positive refracting power, as shown in FIG. 7. For zooming from the wide-angle end to the telephoto end of the zoom lens focused on an object point at infinity, the first lens group G1 moves along a concave locus to a position where it is located closer to the image plane side at the telephoto side than at the wide-angle end. The second lens group G2 moves to the object side with a narrowing spacing between the first lens group G1 and the second lens group G2.

The first lens group G1 in Example 7 consists of a double-concave lens element and a positive meniscus lens element convex on its object side, and the second lens group G2 consists of a stop, a double-convex lens element located in the rear thereof and a negative meniscus lens element convex on its object side. Aspheric surfaces are used at all of eight lens surfaces.

Figure 8:
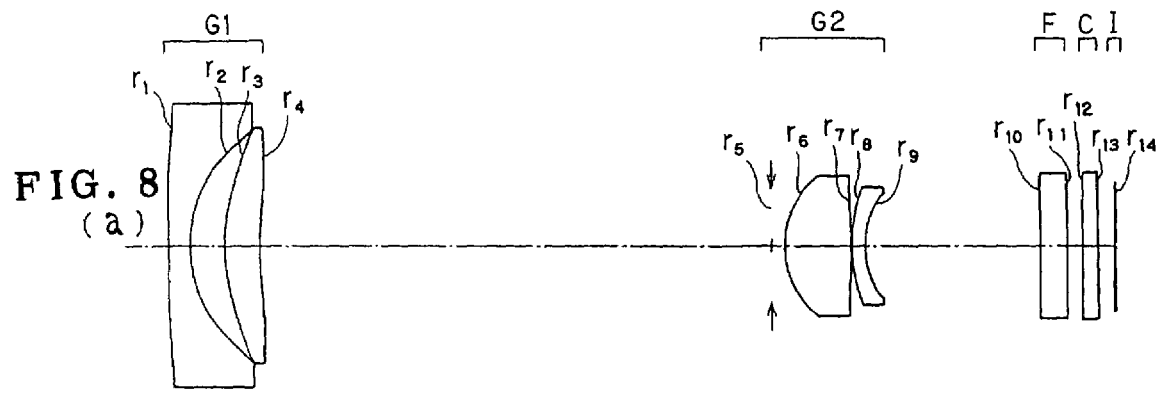
FIGS. 8(a) to 8(c) are sections in schematic illustrative of Example 8 of the zoom lens, similar to FIGS. 1(a) to 1(c).
Figure 8:
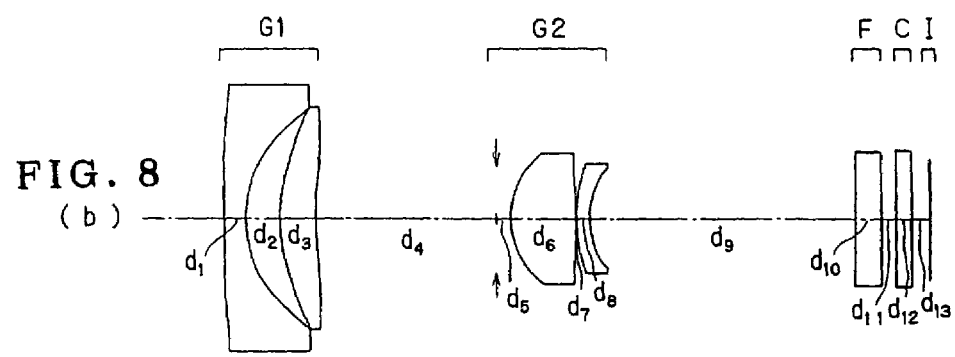
Figure 8:
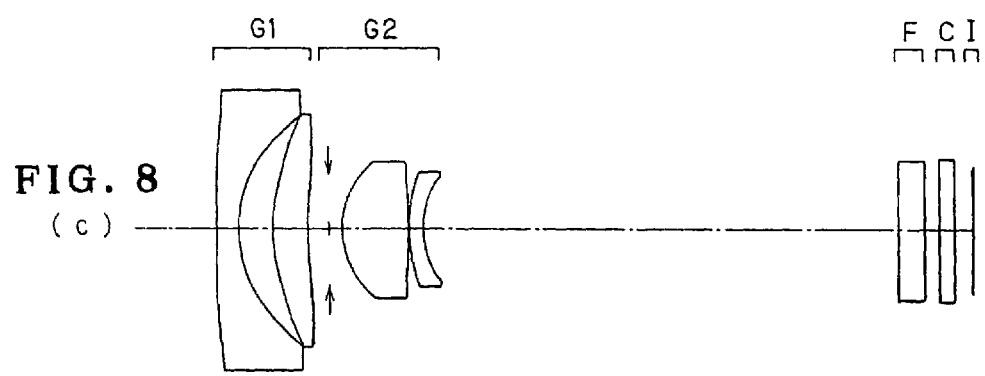

Example 8 is directed to a zoom lens consisting of the first lens group G1 having negative refracting power and the second lens group G2 having positive refracting power, as shown in FIG. 8. For zooming from the wide-angle end to the telephoto end of the zoom lens upon focused on an object point at infinity, the first lens group G1 moves along a concave locus to a position where it is located closer to the image plane side at the telephoto end than at the wide-angle end. The second lens group G2 moves to the object side with a narrowing spacing between the first lens group G1 and the second lens group G2.

The first lens group G1 in Example 8 consists of a double-concave lens element and a positive meniscus lens element convex on its object side, and the second lens group G2 consists of a stop, a double-convex lens element located in the rear thereof and a negative meniscus lens element convex on its object side. Aspheric surfaces are used at all of eight lens surfaces.

Figure 9:
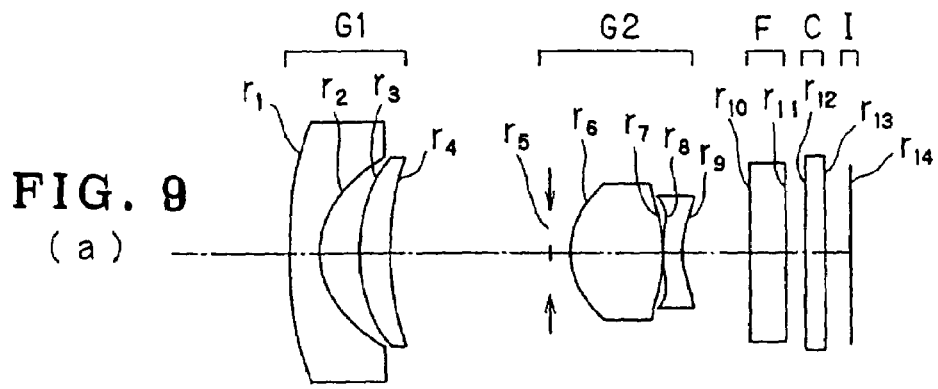
FIGS. 9(a) to 9(c) are sections in schematic illustrative of Example 9 of the zoom lens, similar to FIGS. 1(a) to 1(c).
Figure 9:
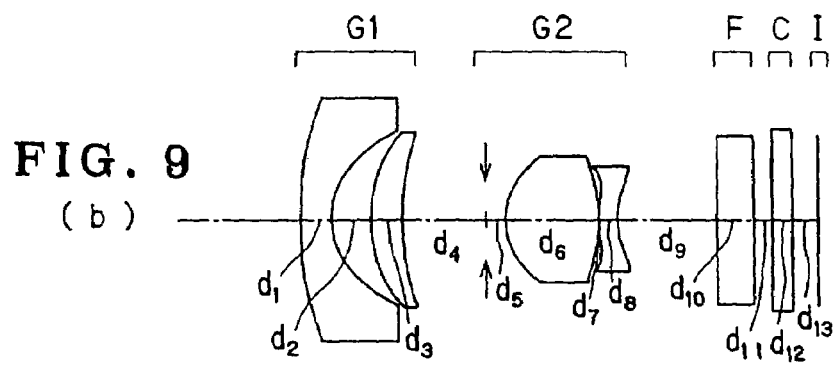
Figure 9:
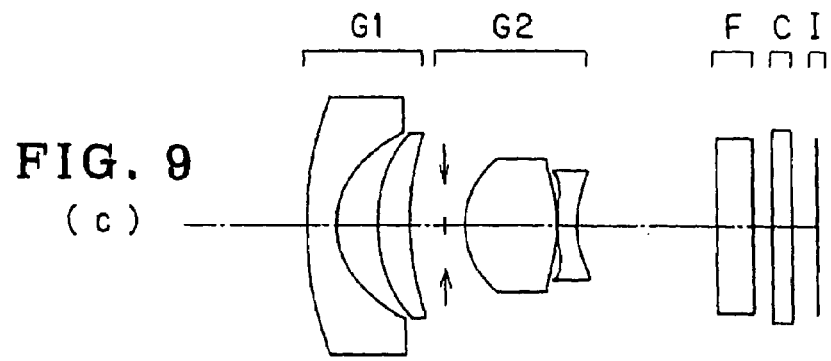

Example 9 is directed to a zoom lens consisting of the first lens group G1 having negative refracting power and the second lens group G2 having positive refracting power, as shown in FIG. 9. For zooming from the wide-angle end to the telephoto end of the zoom lens upon focused on an object point at infinity, the first lens group G1 moves to the image plane side and the second lens group G2 moves to the object side with a narrowing spacing between the first lens group G1 and the second lens group G2.

The first lens group G1 in Example 9 consists of a negative meniscus lens element convex on its object side and a positive meniscus lens element convex on its object side, and the second lens group G2 consists of a stop, a double-convex lens located in the rear thereof and a negative meniscus lens element convex on its object side. Aspheric surfaces are used at all of eight lens surfaces.

Figure 10:
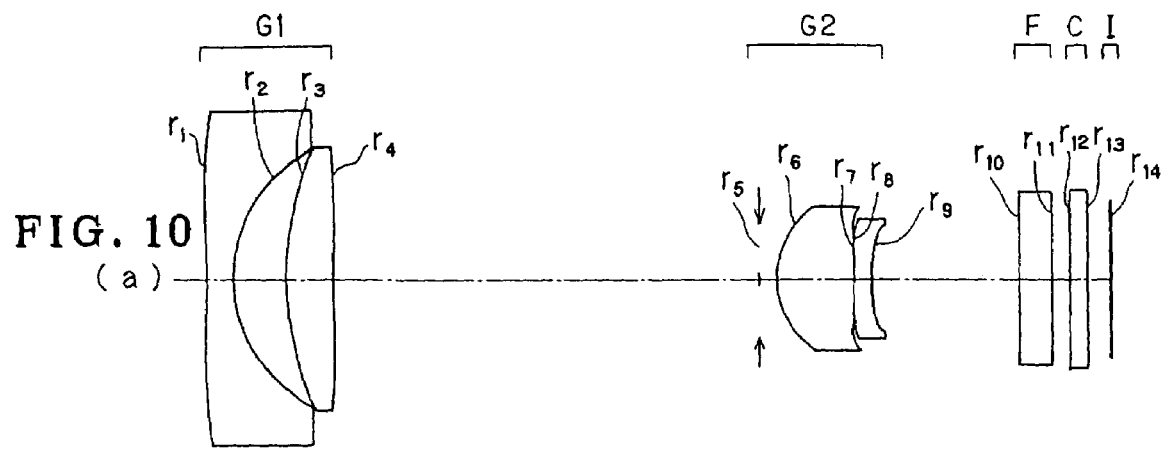
FIGS. 10(a) to 10(c) are sections in schematic illustrative of Example 10 of the zoom lens, similar to FIGS. 1(a) to 1(c).
Figure 10:
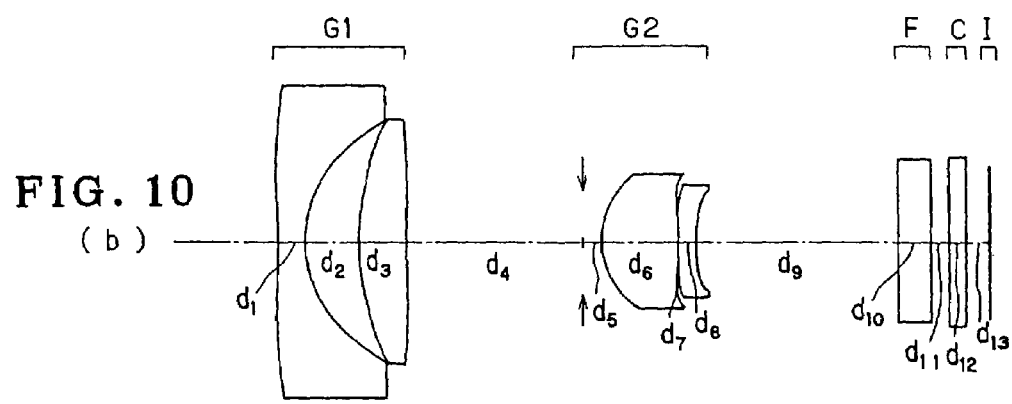
Figure 10:
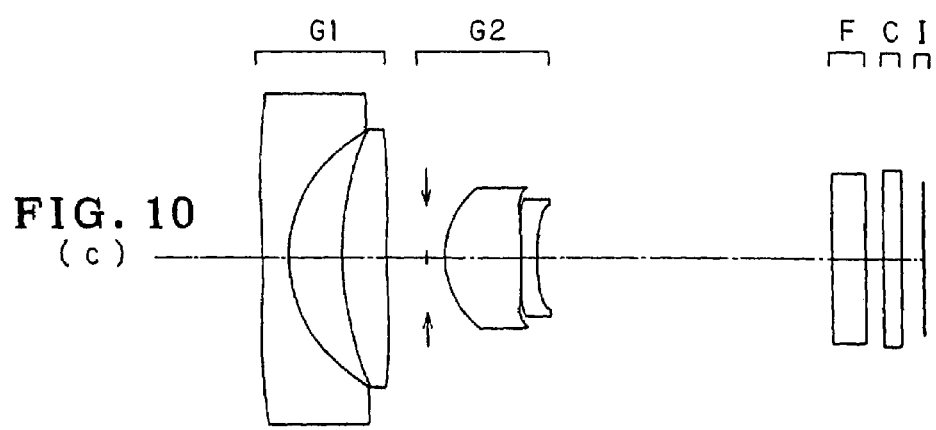

Example 10 is directed to a zoom lens consisting of the first lens group G1 having negative refracting power and the second lens group G2 having positive refracting power, as shown in FIG. 10. For zooming from the wide-angle end to the telephoto end of the zoom lens upon focused on an object point at infinity, the first lens group G1 moves to the image plane side and the second lens group G2 moves to the object side with a narrowing spacing between the first lens group G1 and the second lens group G2.

The first lens group G1 in Example 10 consists of a double-concave lens element and a positive meniscus lens element convex on its object side, and the second lens group G2 consists of a stop, a double-convex lens element located in the rear thereof and a double-concave lens element. Aspheric surfaces are used at all of eight lens surfaces.

Figure 11:
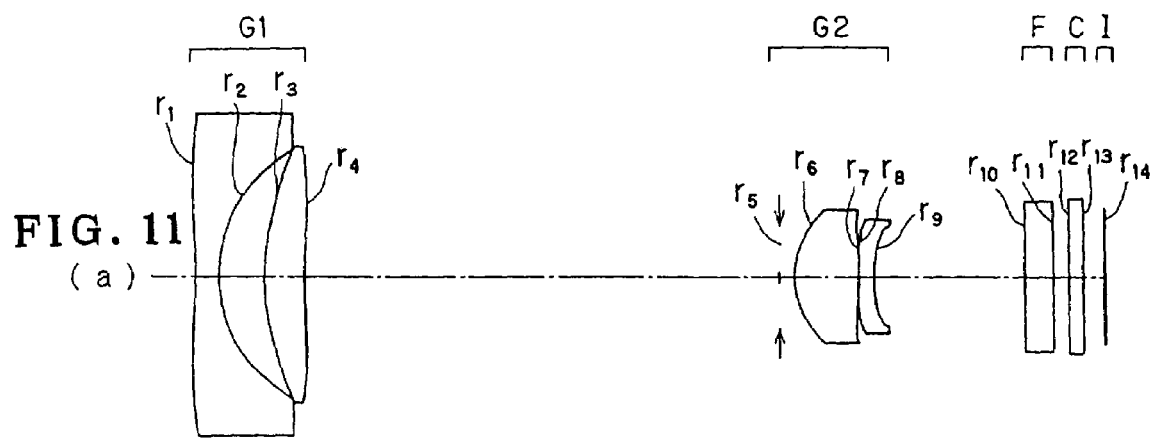
FIGS. 11(a) to 11(c) are sections in schematic illustrative of Example 11 of the zoom lens, similar to FIGS. 1(a) to 1(c).
Figure 11:
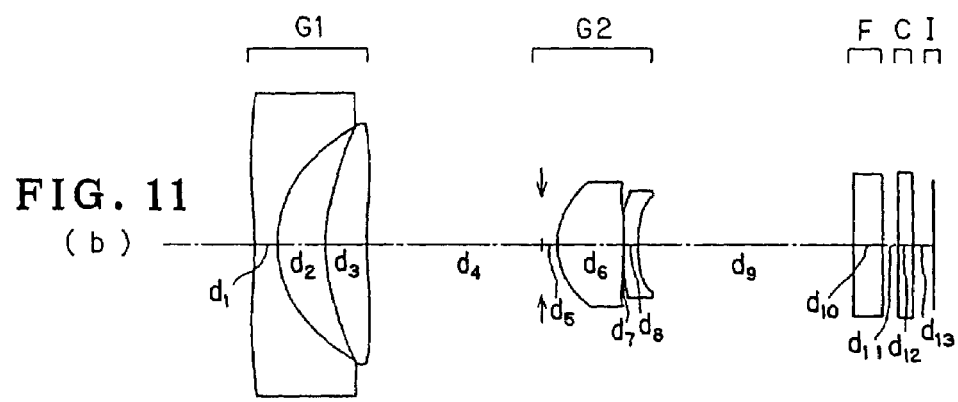
Figure 11:
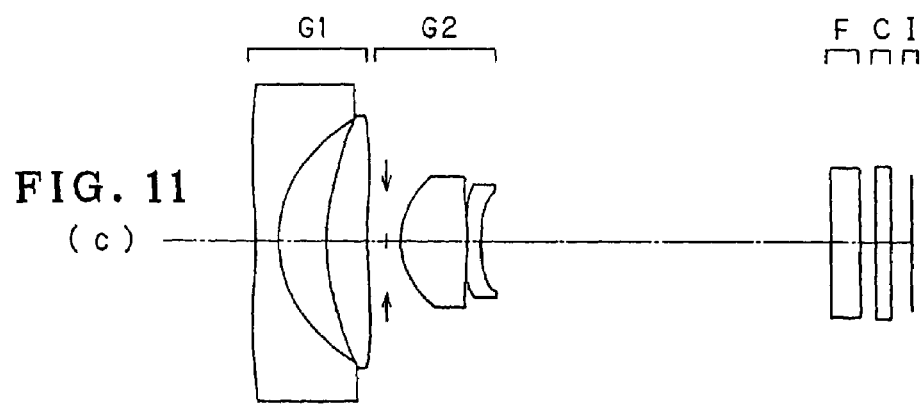

Example 11 is directed to a zoom lens consisting of the first lens group G1 having negative refracting power and the second lens group G2 having positive refracting power, as shown in FIG. 11. For zooming from the wide-angle end to the telephoto end of the zoom lens upon focused on an object point at infinity, the first lens group G1 moves to the image plane side and the second lens group G2 moves to the object side with a narrowing spacing between the first lens group G1 and the second lens group G2.

The first lens group G1 in Example 11 consists of a double-concave lens element and a positive meniscus lens element convex on its object side, and the second lens group G2 consists of a stop, a double-convex lens element located in the rear thereof and a double-concave lens element. Aspheric surfaces are used at all of eight lens surfaces.

Figure 12:
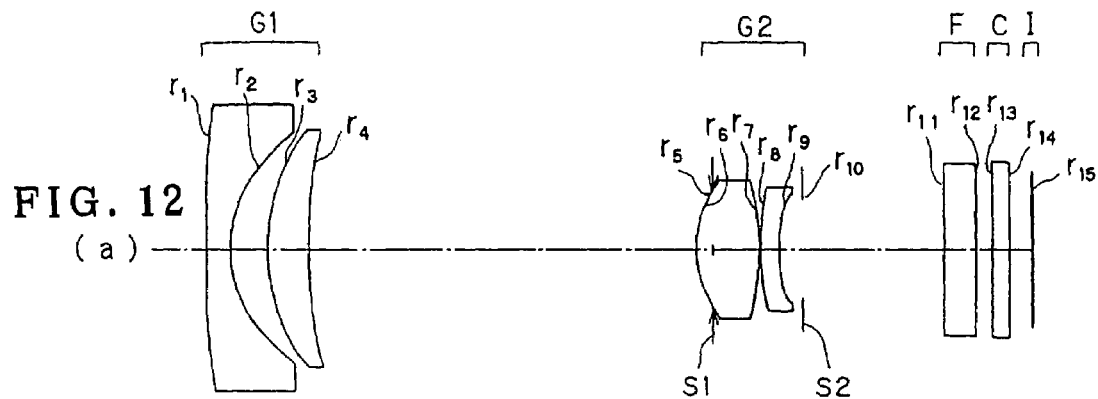
FIGS. 12(a) to 12(c) are sections in schematic illustrative of Example 12 of the zoom lens, similar to FIGS. 1(a) to 1(c).
Figure 12:
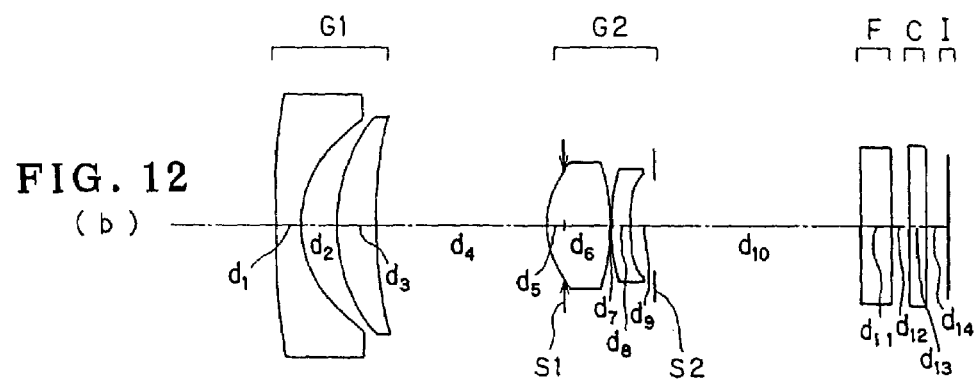
Figure 12:
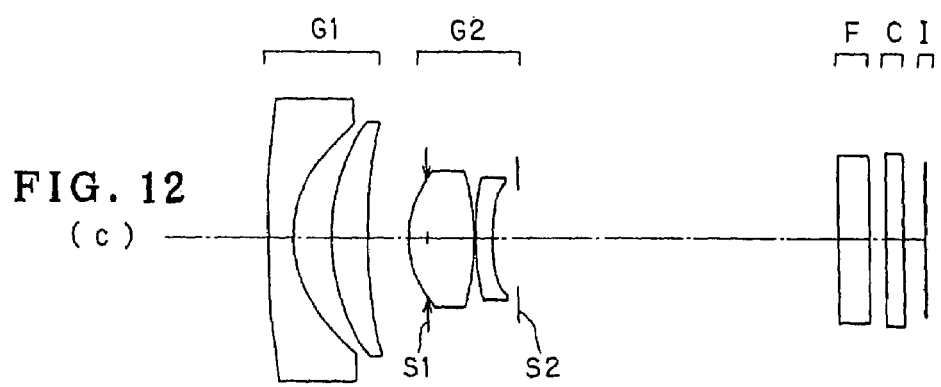
Figure 13A:
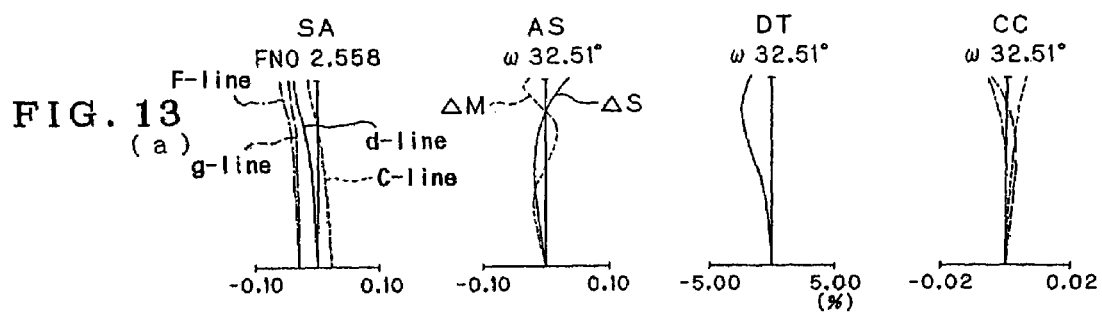
FIGS. 13(a) to 13(c) are aberration diagrams of Example 1 upon focused on an object point at infinity.
Figure 13B:
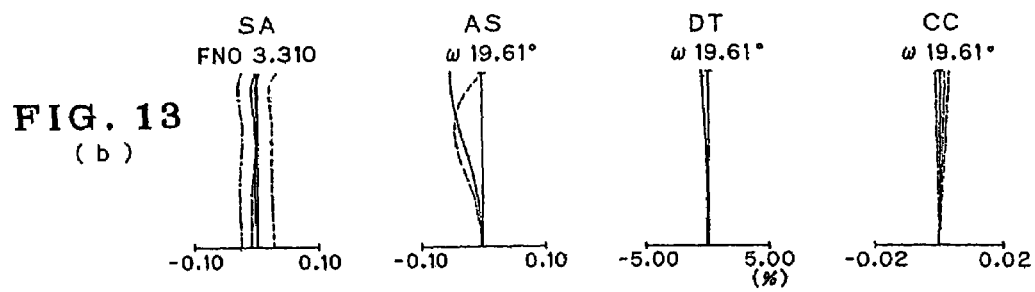
Figure 13C:
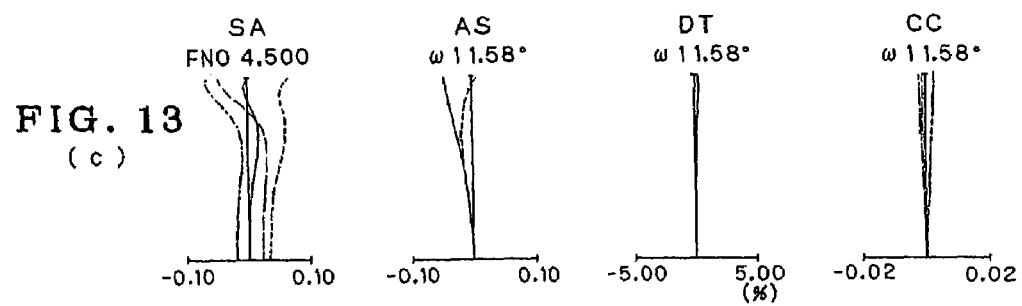
Figure 14:
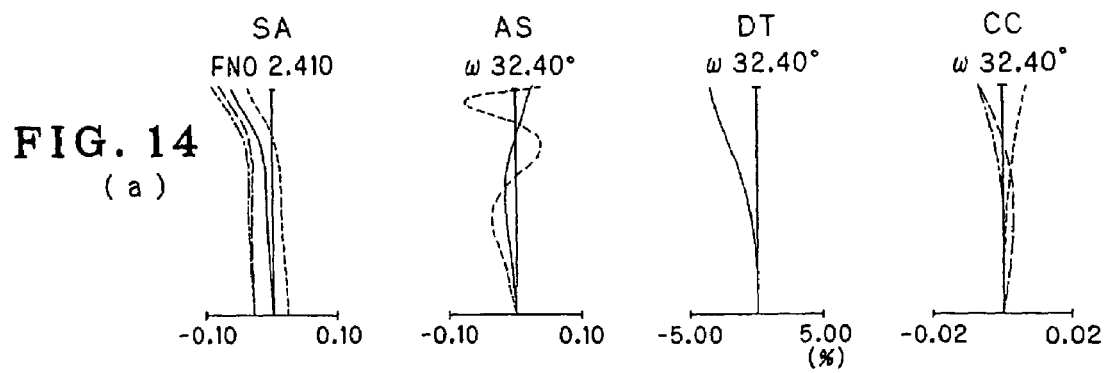
FIGS. 14(a) to 14(c) are aberration diagrams of Example 2 upon focused on an object point at infinity.
Figure 14:
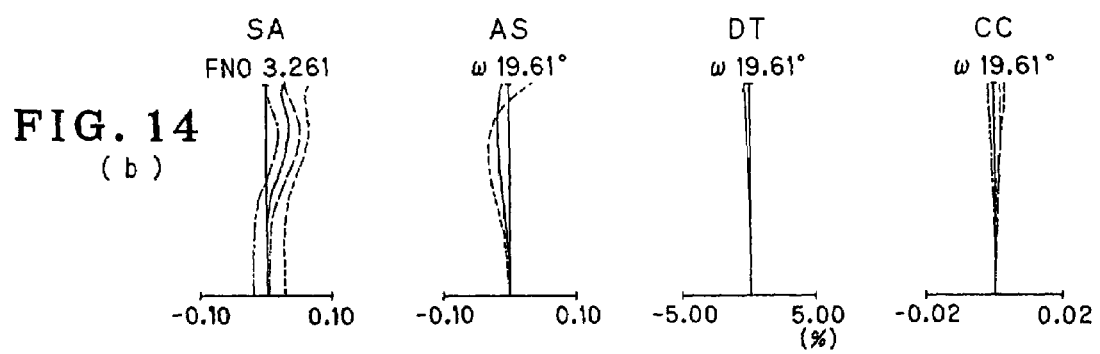
Figure 14:
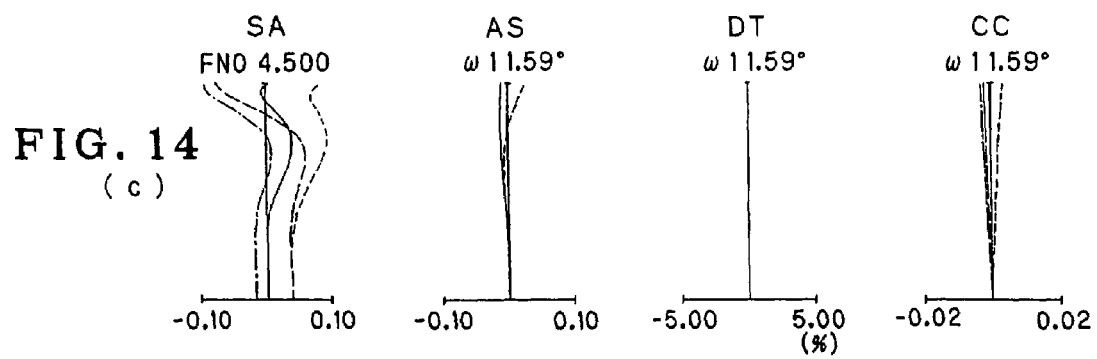
Figure 15:
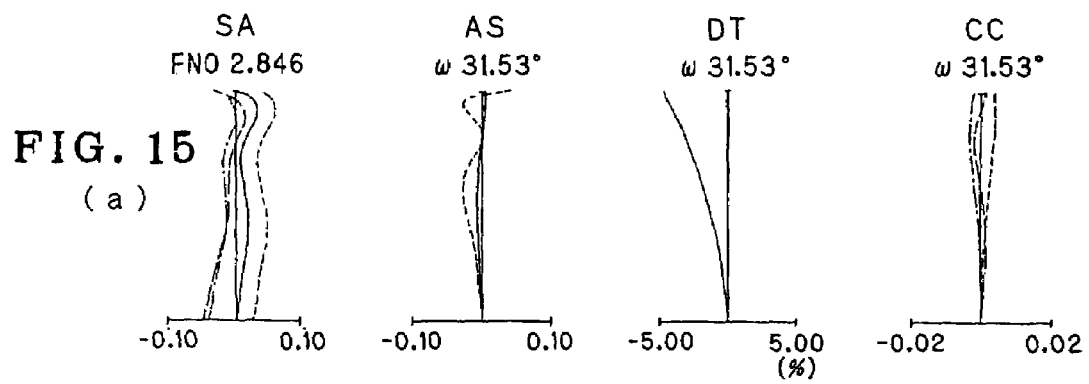
FIGS. 15(a) to 15(c) are aberration diagrams of Example 3 upon focused on an object point at infinity.
Figure 15:
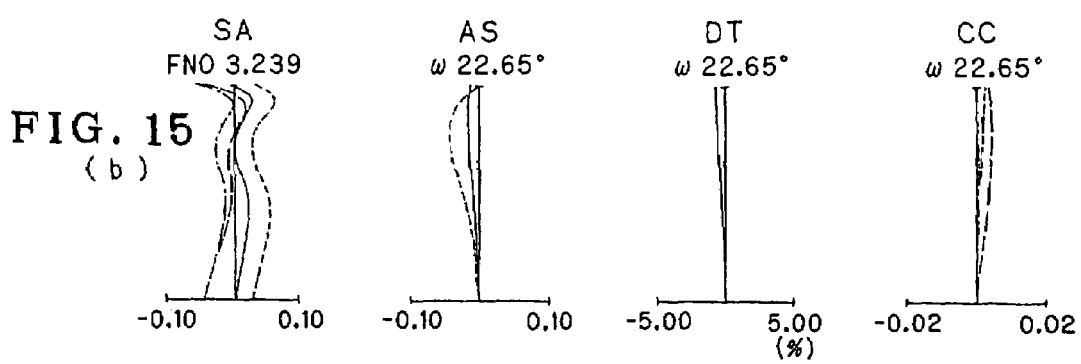
Figure 15:
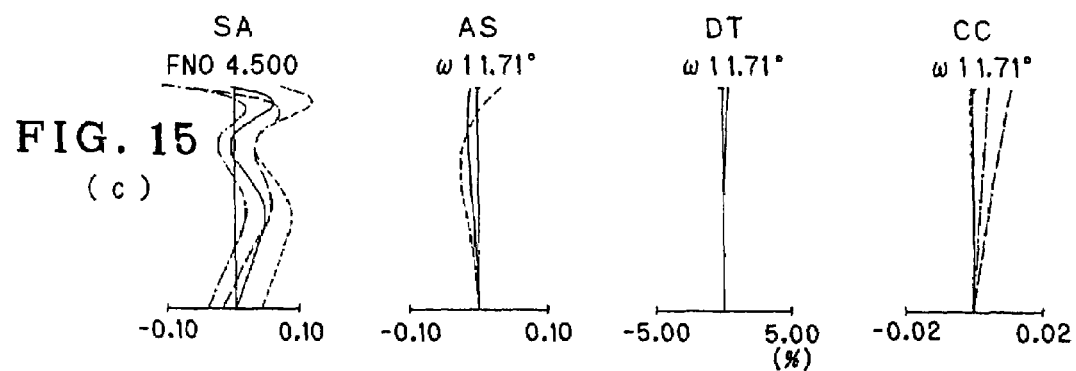
Figure 16:
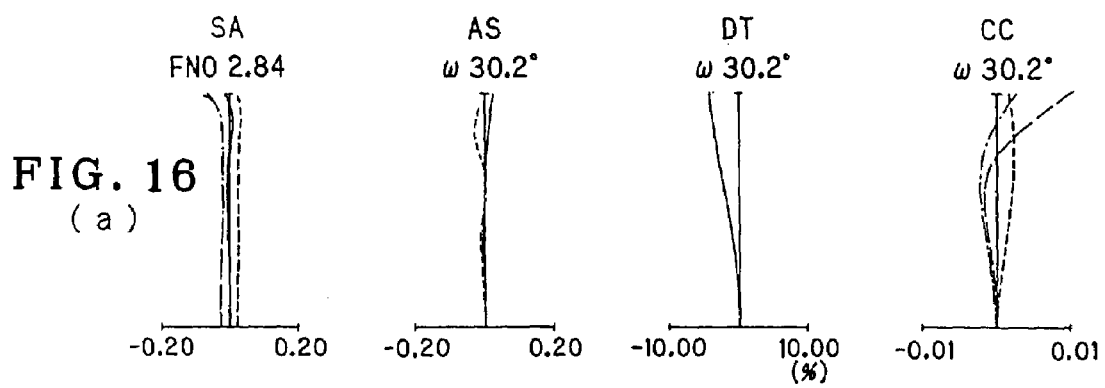
FIGS. 16(a) to 16(c) are aberration diagrams of Example 5 upon focused on an object point at infinity.
Figure 16:
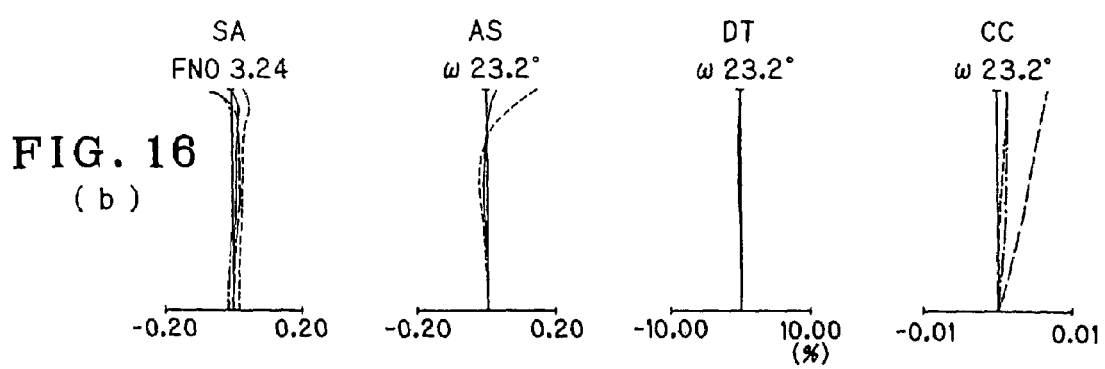
Figure 16:
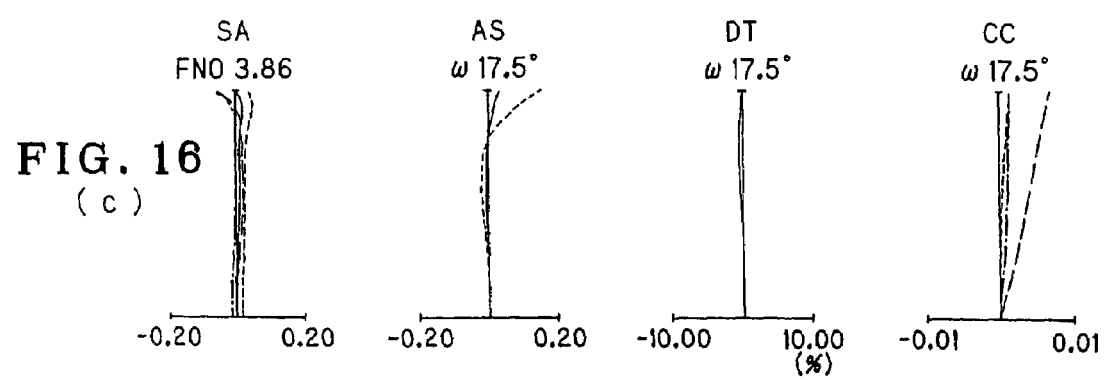
Figure 17:
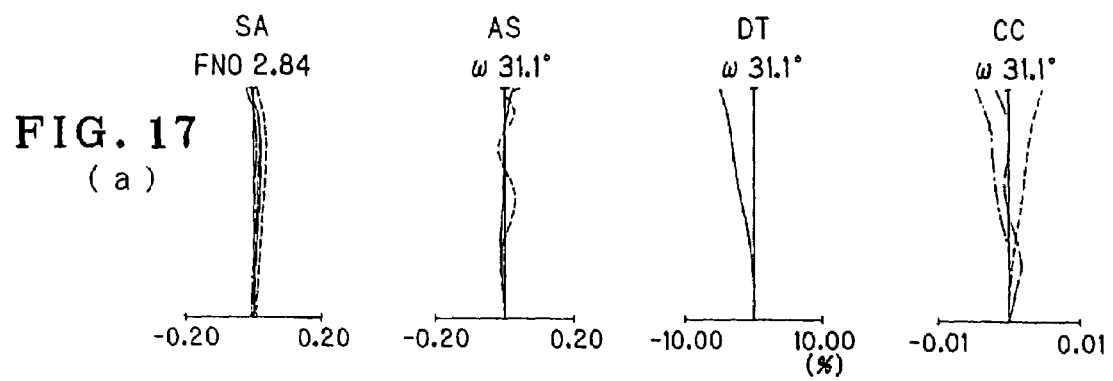
FIGS. 17(a) to 17(c) are aberration diagrams of Example 6 upon focused on an object point at infinity.
Figure 17:
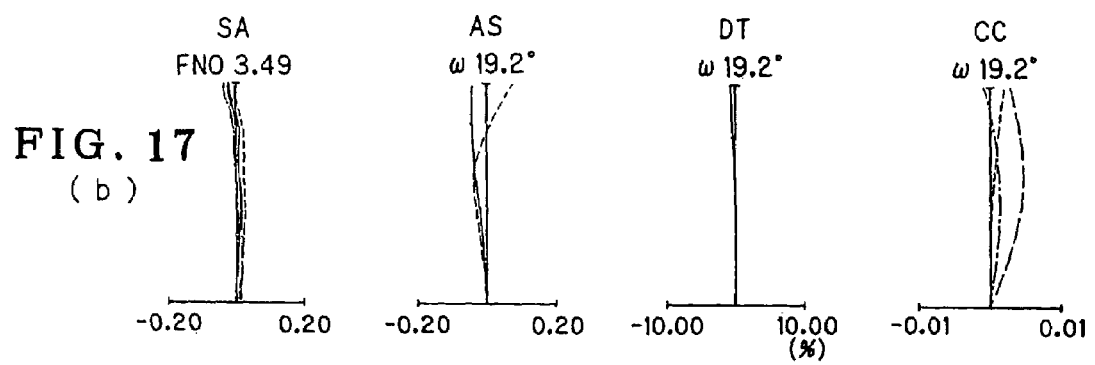
Figure 17:
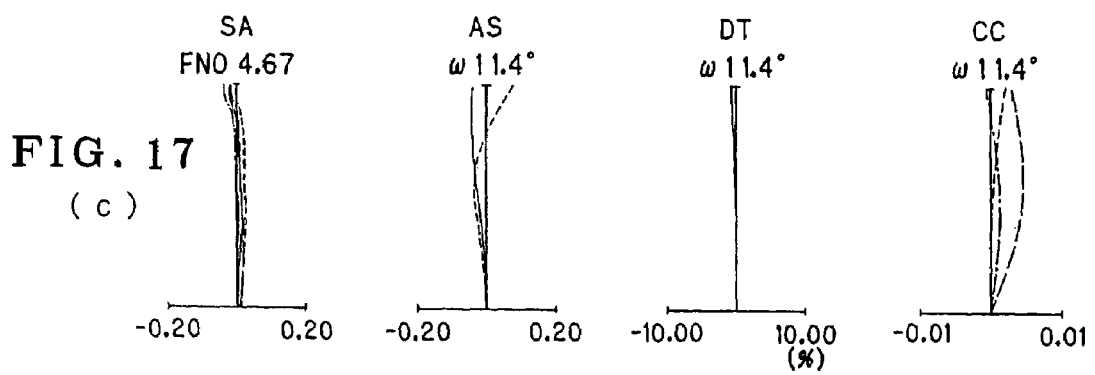
Figure 18:
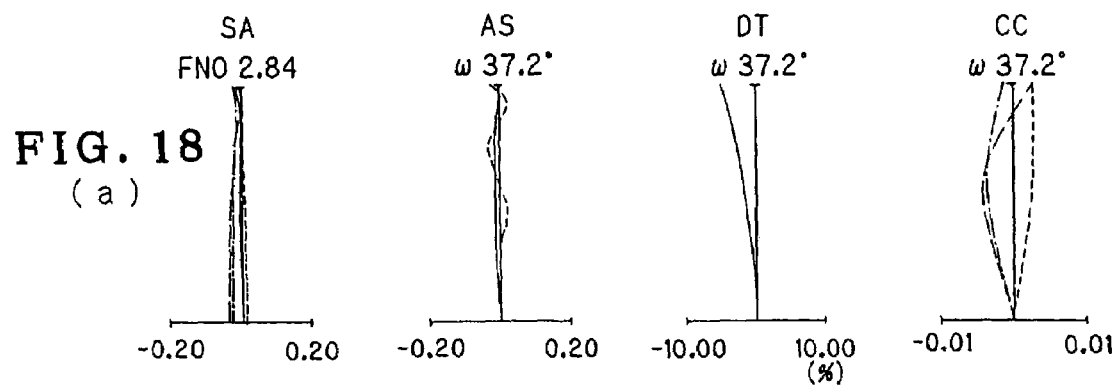
FIGS. 18(a) to 18(c) are aberration diagrams of Example 9 upon focused on an object point at infinity.
Figure 18:
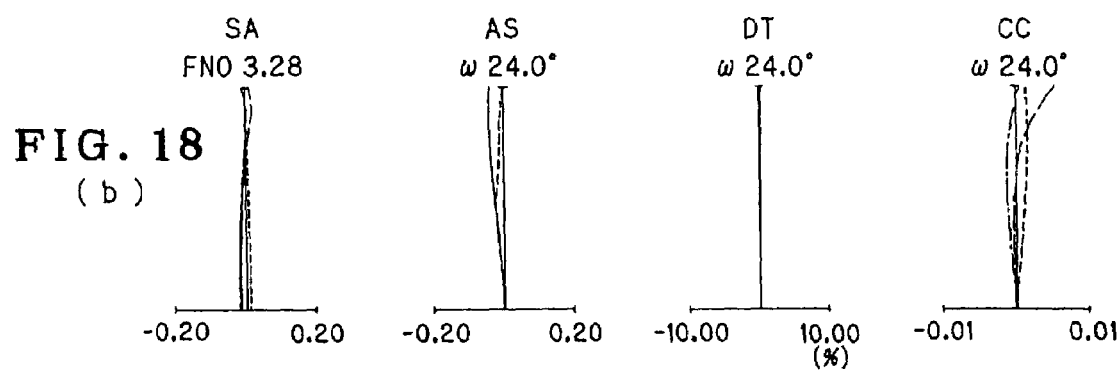
Figure 18:
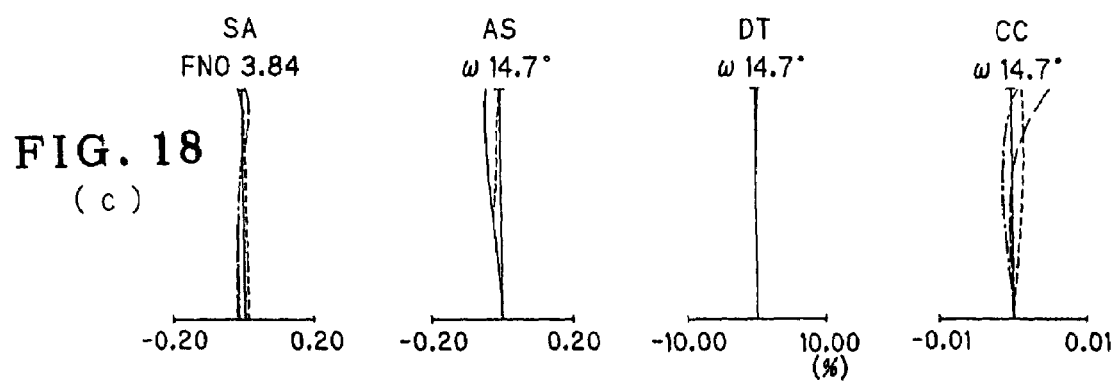
Figure 19:
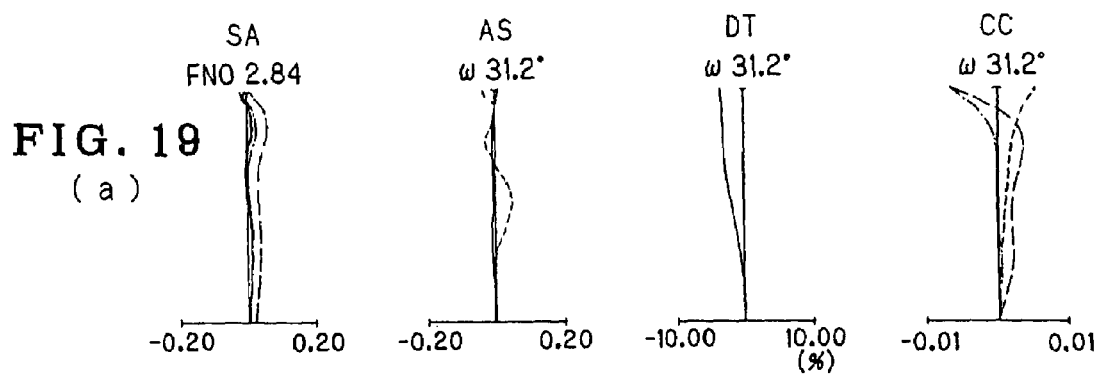
Figure 19:
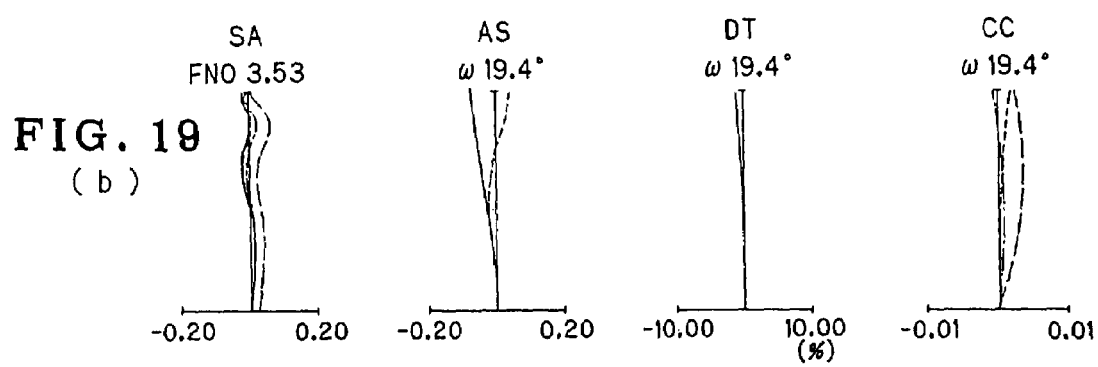
Figure 19:
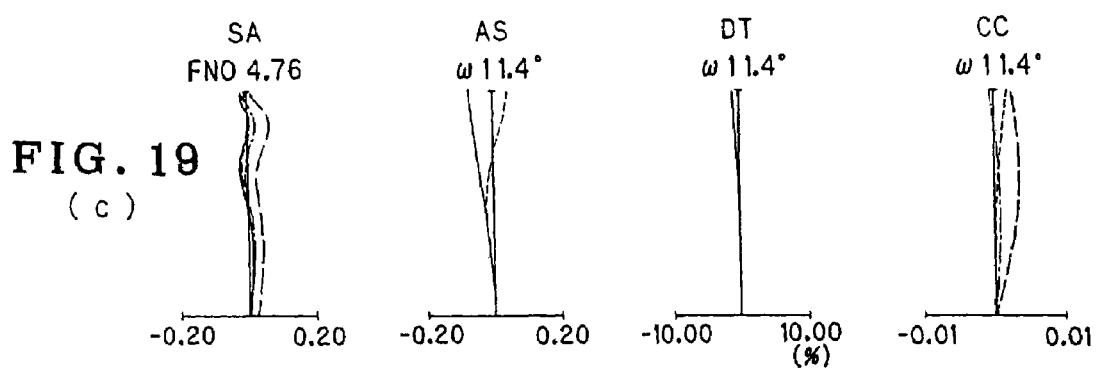

Example 12 is directed to a zoom lens consisting of the first lens group G1 having negative refracting power and the second lens group G2 having positive refracting power, as shown in FIG. 12. For zooming from the wide-angle end to the telephoto end of the zoom lens upon focused on an object point at infinity, the first lens group G1 moves to the image plane side and the second lens group G2 moves to the object side with a narrowing spacing between the first lens group G1 and the second lens group G2.

The first lens group G1 in Example 12 consists of a double-concave lens element and a positive meniscus lens element convex on its object side. The second lens group G2 consists of a fixed stop S1 having a fixed numerical aperture, a double-convex lens element located in the rear thereof, a double-concave lens element and a shutter or a light quantity control filter S2 located in the rear thereof (referred to as the shutter in the numerical data that will be enumerated later). Aspheric surfaces are used at all of eight lens surfaces.

It is here noted that the value of $\alpha/\beta$ in the aforesaid condition (24) is $\alpha/\beta = 0.395$ and the value of $\phi\beta/\phi\alpha$ in condition (25) is $\phi\beta/\phi\alpha = 0.827$.

Set out below are the numerical data on each example. Symbols used hereinafter but not hereinbefore have the following meanings:
f: focal length of the zoom lens
$F_{NO}$: F-number
$2\omega$: field angle
WE: wide-angle end
ST: standard or intermediate state
TE: telephoto end
$r_1, r_2, \ldots$: radius of curvature of each lens element
$d_1, d_2, \ldots$: spacing between the adjacent lens elements
$n_{d1}, n_{d2}, \ldots$: d-line refractive index of each lens element
$\nu_{d1}, \nu_{d2}, \ldots$: Abbe constant of each lens element Here let x be an optical axis on condition that the direction of propagation of light is positive and y be a direction perpendicular to the optical axis. Then, aspheric configuration is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4, A_6, A_8$ and $A_{10}$ are the fourth, sixth, eighth and tenth aspheric coefficients, respectively.

EXAMPLE 1

| | | | |
|---|---|---|---|
| $r_1 = 26.2927$ | $d_1 = 0.8000$ | $n_{d1} = 1.80610$ | $\nu_{d1} = 40.92$ |
| $r_2 = 9.0883$ (Aspheric) | $d_2 = 0.6148$ | | |
| $r_3 = 14.1944$ | $d_3 = 0.8334$ | $n_{d2} = 1.77250$ | $\nu_{d2} = 49.60$ |
| $r_4 = 6.9111$ | $d_4 = 2.8837$ | | |
| $r_5 = 10.5856$ | $d_5 = 1.7959$ | $n_{d3} = 1.84666$ | $\nu_{d3} = 23.78$ |
| $r_6 = 20.0441$ | $d_6 =$ (Variable) | | |
| $r_7 = \infty$ (Stop) | $d_7 = 0.8000$ | | |
| $r_8 = 5.4545$ (Aspheric) | $d_8 = 3.7931$ | $n_{d4} = 1.72916$ | $\nu_{d4} = 54.68$ |
| $r_9 = -20.9087$ | $d_9 = 0.0998$ | | |
| $r_{10} = 47.4258$ | $d_{10} = 0.8000$ | $n_{d5} = 1.84666$ | $\nu_{d5} = 23.78$ |
| $r_{11} = 6.1276$ (Aspheric) | $d_{11} =$ (Variable) | | |
| $r_{12} = 18.7959$ | $d_{12} = 1.4434$ | $n_{d6} = 1.72916$ | $\nu_{d6} = 54.68$ |
| $r_{13} = 551.0655$ | $d_{13} =$ (Variable) | | |
| $r_{14} = \infty$ | $d_{14} = 1.4400$ | $n_{d7} = 1.54771$ | $\nu_{d7} = 62.84$ |
| $r_{15} = \infty$ | $d_{15} = 0.8000$ | | |
| $r_{16} = \infty$ | $d_{16} = 0.8000$ | $n_{d8} = 1.51633$ | $\nu_{d8} = 64.14$ |
| $r_{17} = \infty$ | $d_{17} = 1.0000$ | | |
| $r_{18} = \infty$ (Image Plane) | | | |

Aspherical Coefficients

2nd surface $K = 0$
$A_4 = -2.0473 \times 10^{-4}$
$A_6 = -6.7749 \times 10^{-8}$
$A_8 = -7.7201 \times 10^{-8}$
$A_{10} = 3.8688 \times 10^{-10}$ 8th surface $K = 0$
$A_4 = -1.6034 \times 10^{-4}$
$A_6 = -1.7070 \times 10^{-5}$
$A_8 = 8.1032 \times 10^{-7}$
$A_{10} = -7.1759 \times 10^{-8}$ 11th surface $K = 0$
$A_4 = 1.9918 \times 10^{-3}$
$A_6 = 6.2296 \times 10^{-5}$
$A_8 = 1.1863 \times 10^{-5}$
$A_{10} = -1.3691 \times 10^{-7}$ Zooming Data ($\infty$)

| | WE | ST | TE |
|---|---|---|---|
| f (mm) | 5.20857 | 9.31762 | 16.19691 |
| $F_{NO}$ | 2.5577 | 3.3111 | 4.5000 |
| $2\omega$ (°) | 65.03 | 39.22 | 23.17 |
| $d_6$ | 18.99871 | 7.84626 | 1.45849 |
| $d_{11}$ | 3.77564 | 8.60826 | 15.35061 |
| $d_{13}$ | 2.44254 | 1.88102 | 1.85510 |

EXAMPLE 2

| | | | |
|---|---|---|---|
| $r_1 = 1148.3249$ | $d_1 = 1.2000$ | $n_{d1} = 1.80610$ | $\nu_{d1} = 40.92$ |
| $r_2 = 6.1717$ (Aspheric) | $d_2 = 3.7760$ | | |
| $r_3 = 15.4134$ | $d_3 = 1.5933$ | $n_{d2} = 1.84666$ | $\nu_{d2} = 23.78$ |
| $r_4 = 70.9107$ | $d_4 = $ (Variable) | | |
| $r_5 = \infty$ (Stop) | $d_5 = 0.8000$ | | |
| $r_6 = 6.0352$ (Aspheric) | $d_6 = 5.2334$ | $n_{d3} = 1.72916$ | $\nu_{d3} = 54.68$ |
| $r_7 = -13.5021$ | $d_7 = 0.1639$ | | |
| $r_8 = -69.4120$ | $d_8 = 0.8000$ | $n_{d4} = 1.84666$ | $\nu_{d4} = 23.78$ |
| $r_9 = 6.8167$ (Aspheric) | $d_9 = $ (Variable) | | |
| $r_{10} = 34.9998$ | $d_{10} = 1.5217$ | $n_{d5} = 1.72916$ | $\nu_{d5} = 54.68$ |
| $r_{11} = -32.6791$ | $d_{11} = $ (Variable) | | |
| $r_{12} = \infty$ | $d_{12} = 1.4400$ | $n_{d6} = 1.54771$ | $\nu_{d6} = 62.84$ |
| $r_{13} = \infty$ | $d_{13} = 0.8000$ | | |
| $r_{14} = \infty$ | $d_{14} = 0.8000$ | $n_{d7} = 1.51633$ | $\nu_{d7} = 64.14$ |
| $r_{15} = \infty$ | $d_{15} = 1.0000$ | | |
| $r_{16} = \infty$ (Image Plane) | | | |

Aspherical Coefficients

2nd surface $K = 0$
$A_4 = -5.1669 \times 10^{-4}$
$A_6 = -7.7150 \times 10^{-6}$
$A_8 = 1.6525 \times 10^{-7}$
$A_{10} = -1.2782 \times 10^{-8}$ 6th surface $K = 0$
$A_4 = -2.1967 \times 10^{-4}$
$A_6 = -1.5855 \times 10^{-5}$
$A_8 = 7.1172 \times 10^{-7}$
$A_{10} = -4.6968 \times 10^{-8}$ 9th surface $K = 0$
$A_4 = 1.7941 \times 10^{-3}$
$A_6 = 3.4075 \times 10^{-5}$
$A_8 = 1.1892 \times 10^{-5}$
$A_{10} = -6.1232 \times 10^{-7}$

Zooming Data ($\infty$)

| | WE | ST | TE |
|---|---|---|---|
| f (mm) | 5.23086 | 9.31792 | 16.19444 |
| $F_{NO}$ | 2.4099 | 3.2607 | 4.5000 |
| $2\omega$ (°) | 64.81 | 39.22 | 23.17 |
| $d_4$ | 18.04672 | 7.98753 | 1.45849 |
| $d_9$ | 2.79240 | 9.20000 | 16.71529 |
| $d_{11}$ | 3.16900 | 1.86959 | 1.81786 |

EXAMPLE 3

| | | | |
|---|---|---|---|
| $r_1 = 76.7196$ (Aspheric) | $d_1 = 1.2000$ | $n_{d1} = 1.78800$ | $\nu_{d1} = 47.37$ |
| $r_2 = 6.6378$ (Aspheric) | $d_2 = 3.0972$ | | |
| $r_3 = 10.9897$ (Aspheric) | $d_3 = 1.2062$ | $n_{d2} = 1.84666$ | $\nu_{d2} = 23.78$ |
| $r_4 = 18.4564$ (Aspheric) | $d_4 = $ (Variable) | | |
| $r_5 = \infty$ (Stop) | $d_5 = 0.8000$ | | |
| $r_6 = 5.1898$ (Aspheric) | $d_6 = 3.8593$ | $n_{d3} = 1.69350$ | $\nu_{d3} = 53.21$ |
| $r_7 = -9.7019$ (Aspheric) | $d_7 = 0.0000$ | | |
| $r_8 = -1.047 \times 10^5$ | $d_8 = 0.8000$ | $n_{d4} = 1.80518$ | $\nu_{d4} = 25.42$ |
| $r_9 = 5.8643$ (Aspheric) | $d_9 = $ (Variable) | | |
| $r_{10} = \infty$ | $d_{10} = 1.4400$ | $n_{d5} = 1.54771$ | $\nu_{d5} = 62.84$ |
| $r_{11} = \infty$ | $d_{11} = 0.8000$ | | |
| $r_{12} = \infty$ | $d_{12} = 0.8000$ | $n_{d6} = 1.51633$ | $\nu_{d6} = 64.14$ |
| $r_{13} = \infty$ | $d_{13} = 1.0000$ | | |
| $r_{14} = \infty$ (Image Plane) | | | |

Aspherical Coefficients

1st surface $K = 0$
$A_4 = 4.6231 \times 10^{-4}$
$A_6 = -9.3090 \times 10^{-6}$
$A_8 = 5.9496 \times 10^{-8}$
$A_{10} = 0$ 2nd surface $K = 0$
$A_4 = 2.2771 \times 10^{-4}$
$A_6 = -2.1739 \times 10^{-6}$
$A_8 = -3.9590 \times 10^{-7}$
$A_{10} = 0$ 3rd surface $K = 0$
$A_4 = -7.1846 \times 10^{-4}$
$A_6 = -1.2111 \times 10^{-5}$
$A_8 = -2.4843 \times 10^{-7}$
$A_{10} = 0$ 4th surface $K = 0$
$A_4 = -7.1646 \times 10^{-4}$
$A_6 = -1.4283 \times 10^{-5}$
$A_8 = -4.2107 \times 10^{-8}$
$A_{10} = 0$ 6th surface $K = 0$
$A_4 = -6.7488 \times 10^{-4}$
$A_6 = -1.4547 \times 10^{-5}$
$A_8 = -8.4502 \times 10^{-6}$
$A_{10} = 0$ 7th surface $K = 0$
$A_4 = -1.2345 \times 10^{-3}$
$A_6 = -2.0213 \times 10^{-5}$
$A_8 = -4.5953 \times 10^{-9}$
$A_{10} = 0$ 9th surface $K = 0$
$A_4 = 3.6259 \times 10^{-3}$
$A_6 = 2.3086 \times 10^{-4}$
$A_8 = 2.6515 \times 10^{-6}$
$A_{10} = 0$

Zooming Data ($\infty$)

| | WE | ST | TE |
|---|---|---|---|
| f (mm) | 5.41072 | 7.95613 | 16.01169 |
| $F_{NO}$ | 2.8455 | 3.2387 | 4.5000 |
| $2\omega$ (°) | 63.07 | 45.30 | 23.43 |
| $d_4$ | 19.41025 | 10.42151 | 0.80861 |
| $d_9$ | 6.59089 | 8.30259 | 13.69450 |

EXAMPLE 4

| | | | |
|---|---|---|---|
| $r_1 = 31.3163$ (Aspheric) | $d_1 = 1.2000$ | $n_{d1} = 1.78800$ | $\nu_{d1} = 47.37$ |
| $r_2 = 6.3077$ (Aspheric) | $d_2 = $ (Variable) | | |
| $r_3 = 15.6288$ (Aspheric) | $d_3 = 1.6305$ | $n_{d2} = 1.84666$ | $\nu_{d2} = 23.78$ |

-continued

| | | | |
|---|---|---|---|
| $r_4 = 29.8364$ (Aspheric) | $d_4$ = (Variable) | | |
| $r_5 = \infty$ (Stop) | $d_5 = 0.8000$ | | |
| $r_6 = 6.1475$ (Aspheric) | $d_6 = 4.3722$ | $n_{d3} = 1.69350$ | $\nu_{d3} = 53.21$ |
| $r_7 = -7.5487$ (Aspheric) | $d_7 = 0.0000$ | | |
| $r_8 = 1.278 \times 10^6$ (Aspheric) | $d_8 = 0.8000$ | $n_{d4} = 1.78472$ | $\nu_{d4} = 25.68$ |
| $r_9 = 6.1534$ (Aspheric) | $d_9$ = (Variable) | | |
| $r_{10} = \infty$ | $d_{10} = 1.4400$ | $n_{d5} = 1.54771$ | $\nu_{d5} = 62.84$ |
| $r_{11} = \infty$ | $d_{11} = 0.8000$ | | |
| $r_{12} = \infty$ | $d_{12} = 0.8000$ | $n_{d6} = 1.51633$ | $\nu_{d6} = 64.14$ |
| $r_{13} = \infty$ | $d_{13} = 1.0000$ | | |
| $r_{14} = \infty$ (Image Plane) | | | |

Aspherical Coefficients

1st surface $K = 0$
$A_4 = 2.1781 \times 10^{-4}$
$A_6 = -2.4700 \times 10^{-6}$
$A_8 = 6.7661 \times 10^{-9}$
$A_{10} = 0$ 2nd surface $K = 0$
$A_4 = 2.9274 \times 10^{-6}$
$A_6 = 5.4318 \times 10^{-7}$
$A_8 = -2.7932 \times 10^{-7}$
$A_{10} = 0$ 3rd surface $K = 0$
$A_4 = -6.8760 \times 10^{-4}$
$A_6 = -5.4772 \times 10^{-6}$
$A_8 = -2.7113 \times 10^{-7}$
$A_{10} = 0$ 4th surface $K = 0$
$A_4 = -7.6115 \times 10^{-4}$
$A_6 = -5.5172 \times 10^{-6}$
$A_8 = -1.2101 \times 10^{-7}$
$A_{10} = 0$ 6th surface $K = 0$
$A_4 = -7.9971 \times 10^{-4}$
$A_6 = -3.2700 \times 10^{-5}$
$A_8 = -5.6059 \times 10^{-6}$
$A_{10} = 0$ 7th surface $K = 0$
$A_4 = -6.4906 \times 10^{-4}$
$A_6 = -1.1601 \times 10^{-5}$
$A_8 = -1.3240 \times 10^{-7}$
$A_{10} = 0$ 8th surface $K = 0$
$A_4 = -1.3589 \times 10^{-5}$
$A_6 = 5.4041 \times 10^{-8}$
$A_8 = 2.3274 \times 10^{-6}$
$A_{10} = 0$ 9th surface $K = 0$
$A_4 = 2.3384 \times 10^{-3}$
$A_6 = 1.3074 \times 10^{-4}$
$A_8 = 3.0058 \times 10^{-9}$
$A_{10} = 0$ -continued

| Zooming Data ($\infty$) | | | |
|---|---|---|---|
| | WE | ST | TE |
| f (mm) | 5.52504 | 7.90361 | 15.98209 |
| $F_{NO}$ | 2.9283 | 3.2981 | 4.5000 |
| 2ω (°) | 62.00 | 45.57 | 23.47 |
| $d_2$ | 3.15754 | 2.83342 | 3.17975 |
| $d_4$ | 19.07192 | 10.96142 | 0.39391 |
| $d_9$ | 6.86971 | 8.50151 | 13.80700 |

EXAMPLE 5

| | | | |
|---|---|---|---|
| $r_1 = -12.193$ (Aspheric) | $d_1 = 1.20$ | $n_{d1} = 1.78800$ | $\nu_{d1} = 47.37$ |
| $r_2 = 10.585$ (Aspheric) | $d_2 = 1.14$ | | |
| $r_3 = 6.202$ (Aspheric) | $d_3 = 0.84$ | $n_{d2} = 1.84666$ | $\nu_{d2} = 23.78$ |
| $r_4 = 7.845$ (Aspheric) | $d_4$ = (Variable) | | |
| $r_5 = \infty$ (Stop) | $d_5 = 0.80$ | | |
| $r_6 = 3.456$ (Aspheric) | $d_6 = 3.10$ | $n_{d3} = 1.69350$ | $\nu_{d3} = 53.21$ |
| $r_7 = -5.866$ (Aspheric) | $d_7 = 0.00$ | | |
| $r_8 = 59.892$ (Aspheric) | $d_8 = 0.80$ | $n_{d4} = 1.80518$ | $\nu_{d4} = 25.42$ |
| $r_9 = 3.400$ (Aspheric) | $d_9$ = (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 7.28875 \times 10^{-3}$
$A_6 = -3.16079 \times 10^{-4}$
$A_8 = 5.59240 \times 10^{-6}$
$A_{10} = 0$ 2nd surface $K = 0.000$
$A_4 = 6.08993 \times 10^{-3}$
$A_6 = 7.92220 \times 10^{-4}$
$A_8 = -3.77695 \times 10^{-5}$
$A_{10} = 0$ 3rd surface $K = 0.000$
$A_4 = -8.25212 \times 10^{-3}$
$A_6 = 1.05654 \times 10^{-3}$
$A_8 = -5.98956 \times 10^{-5}$
$A_{10} = 0$ 4th surface $K = 0.000$
$A_4 = -8.12513 \times 10^{-3}$
$A_6 = 7.44821 \times 10^{-4}$
$A_8 = -4.70205 \times 10^{-5}$
$A_{10} = 0$ 6th surface $K = 0.000$
$A_4 = -5.56006 \times 10^{-4}$
$A_6 = 3.61032 \times 10^{-5}$
$A_8 = -1.57815 \times 10^{-5}$
$A_{10} = 0$ 7th surface $K = 0.000$
$A_4 = 2.56154 \times 10^{-3}$
$A_6 = -5.93015 \times 10^{-4}$
$A_8 = 8.21499 \times 10^{-5}$
$A_{10} = 0$ -continued 8th surface K = 0.000
$A_4 = -1.61498 \times 10^{-2}$
$A_6 = 2.62229 \times 10^{-4}$
$A_8 = 1.11700 \times 10^{-4}$
$A_{10} = 0$ 9th surface K = 0.000
$A_4 = -1.33711 \times 10^{-2}$
$A_6 = 1.83066 \times 10^{-3}$
$A_8 = 1.80922 \times 10^{-4}$
$A_{10} = 0$ Zooming Data (∞)

|  | WE | ST | TE |
|---|---|---|---|
| f (mm) | 5.700 | 7.600 | 10.500 |
| $F_{NO}$ | 2.84 | 3.24 | 3.86 |
| 2ω (°) | 60.4 | 46.4 | 35.0 |
| $d_4$ | 5.79 | 3.28 | 1.20 |
| $d_9$ | 3.55 | 4.78 | 6.67 |

EXAMPLE 6

| | | | |
|---|---|---|---|
| $r_1$ = 742.482 (Aspheric) | $d_1$ = 1.20 | $n_{d1}$ = 1.88300 | $ν_{d1}$ = 40.76 |
| $r_2$ = 5.785 (Aspheric) | $d_2$ = 1.66 | | |
| $r_3$ = 7.599 (Aspheric) | $d_3$ = 1.88 | $n_{d2}$ = 1.84666 | $ν_{d2}$ = 23.78 |
| $r_4$ = 16.421 (Aspheric) | $d_4$ = (Variable) | | |
| $r_5$ = ∞ (Stop) | $d_5$ = 0.80 | | |
| $r_6$ = 4.194 (Aspheric) | $d_6$ = 3.18 | $n_{d3}$ = 1.49700 | $ν_{d3}$ = 81.54 |
| $r_7$ = −20.581 (Aspheric) | $d_7$ = 0.00 | | |
| $r_8$ = 13.506 (Aspheric) | $d_8$ = 0.80 | $n_{d4}$ = 1.84666 | $ν_{d4}$ = 23.78 |
| $r_9$ = 6.472 (Aspheric) | $d_9$ = (Variable) | | |
| $r_{10}$ = ∞ | $d_{10}$ = 1.44 | $n_{d5}$ = 1.54771 | $ν_{d5}$ = 62.84 |
| $r_{11}$ = ∞ | $d_{11}$ = 0.80 | | |
| $r_{12}$ = ∞ | $d_{12}$ = 0.80 | $n_{d6}$ = 1.51633 | $ν_{d6}$ = 64.14 |
| $r_{13}$ = ∞ | $d_{13}$ = 1.00 | | |
| $r_{14}$ = ∞ (Image Plane) | | | |

Aspherical Coefficients

1st surface

K = 0.000
$A_4 = 9.25825 \times 10^{-4}$
$A_6 = -2.08555 \times 10^{-5}$
$A_8 = 1.29524 \times 10^{-7}$
$A_{10} = 0$ 2nd surface K = 0.000
$A_4 = -1.75234 \times 10^{-4}$
$A_6 = 6.38980 \times 10^{-5}$
$A_8 = -2.65816 \times 10^{-6}$
$A_{10} = 0$ 3rd surface K = 0.000
$A_4 = -1.50510 \times 10^{-3}$
$A_6 = 3.91584 \times 10^{-5}$
$A_8 = -3.01945 \times 10^{-7}$
$A_{10} = 0$ 4th surface K = 0.000
$A_4 = -1.01332 \times 10^{-3}$
$A_6 = 1.61802 \times 10^{-5}$ -continued $A_8 = 1.03000 \times 10^{-7}$
$A_{10} = 0$ 6th surface K = 0.000
$A_4 = -7.98420 \times 10^{-4}$
$A_6 = -1.86068 \times 10^{-5}$
$A_8 = -2.94687 \times 10^{-6}$
$A_{10} = 0$ 7th surface K = 0.000
$A_4 = 2.17134 \times 10^{-3}$
$A_6 = -3.36530 \times 10^{-4}$
$A_8 = 2.23456 \times 10^{-5}$
$A_{10} = 0$ 8th surface K = 0.000
$A_4 = 3.99355 \times 10^{-3}$
$A_6 = -2.87967 \times 10^{-4}$
$A_8 = 1.70044 \times 10^{-5}$
$A_{10} = 0$ 9th surface K = 0.000
$A_4 = 5.40085 \times 10^{-3}$
$A_6 = -1.35135 \times 10^{-5}$
$A_8 = 3.54182 \times 10^{-5}$
$A_{10} = 0$ Zooming Data (∞)

|  | WE | ST | TE |
|---|---|---|---|
| f (mm) | 5.472 | 9.450 | 16.492 |
| $F_{NO}$ | 2.84 | 3.49 | 4.67 |
| 2ω (°) | 62.2 | 38.4 | 22.8 |
| $d_4$ | 19.39 | 9.00 | 2.90 |
| $d_9$ | 8.11 | 11.30 | 16.96 |

EXAMPLE 7

| | | | |
|---|---|---|---|
| $r_1$ = −79.529 (Aspheric) | $d_1$ = 1.20 | $n_{d1}$ = 1.88300 | $ν_{d1}$ = 40.76 |
| $r_2$ = 6.338 (Aspheric) | $d_2$ = 2.02 | | |
| $r_3$ = 9.087 (Aspheric) | $d_3$ = 2.14 | $n_{d2}$ = 1.84666 | $ν_{d2}$ = 23.78 |
| $r_4$ = 25.643 (Aspheric) | $d_4$ = (Variable) | | |
| $r_5$ = ∞ (Stop) | $d_5$ = 0.80 | | |
| $r_6$ = 4.591 (Aspheric) | $d_6$ = 3.76 | $n_{d3}$ = 1.49700 | $ν_{d3}$ = 81.54 |
| $r_7$ = −19.255 (Aspheric) | $d_7$ = 0.00 | | |
| $r_8$ = 13.328 (Aspheric) | $d_8$ = 0.80 | $n_{d4}$ = 1.84666 | $ν_{d4}$ = 23.78 |
| $r_9$ = 6.340 (Aspheric) | $d_9$ = (Variable) | | |
| $r_{10}$ = ∞ | $d_{10}$ = 1.44 | $n_{d5}$ = 1.54771 | $ν_{d5}$ = 62.84 |
| $r_{11}$ = ∞ | $d_{11}$ = 0.80 | | |
| $r_{12}$ = ∞ | $d_{12}$ = 0.80 | $n_{d6}$ = 1.51633 | $ν_{d6}$ = 64.14 |
| $r_{13}$ = ∞ | $d_{13}$ = 1.00 | | |
| $r_{14}$ = ∞ (Image Plane) | | | |

Aspherical Coefficients

1st surface

K = 0.000
$A_4 = 6.90799 \times 10^{-4}$
$A_6 = -1.17782 \times 10^{-5}$
$A_8 = 4.88182 \times 10^{-8}$
$A_{10} = 0$ 2nd surface K = 0.000
$A_4 = -4.06939 \times 10^{-4}$ -continued $A_6 = 4.52557 \times 10^{-5}$
$A_8 = -1.51312 \times 10^{-6}$
$A_{10} = 0$ 3rd surface $K = 0.000$
$A_4 = -1.03153 \times 10^{-3}$
$A_6 = 2.22306 \times 10^{-5}$
$A_8 = -2.57487 \times 10^{-7}$
$A_{10} = 0$ 4th surface $K = 0.000$
$A_4 = -5.56360 \times 10^{-4}$
$A_6 = 4.49314 \times 10^{-6}$
$A_8 = 1.08906 \times 10^{-8}$
$A_{10} = 0$ 6th surface $K = 0.000$
$A_4 = -5.80555 \times 10^{-4}$
$A_6 = -3.39765 \times 10^{-6}$
$A_8 = -2.44132 \times 10^{-6}$
$A_{10} = 0$ 7th surface $K = 0.000$
$A_4 = 2.25406 \times 10^{-3}$
$A_6 = -2.80904 \times 10^{-4}$
$A_8 = 1.27498 \times 10^{-5}$
$A_{10} = 0$ 8th surface $K = 0.000$
$A_4 = 2.85554 \times 10^{-3}$
$A_6 = -2.15203 \times 10^{-4}$
$A_8 = 8.69324 \times 10^{-6}$
$A_{10} = 0$ 9th surface $K = 0.000$
$A_4 = 3.48116 \times 10^{-3}$
$A_6 = 3.63247 \times 10^{-6}$
$A_8 = 1.69137 \times 10^{-5}$
$A_{10} = 0$

| Zooming Data (∞) | | | |
|---|---|---|---|
| | WE | ST | TE |
| f (mm) | 5.500 | 11.000 | 22.000 |
| $F_{NO}$ | 2.84 | 3.73 | 5.53 |
| 2ω (°) | 62.2 | 33.6 | 17.2 |
| $d_4$ | 23.03 | 8.67 | 1.49 |
| $d_9$ | 9.02 | 13.72 | 23.11 |

EXAMPLE 8

| | | | |
|---|---|---|---|
| $r_1 = -60.278$ (Aspheric) | $d_1 = 1.20$ | $n_{d1} = 1.88300$ | $\nu_{d1} = 40.76$ |
| $r_2 = 7.222$ (Aspheric) | $d_2 = 2.07$ | | |
| $r_3 = 8.952$ (Aspheric) | $d_3 = 2.08$ | $n_{d2} = 1.84666$ | $\nu_{d2} = 23.78$ |
| $r_4 = 22.635$ (Aspheric) | $d_4$ = (Variable) | | |
| $r_5 = \infty$ (Stop) | $d_5 = 0.80$ | | |
| $r_6 = 4.814$ (Aspheric) | $d_6 = 3.81$ | $n_{d3} = 1.49700$ | $\nu_{d3} = 81.54$ |
| $r_7 = -24.368$ (Aspheric) | $d_7 = 0.00$ | | |
| $r_8 = 12.210$ (Aspheric) | $d_8 = 0.80$ | $n_{d4} = 1.84666$ | $\nu_{d4} = 23.78$ |
| $r_9 = 6.177$ (Aspheric) | $d_9$ = (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

-continued

Aspherical Coefficients

1st surface $K = 0.000$
$A_4 = 6.00951 \times 10^{-4}$
$A_6 = -8.43631 \times 10^{-6}$
$A_8 = 3.37449 \times 10^{-8}$
$A_{10} = 0$ 2nd surface $K = 0.000$
$A_4 = -3.72010 \times 10^{-4}$
$A_6 = 2.79016 \times 10^{-5}$
$A_8 = -6.20166 \times 10^{-7}$
$A_{10} = 0$ 3rd surface $K = 0.000$
$A_4 = -1.09669 \times 10^{-3}$
$A_6 = 1.28385 \times 10^{-5}$
$A_8 = -4.91592 \times 10^{-8}$
$A_{10} = 0$ 4th surface $K = 0.000$
$A_4 = -6.10641 \times 10^{-4}$
$A_6 = 3.03012 \times 10^{-6}$
$A_8 = 3.35101 \times 10^{-8}$
$A_{10} = 0$ 6th surface $K = 0.000$
$A_4 = -3.63773 \times 10^{-4}$
$A_6 = -1.22811 \times 10^{-5}$
$A_8 = -8.74615 \times 10^{-7}$
$A_{10} = 0$ 7th surface $K = 0.000$
$A_4 = 1.68273 \times 10^{-3}$
$A_6 = -1.42484 \times 10^{-4}$
$A_8 = 6.05817 \times 10^{-6}$
$A_{10} = 0$ 8th surface $K = 0.000$
$A_4 = 1.58428 \times 10^{-3}$
$A_6 = -8.00129 \times 10^{-6}$
$A_8 = -1.87986 \times 10^{-6}$
$A_{10} = 0$ 9th surface $K = 0.000$
$A_4 = 2.15661 \times 10^{-3}$
$A_6 = 1.52232 \times 10^{-4}$
$A_8 = 2.48220 \times 10^{-6}$
$A_{10} = 0$

| Zooming Data (∞) | | | |
|---|---|---|---|
| | WE | ST | TE |
| f (mm) | 5.500 | 11.870 | 26.600 |
| $F_{NO}$ | 2.84 | 3.79 | 6.02 |
| 2ω (°) | 62.2 | 30.6 | 14.2 |
| $d_4$ | 29.63 | 10.40 | 1.20 |
| $d_9$ | 9.74 | 15.00 | 27.15 |

EXAMPLE 9

| | | | |
|---|---|---|---|
| $r_1 = 72.039$ (Aspheric) | $d_1 = 1.20$ | $n_{d1} = 1.88300$ | $\nu_{d1} = 40.76$ |
| $r_2 = 4.217$ (Aspheric) | $d_2 = 1.62$ | | |
| $r_3 = 5.885$ (Aspheric) | $d_3 = 1.27$ | $n_{d2} = 1.84666$ | $\nu_{d2} = 23.78$ |
| $r_4 = 9.267$ (Aspheric) | $d_4 =$ (Variable) | | |
| $r_5 = \infty$ (Stop) | $d_5 = 0.80$ | | |
| $r_6 = 3.053$ (Aspheric) | $d_6 = 3.93$ | $n_{d3} = 1.49700$ | $\nu_{d3} = 81.54$ |
| $r_7 = -6.282$ (Aspheric) | $d_7 = 0.00$ | | |
| $r_8 = 6.618$ (Aspheric) | $d_8 = 0.80$ | $n_{d4} = 1.84666$ | $\nu_{d4} = 23.78$ |
| $r_9 = 3.348$ (Aspheric) | $d_9 =$ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 3.17076 \times 10^{-3}$
$A_6 = -1.37514 \times 10^{-4}$
$A_8 = 1.96035 \times 10^{-6}$
$A_{10} = 0$ 2nd surface $K = 0.000$
$A_4 = 3.08247 \times 10^{-3}$
$A_6 = 3.63679 \times 10^{-4}$
$A_8 = -3.34382 \times 10^{-5}$
$A_{10} = 0$ 3rd surface $K = 0.000$
$A_4 = -1.89408 \times 10^{-3}$
$A_6 = 2.05447 \times 10^{-4}$
$A_8 = -6.40061 \times 10^{-6}$
$A_{10} = 0$ 4th surface $K = 0.000$
$A_4 = -2.03988 \times 10^{-3}$
$A_6 = 1.30917 \times 10^{-4}$
$A_8 = -2.56924 \times 10^{-6}$
$A_{10} = 0$ 6th surface $K = 0.000$
$A_4 = -1.61253 \times 10^{-3}$
$A_6 = -7.47302 \times 10^{-5}$
$A_8 = -2.30842 \times 10^{-5}$
$A_{10} = 0$ 7th surface $K = 0.000$
$A_4 = 3.13913 \times 10^{-3}$
$A_6 = -1.53242 \times 10^{-3}$
$A_8 = 1.98597 \times 10^{-4}$
$A_{10} = 0$ 8th surface $K = 0.000$
$A_4 = -1.43433 \times 10^{-2}$
$A_6 = -2.19219 \times 10^{-3}$
$A_8 = 6.46815 \times 10^{-5}$
$A_{10} = 0$ 9th surface $K = 0.000$
$A_4 = -1.54578 \times 10^{-2}$
$A_6 = -1.19883 \times 10^{-3}$
$A_8 = 2.38275 \times 10^{-4}$
$A_{10} = 0$ -continued

| Zooming Data ($\infty$) | | | |
|---|---|---|---|
| | WE | ST | TE |
| f (mm) | 4.38 | 6.08 | 8.45 |
| $F_{NO}$ | 2.84 | 3.28 | 3.84 |
| $2\omega$ (°) | 74.4 | 57.2 | 42.8 |
| $d_4$ | 6.59 | 3.46 | 1.42 |
| $d_9$ | 2.77 | 4.13 | 5.86 |

EXAMPLE 10

| | | | |
|---|---|---|---|
| $r_1 = -31.474$ (Aspheric) | $d_1 = 1.20$ | $n_{d1} = 1.88300$ | $\nu_{d1} = 40.76$ |
| $r_2 = 6.197$ (Aspheric) | $d_2 = 2.48$ | | |
| $r_3 = 10.479$ (Aspheric) | $d_3 = 2.20$ | $n_{d2} = 1.84666$ | $\nu_{d2} = 23.78$ |
| $r_4 = 47.491$ (Aspheric) | $d_4 =$ (Variable) | | |
| $r_5 = \infty$ (Stop) | $d_5 = 0.80$ | | |
| $r_6 = 3.789$ (Aspheric) | $d_6 = 3.61$ | $n_{d3} = 1.49700$ | $\nu_{d3} = 81.54$ |
| $r_7 = -16.623$ (Aspheric) | $d_7 = 0.00$ | | |
| $r_8 = -39.726$ (Aspheric) | $d_8 = 0.80$ | $n_{d4} = 1.84666$ | $\nu_{d4} = 23.78$ |
| $r_9 = 14.332$ (Aspheric) | $d_9 =$ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 9.59521 \times 10^{-4}$
$A_6 = -1.72098 \times 10^{-5}$
$A_8 = 1.13583 \times 10^{-7}$
$A_{10} = 0$ 2nd surface $K = 0.000$
$A_4 = -3.60488 \times 10^{-4}$
$A_6 = 3.77368 \times 10^{-5}$
$A_8 = -1.07135 \times 10^{-6}$
$A_{10} = 0$ 3rd surface $K = 0.000$
$A_4 = -1.01828 \times 10^{-3}$
$A_6 = 1.27783 \times 10^{-5}$
$A_8 = 1.61699 \times 10^{-7}$
$A_{10} = 0$ 4th surface $K = 0.000$
$A_4 = -5.67770 \times 10^{-4}$
$A_6 = 1.51253 \times 10^{-6}$
$A_8 = 1.26398 \times 10^{-7}$
$A_{10} = 0$ 6th surface $K = 0.000$
$A_4 = -8.01515 \times 10^{-4}$
$A_6 = -2.76063 \times 10^{-5}$
$A_8 = -3.86277 \times 10^{-6}$
$A_{10} = 0$ 7th surface $K = 0.000$
$A_4 = 9.05298 \times 10^{-3}$
$A_6 = -1.86656 \times 10^{-3}$
$A_8 = 1.48924 \times 10^{-4}$
$A_{10} = 0$ -continued 8th surface K = 0.000
$A_4 = 9.67002 \times 10^{-3}$
$A_6 = -1.17161 \times 10^{-3}$
$A_8 = 7.64468 \times 10^{-5}$
$A_{10} = 0$ 9th surface K = 0.000
$A_4 = 7.85242 \times 10^{-3}$
$A_6 = 1.15922 \times 10^{-4}$
$A_8 = 3.78215 \times 10^{-5}$
$A_{10} = 0$ Zooming Data (∞)

|  | WE | ST | TE |
|---|---|---|---|
| f (mm) | 4.380 | 7.516 | 12.700 |
| $F_{NO}$ | 2.84 | 3.42 | 4.40 |
| 2ω (°) | 74.4 | 48.0 | 29.4 |
| $d_4$ | 19.85 | 8.42 | 1.91 |
| $d_9$ | 6.61 | 9.22 | 13.52 |

EXAMPLE 11

| $r_1 = -21.847$ (Aspheric) | $d_1 = 1.20$ | $n_{d1} = 1.88300$ | $\nu_{d1} = 40.76$ |
|---|---|---|---|
| $r_2 = 6.937$ (Aspheric) | $d_2 = 2.47$ | | |
| $r_3 = 9.213$ (Aspheric) | $d_3 = 2.21$ | $n_{d2} = 1.84666$ | $\nu_{d2} = 23.78$ |
| $r_4 = 32.046$ (Aspheric) | $d_4 = $ (Variable) | | |
| $r_5 = \infty$ (Stop) | $d_5 = 0.80$ | | |
| $r_6 = 3.998$ (Aspheric) | $d_6 = 3.54$ | $n_{d3} = 1.49700$ | $\nu_{d3} = 81.54$ |
| $r_7 = -21.908$ (Aspheric) | $d_7 = 0.00$ | | |
| $r_8 = -33.149$ (Aspheric) | $d_8 = 0.80$ | $n_{d4} = 1.84666$ | $\nu_{d4} = 23.78$ |
| $r_9 = 17.323$ (Aspheric) | $d_9 = $ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface

K = 0.000
$A_4 = 9.33410 \times 10^{-4}$
$A_6 = -1.30751 \times 10^{-5}$
$A_8 = 6.70483 \times 10^{-8}$
$A_{10} = 0$ 2nd surface K = 0.000
$A_4 = -6.18417 \times 10^{-4}$
$A_6 = 4.10180 \times 10^{-5}$
$A_8 = -7.84432 \times 10^{-7}$
$A_{10} = 0$ 3rd surface K = 0.000
$A_4 = -1.01784 \times 10^{-3}$
$A_6 = 4.66075 \times 10^{-6}$
$A_8 = 1.15224 \times 10^{-7}$
$A_{10} = 0$ 4th surface K = 0.000
$A_4 = -3.78733 \times 10^{-4}$
$A_6 = -7.08997 \times 10^{-6}$
$A_8 = 1.63277 \times 10^{-7}$
$A_{10} = 0$ -continued 6th surface K = 0.000
$A_4 = -8.04530 \times 10^{-4}$
$A_6 = -3.34025 \times 10^{-5}$
$A_8 = -6.46621 \times 10^{-6}$
$A_{10} = 0$ 7th surface K = 0.000
$A_4 = 2.52254 \times 10^{-3}$
$A_6 = -4.58004 \times 10^{-4}$
$A_8 = 3.15723 \times 10^{-5}$
$A_{10} = 0$ 8th surface K = 0.000
$A_4 = 7.40135 \times 10^{-3}$
$A_6 = -3.03505 \times 10^{-4}$
$A_8 = 1.41481 \times 10^{-5}$
$A_{10} = 0$ 9th surface K = 0.000
$A_4 = 8.67706 \times 10^{-3}$
$A_6 = 1.94947 \times 10^{-4}$
$A_8 = 2.90374 \times 10^{-5}$
$A_{10} = 0$ Zooming Data (∞)

|  | WE | ST | TE |
|---|---|---|---|
| f (mm) | 4.380 | 8.500 | 16.900 |
| $F_{NO}$ | 2.84 | 3.57 | 5.07 |
| 2ω (°) | 74.4 | 42.2 | 22.2 |
| $d_4$ | 25.20 | 9.37 | 1.00 |
| $d_9$ | 7.72 | 11.24 | 18.43 |

EXAMPLE 12

| $r_1 = -285.835$ (Aspheric) | $d_1 = 1.20$ | $n_{d1} = 1.88300$ | $\nu_{d1} = 40.76$ |
|---|---|---|---|
| $r_2 = 5.867$ (Aspheric) | $d_2 = 1.82$ | | |
| $r_3 = 8.501$ (Aspheric) | $d_3 = 1.90$ | $n_{d2} = 1.84666$ | $\nu_{d2} = 23.78$ |
| $r_4 = 22.434$ (Aspheric) | $d_4 = $ (Variable) | | |
| $r_5 = \infty$ (Fixed Stop) | $d_5 = -0.85$ | | |
| $r_6 = 4.202$ (Aspheric) | $d_6 = 3.05$ | $n_{d3} = 1.49700$ | $\nu_{d3} = 81.54$ |
| $r_7 = -16.394$ (Aspheric) | $d_7 = 0.10$ | | |
| $r_8 = -59.287$ (Aspheric) | $d_8 = 0.80$ | $n_{d4} = 1.84666$ | $\nu_{d4} = 23.78$ |
| $r_9 = 17.675$ (Aspheric) | $d_9 = 1.20$ | | |
| $r_{10} = \infty$ (Shutter) | $d_{10} = $ (Variable) | | |
| $r_{11} = \infty$ | $d_{11} = 1.44$ | $n_{d5} = 1.54771$ | $\nu_{d5} = 62.84$ |
| $r_{12} = \infty$ | $d_{12} = 0.80$ | | |
| $r_{13} = \infty$ | $d_{13} = 0.80$ | $n_{d6} = 1.51633$ | $\nu_{d6} = 64.14$ |
| $r_{14} = \infty$ | $d_{14} = 1.00$ | | |
| $r_{15} = \infty$ (Image Plane) | | | |

Aspherical Coefficients

1st surface

K = 0.000
$A_4 = 7.70010 \times 10^{-4}$
$A_6 = -1.56894 \times 10^{-5}$
$A_8 = 9.34888 \times 10^{-8}$
$A_{10} = 0$ 2nd surface K = 0.000
$A_4 = -1.15782 \times 10^{-4}$
$A_6 = 5.84590 \times 10^{-5}$
$A_8 = -2.50813 \times 10^{-6}$ -continued $A_{10} = 0$
3rd surface $K = 0.000$
$A_4 = -9.83337 \times 10^{-4}$
$A_6 = 4.53271 \times 10^{-5}$
$A_8 = -5.50922 \times 10^{-7}$
$A_{10} = 0$
4th surface $K = 0.000$
$A_4 = -3.78733 \times 10^{-4}$
$A_6 = -7.08997 \times 10^{-6}$
$A_8 = 1.63277 \times 10^{-7}$
$A_{10} = 0$
6th surface $K = 0.000$
$A_4 = -1.13708 \times 10^{-3}$
$A_6 = -3.62429 \times 10^{-5}$
$A_8 = -1.26007 \times 10^{-5}$
$A_{10} = 0$
7th surface $K = 0.000$
$A_4 = 1.50876 \times 10^{-3}$
$A_6 = -4.75141 \times 10^{-4}$
$A_8 = 2.46413 \times 10^{-5}$
$A_{10} = 0$
8th surface $K = 0.000$
$A_4 = 7.86320 \times 10^{-3}$
$A_6 = -4.05987 \times 10^{-4}$
$A_8 = 2.42457 \times 10^{-5}$
$A_{10} = 0$
9th surface $K = 0.000$
$A_4 = 9.22752 \times 10^{-3}$
$A_6 = 9.75655 \times 10^{-5}$
$A_8 = 3.39493 \times 10^{-5}$
$A_{10} = 0$

| Zooming Data (∞) | | | |
|---|---|---|---|
| | WE | ST | TE |
| f (mm) | 5.484 | 9.438 | 16.500 |
| $F_{NO}$ | 2.84 | 3.53 | 4.76 |
| 2ω (°) | 62.4 | 38.8 | 22.8 |
| $d_4$ | 19.39 | 9.05 | 2.90 |
| $d_{10}$ | 6.84 | 9.90 | 15.36 |

FIGS. 13 to 19 are aberration diagrams of Examples 1-3, 5, 6, 9 and 12 upon focused on an object point at infinity. In these figures, (a), (b) and (c) show spherical aberrations SA, astigmatism AS, distortion DT and chromatic aberration of magnification CC at the wide-angle end, the standard state and the telephoto end, respectively.

Given below are the values of conditions (a) to (l), (n), (1) to (23), (A) and (B) (condition (m) is identical with condition (l)) in the respective examples.

| Cond. | Ex. 1 | Ex. 2 | Ex. 3 | Ex. 4 |
|---|---|---|---|---|
| (a) | 18.762 | 24.567 | 20.150 | 20.543 |
| (b) | 45.072 | 42.740 | 35.805 | 38.958 |
| (c) | 30.532 | 40.320 | 30.314 | 33.650 |
| (d) | 75.604 | 83.060 | 66.119 | 72.608 |
| (e) | 56.340(*) | 50.104 | 60.451 | 66.624 |
| (f) | 158.574 | 149.371 | 194.349 | 239.601 |
| (g) | 41.093 | 41.955 | 35.486 | 36.566 |

-continued

| Cond. | Ex. 1 | Ex. 2 | Ex. 3 | Ex. 4 |
|---|---|---|---|---|
| (h) | 0.825 | 0.811 | 1.019 | 0.983 |
| (i) | 35.487 | 39.265 | 33.765 | 39.996 |
| (j) | 54.558 | 47.469 | 47.382 | 51.017 |
| (k) | 0.621 | 0.717 | 0.743 | 0.704 |
| (l) | −0.586 | −0.382 | −0.303 | −0.102 |
| (n) | 54.68 | 54.68 | 53.21 | 53.21 |

(*): composite focal length of the adjacent negative lens elements (*): composite focal length of the adjacent negative lens elements

| Condition | Ex. 5 | Ex. 6 | Ex. 7 | Ex. 8 |
|---|---|---|---|---|
| (a) | 7.421 | 10.779 | 13.164 | 13.446 |
| (b) | 20.694 | 30.818 | 34.894 | 34.786 |
| (c) | 25.373 | 25.894 | 29.667 | 29.993 |
| (d) | 46.067 | 56.712 | 64.561 | 64.779 |
| (e) | 45.737 | 42.940 | 42.940 | 46.843 |
| (f) | 184.120 | 98.892 | 102.145 | 106.699 |
| (g) | 23.422 | 47.494 | 51.398 | 55.301 |
| (h) | 1.583 | 0.753 | 0.696 | 0.647 |
| (i) | 22.485 | 27.290 | 29.872 | 31.320 |
| (j) | 29.277 | 100.843 | 98.241 | 102.145 |
| (k) | 1.267 | 0.355 | 0.364 | 0.350 |
| (l) | −0.259 | −0.661 | −0.615 | −0.670 |
| (n) | 53.21 | 81.54 | 81.54 | 81.54 |

| Condition | Example 9 | Example 10 | Example 11 | Example 12 |
|---|---|---|---|---|
| (a) | 10.545 | 16.110 | 16.091 | 11.856 |
| (b) | 26.615 | 38.230 | 38.276 | 32.004 |
| (c) | 30.773 | 28.692 | 28.236 | 25.673 |
| (d) | 57.388 | 66.922 | 66.512 | 57.677 |
| (e) | 33.181 | 37.735 | 37.735 | 42.275 |
| (f) | 105.398 | 100.843 | 94.988 | 99.003 |
| (g) | 31.229 | 42.940 | 46.193 | 46.043 |
| (h) | 0.913 | 0.664 | 0.617 | 0.775 |
| (i) | 19.862 | 24.649 | 26.012 | 27.337 |
| (j) | 58.554 | 80.675 | 86.530 | 104.133 |
| (k) | 0.487 | 0.353 | 0.329 | 0.343 |
| (l) | −0.346 | −0.629 | −0.691 | −0.592 |
| (n) | 81.54 | 81.54 | 81.54 | 81.54 |

| Condition | Example 1 | Example 2 | Example 3 | Example 4 |
|---|---|---|---|---|
| (1) | 1.29675 | 0.82115 | 1 | 1 |
| (2) | 0.19174 | 0.15554 | 0.17170 | 0.15467 |
| (3) | 0.90100 | 1.18476 | 0.86112 | 0.93614 |
| (4) | 0.70676 | 0.93333 | 0.70170 | 0.77895 |
| (5) | 1.72916 | 1.72916 | 1.69350 | 1.69350 |
| (6) | −0.26087 | −0.44698 | −0.53493 | −0.81438 |
| (7) | −0.44087 | 0.19452 | 0 | 0 |
| (8) | 0.12920 | −0.09821 | 0 | 0 |
| (9) | 1.12340 | 1.12949 | 1.12997 | 1.00096 |
| (10) | 0 | 0 | — | — |
| (11) | −1.07063 | 0.03429 | — | — |
| (12) | 0.06396 | 0.14680 | — | — |
| (13) | 0.50299 | 0.56783 | 0.30267 | 0.27301 |
| (14) | 0.19810 | 0.00456 | 0.07053 | 0.17643 |
| (15) | 0.55365 | 0.72187 | 0.57242 | 0.57149 |
| (16) | 1.04334 | 0.98935 | 0.82883 | 0.90181 |
| (17) | −0.58847 | −0.01314 | −0.19617 | −0.49095 |
| (18) | −1.46166 | −0.97864 | −1.36946 | −0.98374 |
| (19) | −0.77192 | −0.21272 | −0.81544 | −0.51530 |

-continued

| Condition | Example 1 | Example 2 | Example 3 | Example 4 |
|---|---|---|---|---|
| (20) | 32.51° | 32.40° | 31.53° | 31.00° |
| (21) | 4.50 | 4.50 | 4.50 | 4.50 |
| (22) | 3.10967 | 3.09594 | 2.95925 | 2.89267 |
| (23) | 1.44 | 1.44 | 1.44 | 1.44 |
| (a in μm) | a = 3.0 | a = 3.0 | a = 3.0 | a = 3.0 |
| (A) | — | — | −3.94 | |
| (B) | −0.0163 | −0.031 | | |

| Condition | Example 5 | Example 6 | Example 7 | Example 8 |
|---|---|---|---|---|
| (1) | 1.120 | 2.840 | 2.814 | 3.048 |
| (2) | 0.205 | 0.201 | 0.175 | 0.174 |
| (3) | 0.684 | 0.724 | 0.829 | 0.838 |
| (4) | 0.587 | 0.599 | 0.687 | 0.694 |
| (5) | 1.69350 | 1.49700 | 1.49700 | 1.49700 |
| (6) | −0.589 | −0.204 | −0.238 | −0.198 |
| (7) | −0.098 | −1.524 | −1.445 | −1.996 |
| (8) | 0.057 | 0.479 | 0.476 | 0.506 |
| (9) | 0.984 | 1.543 | 1.381 | 1.283 |
| (10) | *** | *** | *** | *** |
| (11) | *** | *** | *** | *** |
| (12) | *** | *** | *** | *** |
| (13) | 0.219 | 0.258 | 0.342 | 0.391 |
| (14) | −0.467 | 0.007 | −0.069 | −0.091 |
| (15) | 0.200 | 0.301 | 0.368 | 0.376 |
| (16) | 0.482 | 0.713 | 0.808 | 0.805 |
| (17) | 0.768 | −0.017 | 0.171 | 0.256 |
| (18) | −1.511 | −1.705 | −1.497 | −1.727 |
| (19) | −1.194 | −0.789 | −0.530 | −0.683 |
| (20) | 3.02° | 31.1° | 31.1° | 31.1° |
| (21) | 3.86 | 4.67 | 5.53 | 6.02 |
| (22) | 1.842 | 3.000 | 4.000 | 4.836 |
| (23) | 1.44 | 1.44 | 1.44 | 1.44 |
| (a in μm) | a = 3.0 | a = 3.0 | a = 3.0 | a = 3.0 |

| Condition | Example 9 | Example 10 | Example 11 | Example 12 |
|---|---|---|---|---|
| (1) | 3.047 | 0.470 | 0.314 | 0.541 |
| (2) | 0.169 | 0.181 | 0.184 | 0.228 |
| (3) | 1.080 | 1.007 | 0.991 | 0.720 |
| (4) | 0.712 | 0.664 | 0.654 | 0.594 |
| (5) | 1.49700 | 1.49700 | 1.49700 | 1.49700 |
| (6) | −0.486 | −0.228 | −0.182 | −0.256 |
| (7) | −0.949 | 0.419 | 0.661 | 0.277 |
| (8) | 0.506 | −0.361 | −0.523 | −0.298 |
| (9) | 1.097 | 3.783 | 4.333 | 4.207 |
| (10) | *** | *** | *** | *** |
| (11) | *** | *** | *** | *** |
| (12) | *** | *** | *** | *** |
| (13) | 0.170 | 0.217 | 0.264 | 0.291 |
| (14) | 0.061 | −0.139 | −0.200 | −0.019 |
| (15) | 0.370 | 0.565 | 0.565 | 0.332 |
| (16) | 0.616 | 0.885 | 0.886 | 0.741 |
| (17) | −0.109 | 0.382 | 0.592 | 0.046 |
| (18) | −1.336 | −1.147 | −1.403 | −1.556 |
| (19) | −0.848 | −0.253 | −0.403 | −0.590 |
| (20) | 37.2° | 37.2° | 37.2° | 31.2° |
| (21) | 3.84 | 4.4 | 5.86 | 4.76 |
| (22) | 1.929 | 2.900 | 3.858 | 3.000 |
| (23) | 1.44 | 1.44 | 1.44 | 1.44 |
| (a in μm) | a = 3.0 | a = 3.0 | a = 3.0 | a = 3.0 |

It is appreciated that many modifications may be made to the aforesaid examples without departing from the scope of the invention. For instance, the low-pass filter may be formed of one single low-pass filter element.

In each of the aforesaid examples, the third lens group G3 is provided on its image side with a low-pass filter F having a near-infrared sharp cut coat on its entrance surface side. This near-infrared sharp cut coat is designed to have a transmittance of at least 80% at 600 nm wavelength and a transmittance of up to 0.10% at 700 nm wavelength. More specifically, the low-pass filter has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.10 |
| 27th layer | $SiO_2$ | 87.19 | 0.65 |

Figure 20:
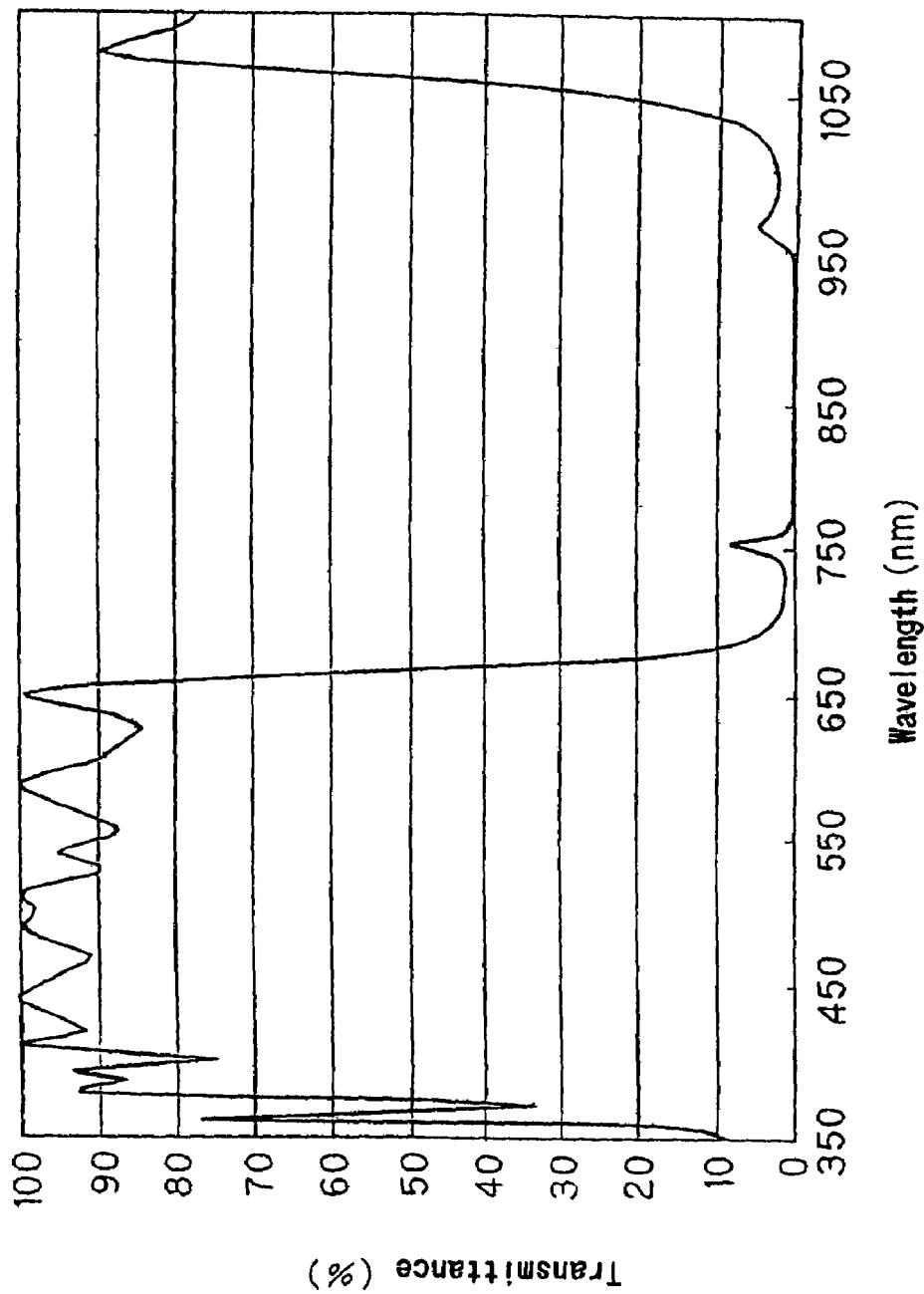
FIG. 20 is a diagram indicative of the transmittance characteristics of one example of the near-infrared sharp cut coat.

The aforesaid near-infrared sharp cut coat has such transmittance characteristics as shown in FIG. 20.

Figure 21:
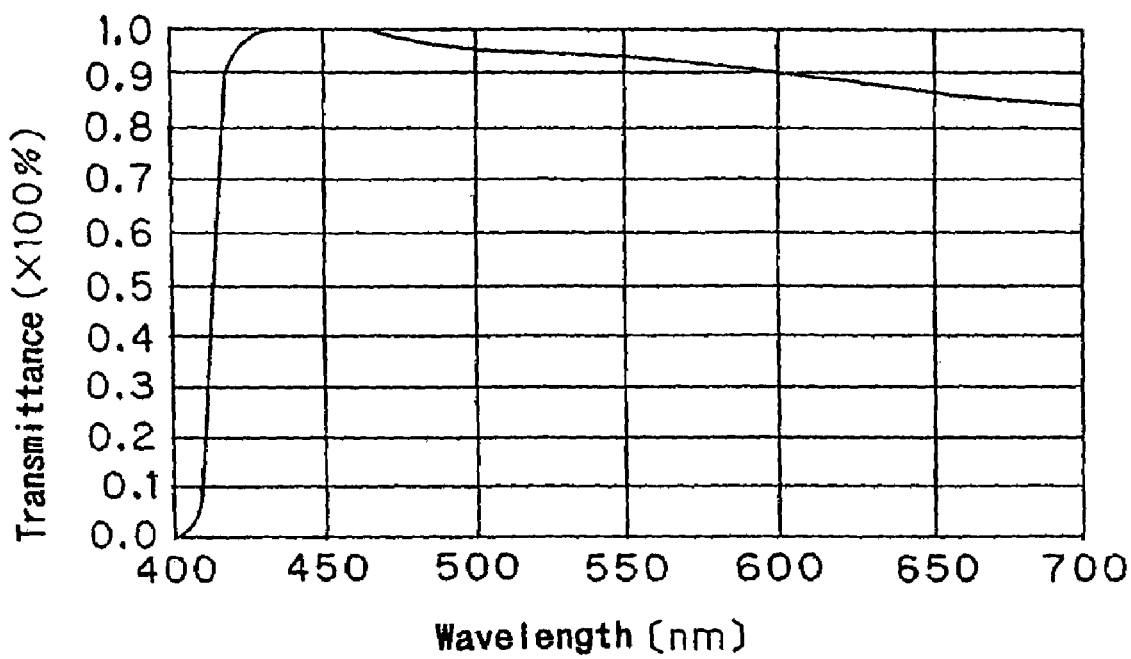
FIG. 21 is a diagram indicative of the transmittance characteristics of one example of the color filter located on the exit surface side of the low-pass filter.

The low-pass filter F is provided on its exit surface side with a color filter or coat for reducing the transmission of colors at such a short wavelength region as shown in FIG. 21.

Preferably, such a filter or coat should be such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. When the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary mosaic filter.

In each of the aforesaid examples, coating is applied in such a way that, as shown in FIG. 21, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter F is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root.

Figure 22:
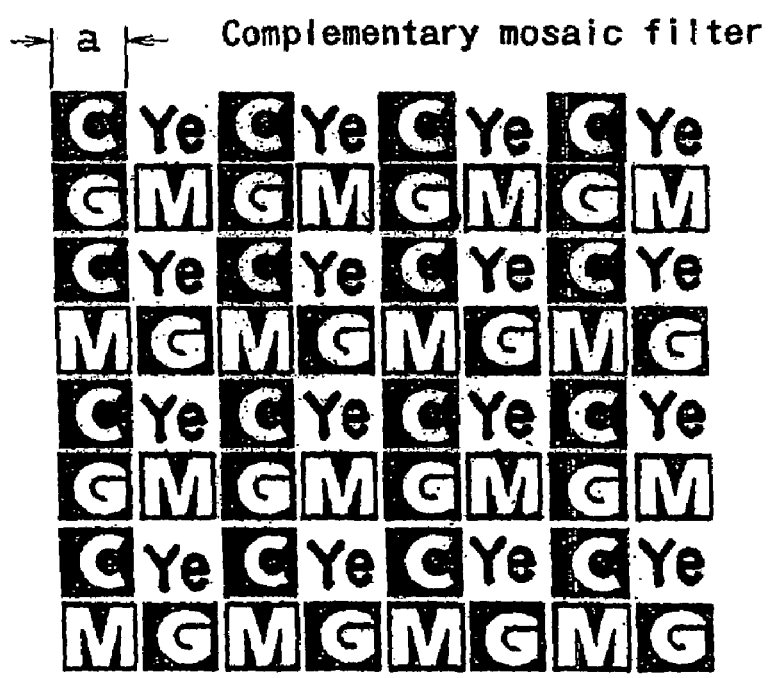
FIG. 22 is a schematic illustrative of how the color filter elements are arranged in the complementary color filter.

The image pickup plane I of a CCD is provided thereon with a complementary mosaic filter wherein, as shown in FIG. 22, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary mosaic filter is composed of at least four different color filter elements that should preferably have such characteristics as given below.

Each green color filter element G has a spectral strength peak at a wavelength $G_P$, each yellow filter element Ye has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P$−$G_P$<35 nm

−100 nm<$C_P$−$G_P$<−5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 23:
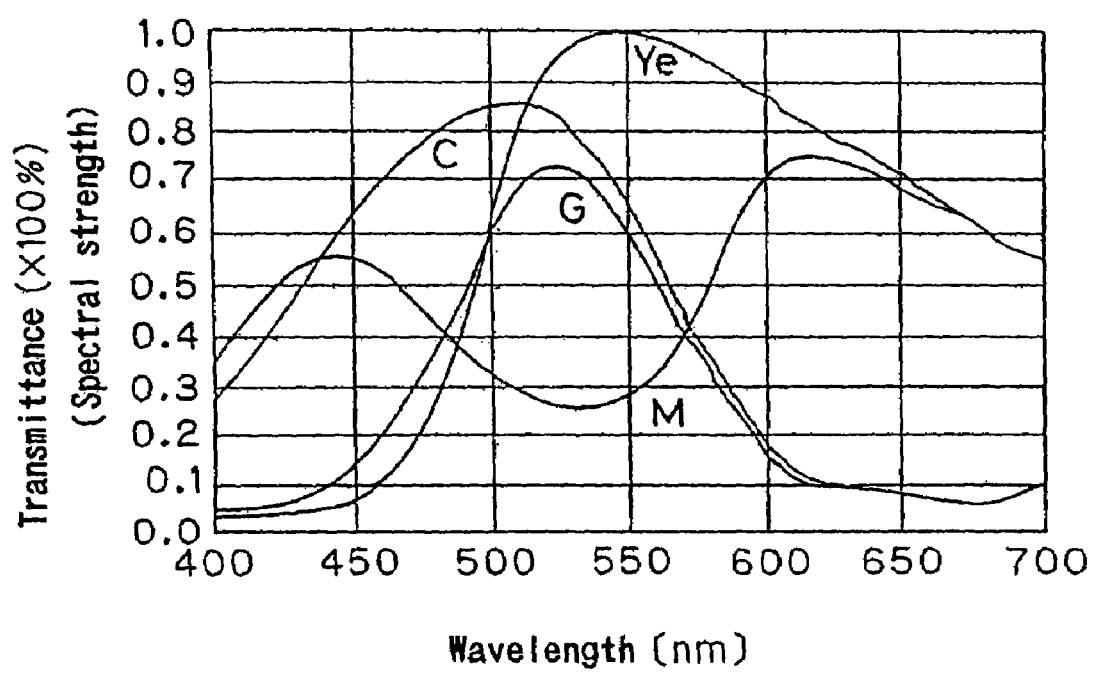
FIG. 23 is a diagram indicative of one example of the wavelength characteristics of the complementary mosaic filter.

One example of the wavelength characteristics in the aforesaid respective examples is shown in FIG. 23. The green filter element G has a spectral strength peak at 525 nm. The yellow filter element Ye has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for Ye, 97% for C and 38% for M.

For such a complementary filter, such signal processing as mentioned below is electrically carried out by means of a controller (not shown) (or a controller used with digital cameras).

For luminance signals, $$Y=|G+M+Ye+C|\times\tfrac{1}{4}$$

For chromatic signals, $$R-Y=|(M+Ye)-(G+C)|$$

$$B-Y=|(M+C)-(G+Ye)|$$

Through this signal processing, the signals from the complementary filter are converted into R (red), G (green) and B (blue) signals.

In this regard, it is noted that the aforesaid near-infrared sharp cut coat may be located anywhere on the optical path, and that the number of low-pass filters F may be either two as mentioned above or one.

Figure 24:
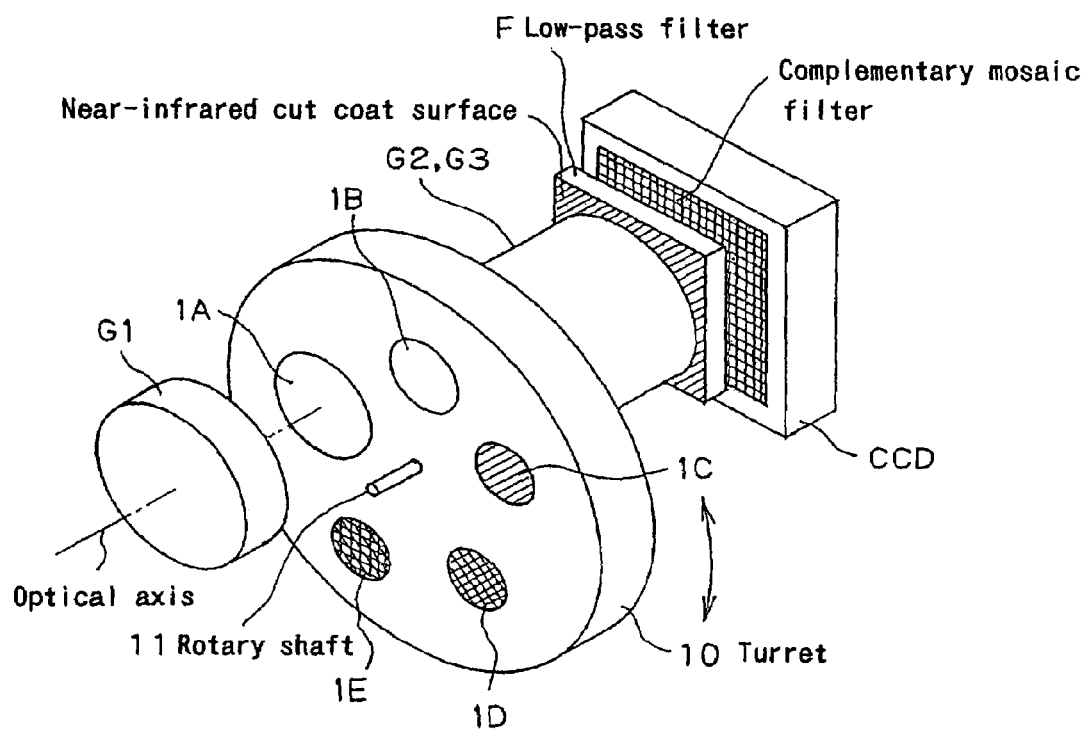
FIG. 24 is a detailed perspective view illustrative of one example of the aperture stop portion in each example.

One typical detailed aperture stop portion in each example is shown in FIG. 24. At the stop position on the optical axis between the first lens group G1 and the second lens group G2 forming part of the image pickup optical system, there is located a turret 10 capable of making five-stage brightness adjustments at 0, −1, −2, −3 and −4 stages. The turret 10 is provided with a 0 stage adjustment opening 1A having a fixed circular aperture shape of about 4 mm in diameter (which has a 550 nm wavelength transmittance of 100%), a −1 stage correction opening 1B having an aperture area about half that of the opening 1A and a fixed aperture shape and comprising a transparent plane-parallel plate (having a 550 nm wavelength transmittance of 99%) and −2, −3, −4 stage correction openings 1C, 1D and 1E provided with ND filters having a 550 nm wavelength transmittance of 50%, 25% and 13%, respectively.

The turret 10 is rotated around its rotating shaft 11 to locate any one of the openings at the stop position for light quantity adjustments.

In the opening, there is also located an ND filter designed to have a 550 nm wavelength transmittance of less than 80% when the effective F-number or $F_{no}'$ is $F_{no}'>a/0.4$ pin. More specifically, it is when the effective F-number at the −2 stage is 9.0 upon stop-in (the 0 stage) that the effective F-number at the telephoto end meets the aforesaid formula. The then opening is 1C, so that any image degradation due to diffraction phenomena by the stop is suppressed.

Figure 25:
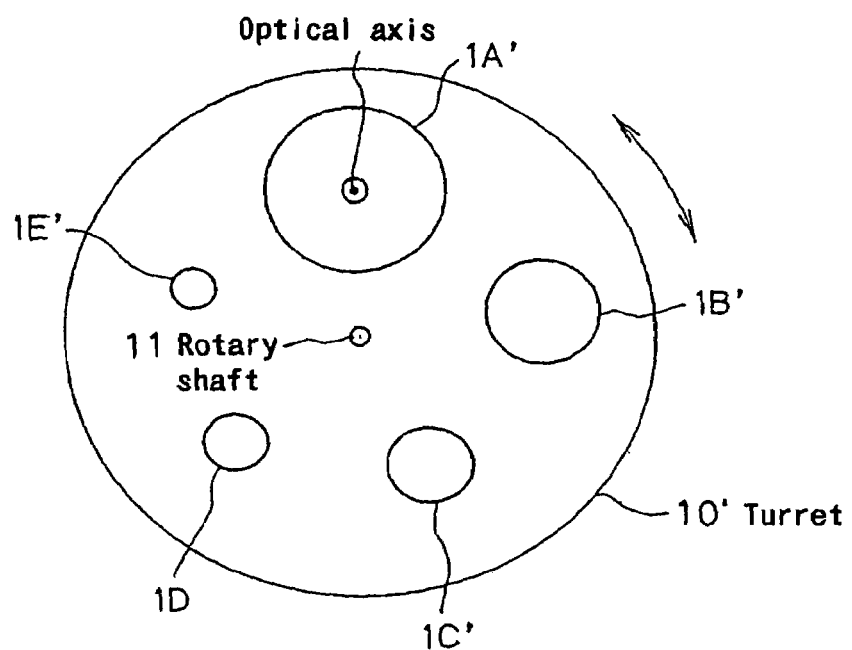
FIGS. 25(a) and 25(b) are illustrative in detail of another example of the aperture stop in each example.
Figure 25:
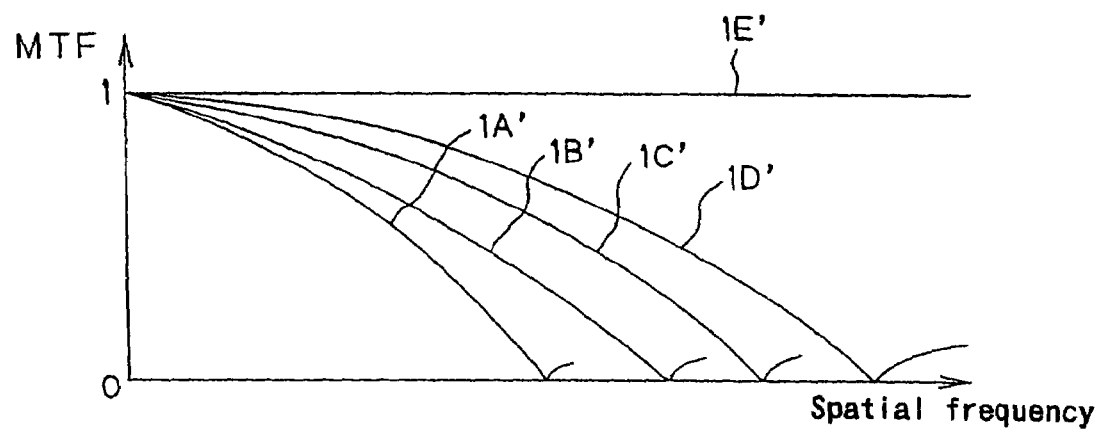

As shown, a turret 10' of FIG. 25(a) may be used in place of the turret of FIG. 24. This turret 10' is capable of making five-stage brightness adjustments at 0, −1, −2, −3 and −4 stages, and located at an aperture stop position on the optical axis between the first lens group G1 and the second lens group G2 forming part of the image pickup optical system. The turret 10' is provided with a 0-stage adjustment opening 1A' having a circular fixed aperture shape of about 4 mm in diameter, a −1 stage correction opening 1B' having an aperture area about half that of the opening 1A' and a fixed aperture shape, and −2, −3 and −4 stage correction openings 1C', 1D' and 1E' having a decreasing area in this order. The turret 10' is rotated around its rotating shaft 11 to locate any one of the openings at the stop position for light quantity adjustments.

A plurality of such openings 1A' to 1D' are each provided with an optical low-pass filter having different spatial frequency characteristics. As shown in FIG. 25(b), the arrangement is such that the smaller the aperture diameter, the higher the spatial frequency characteristics of the optical filter, thereby reducing any image degradation due to diffraction phenomena by stop-down. The respective curves in FIG. 25(b) show the spatial frequency characteristics of the low-pass filters alone. In this regard, it is noted that the characteristics of the openings inclusive of diffractions by the stops are all equally determined.

In an alternative embodiment of the electronic image pickup system of the invention, an aperture stop (fixed stop) of fixed shape and a light quantity control filter or shutter is located in the zoom lens. The shape of the fixed stop should preferably be determined such that when, as already mentioned, the full-aperture F-number at the telephoto end is $$1.5 \times 10^3 \times a/1 \text{ mm} < F$$

with respect to the minimum pixel pitch $a$ (in mm) of the electronic image pickup device, the length of the aperture stop in the vertical or horizontal direction of the image pickup plane is longer than that in the diagonal direction of the image pickup plane.

Figure 26:
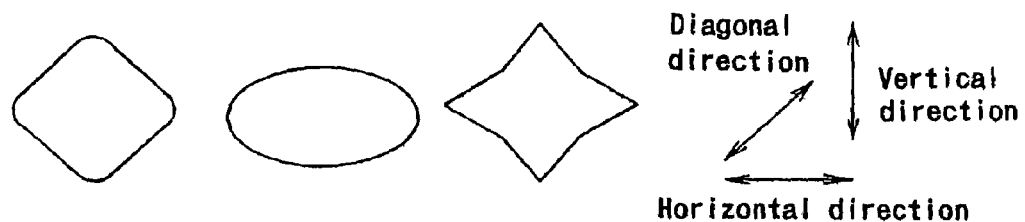
FIGS. 26(a) to 26(c) are illustrative of some possible examples of the fixed stop configuration in the zoom lens comprising a fixed stop and a filter or a shutter according to the invention, wherein the fixed stop is greater than the theoretical limit to the F-number.

By use of any one of such shapes as shown in FIGS. 26(a) to 26(c) as an example, it is possible to lessen the influences of diffractions. For instance, an aperture stop of horizontally oblong shape is preferable to reduce the influences of diffractions in the horizontal direction in particular.

When $1.5 \times 10^3 \times a/1$ mm>F, it is desired that the length of the aperture stop in the vertical or horizontal direction of the image pickup plane be shorter than that in the diagonal direction of the image pickup plane.

Figure 27:
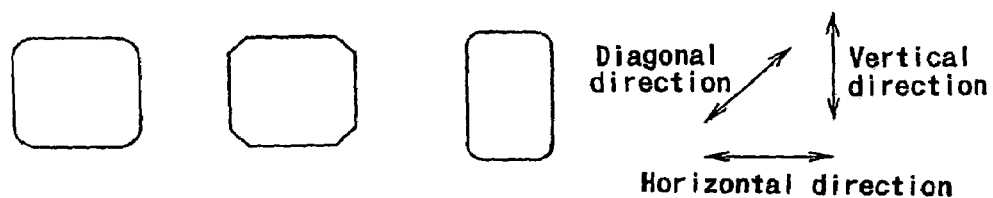
FIGS. 27(a) to 27(c) are illustrative of some possible examples of the fixed stop configuration in the zoom lens comprising a fixed stop and a filter or a shutter according to the invention, wherein the fixed stop is smaller than the theoretical limit to the F-number.
Figure 28:
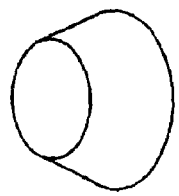
FIG. 28 is illustrative of one example of the funnel type fixed stop.

By use of any one of such shapes as shown in FIGS. 27(a) to 27(c) as an example, it is possible to lessen the influences of geometric optical aberrations. For instance, an aperture stop of longitudinally oblong shape is preferable to reduce the influences of geometric optical aberrations in the horizontal direction in particular.

Figure 31:
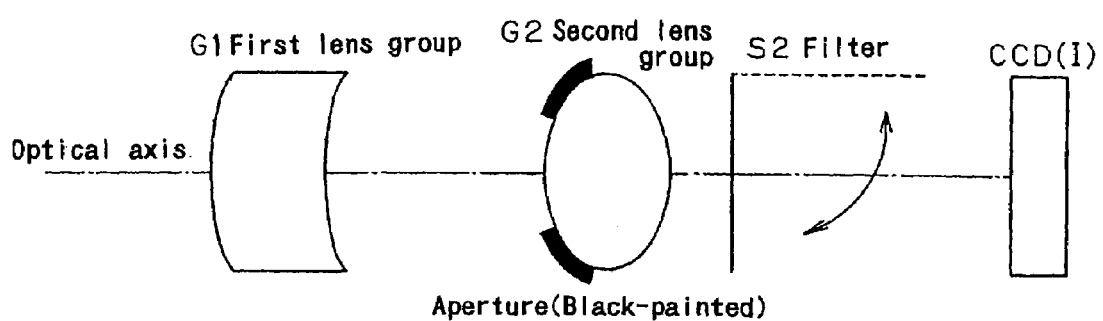
FIG. 31 is illustrative of one example of the filter detachably inserted by rocking movement in the optical axis.

It is here noted that the reason why the spacing between the fixed stop S1 and the next lens surface in Example 12 has a negative value (−0.85) is that the lens surface is positioned with respect to the position of the fixed stop S1 in the direction opposite to the optical axis direction. In this numerical example, the fixed stop is in a flat plate form; however, it is acceptable to use a black-painted lens surface having a circular aperture (see FIG. 31). It is also acceptable to use a convex lens surface covered along its gradient with a funnel-form stop or a stop formed of a lens holding lens barrel.

Figure 29:
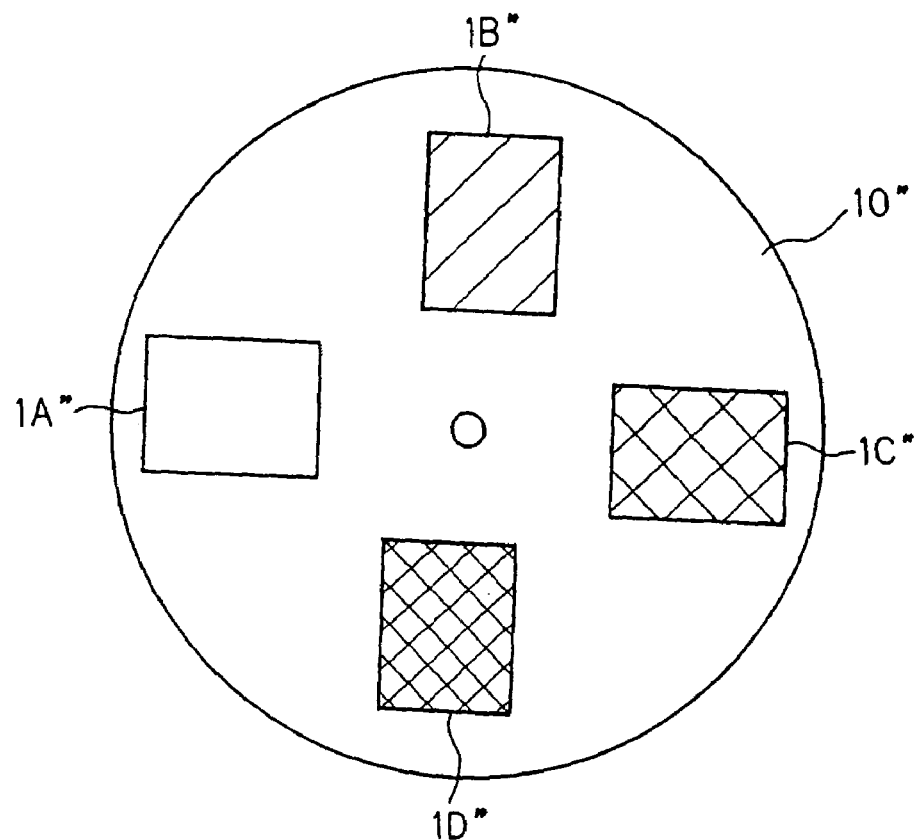
FIG. 29 is illustrative of one turret form of light quantity control filter that is usable in Example 12.

In Example 12, the filter S2 is located with an air separation between it and the image side of the second lens group G2. For light quantity control, a turret 10" or other member is used, which, as shown in FIG. 29, is provided with an opening 1A" formed of a transparent surface or a hollow opening, an opening 1B" formed of an ND filter having a transmittance of ½, an opening 1C" formed of an ND filter having a transmittance of ¼ and an opening 1D" formed of an ND filter having a transmittance of ⅛.

Figure 30:
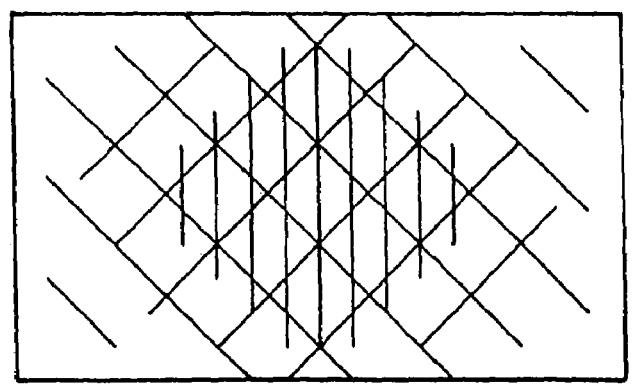
FIG. 30 is illustrative of one example of the filter capable of suppressing light quantity variations.

The filter S2 may also comprise a filter surface capable of making light quantity adjustments thereby reducing light quantity variations. As shown typically in FIG. 30, a filter in which the quantity of light decreases concentrically toward its center may be used to compensate for brightness variations for a bright subject alone while ensuring uniform light transmittance for a dark subject with the quantity of light for its central portion being primarily ensured.

Figure 32:
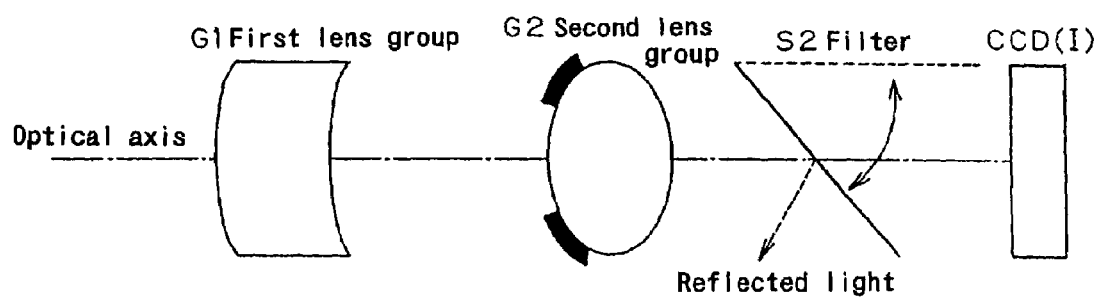
FIG. 32 is illustrative of the rocking detachable insertion structure of the filter capable of reducing ghosts due to reflected light.

As shown schematically in FIG. 32, the filter S2 may configured in such a way that it can be inserted into or removed from the optical path by rocking movement. In Example 12 in particular, the rocking mechanism can be located in a space allowed after the second lens group G2 or, if any, the subsequent lens group.

As shown schematically in FIG. 32, the light quantity control filter S2 may be tilted with respect to the optical axis for the purpose of reducing ghosts due to light reflected from the ND filter. If, in this case, the filter S2 is designed to rock, it is then possible to make the angle of rocking movement so acute that faster phototaking operations can be achieved.

In the present invention, the light quantity control filter S2 may be made up of two polarizing filters that enable the quantity of light to be controlled by changing the direction of polarization. Instead of or in addition to the filter, a shutter may be used. To this end, various shutters such as a focal plane shutter using a moving film located in the vicinity of the image plane, a two-feather lens shutter located somewhere on the optical path, a focal plane shutter and a liquid crystal shutter may be used.

Figure 33:
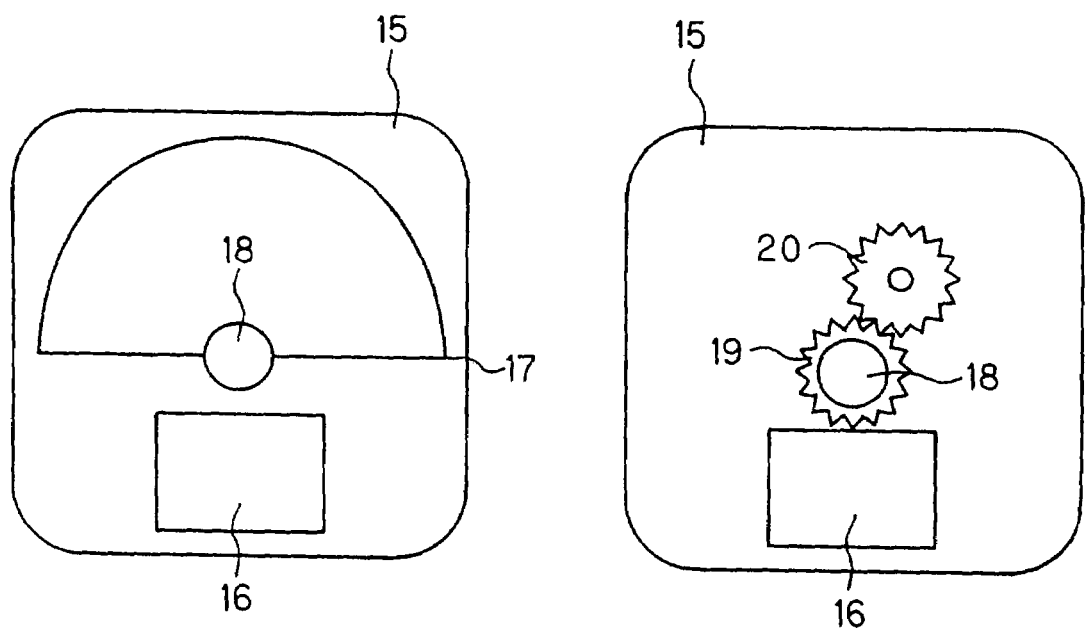
FIG. 33 is illustrative of the back and front sides of one example of the rotary focal plane shutter.
Figure 34A:
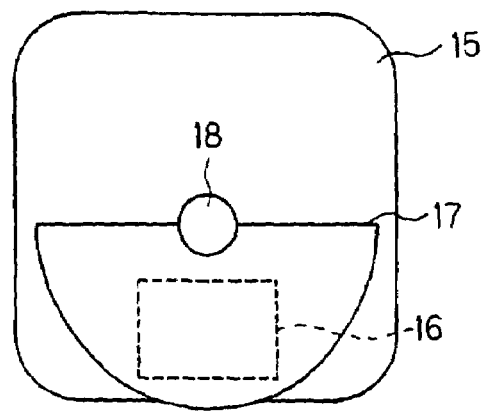
FIGS. 34(a) to 34(d) is illustrative of how the rotary shutter screen of the shutter is rotated.
Figure 34B:
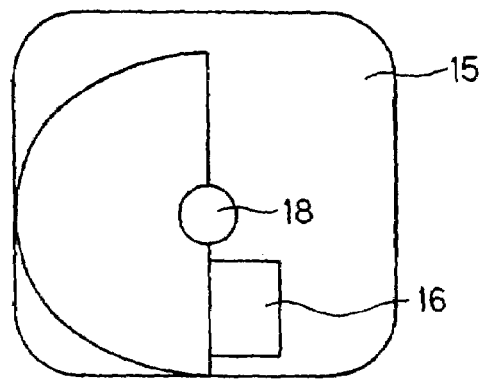
Figure 34C:
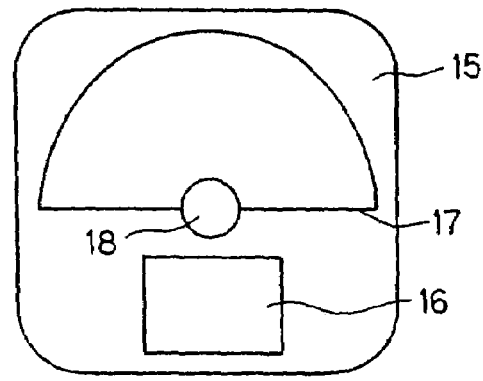
Figure 34D:
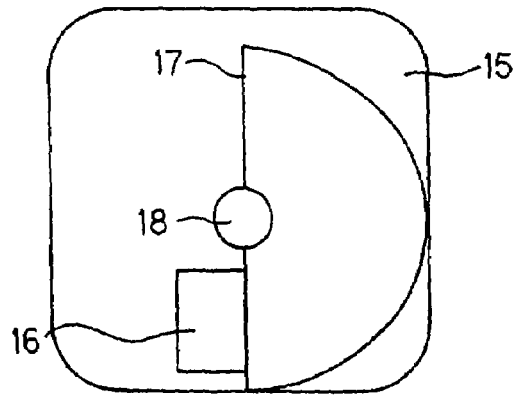

Shown in FIG. 33 is one exemplary shutter, i.e., a rotary focal plane shutter that is one of focal plane shutters. FIGS. 33(a) and 33(b) are a rear view and a front view of that rotary focal plane shutter, respectively. Reference numeral 15 is a shutter base that is located just before an image plane or at any desired position on an optical path. The base 15 is provided with an opening 16 through which an effective light beam from an optical system passes. Numeral 17 is a rotary shutter film. Numeral 18 is a rotary shaft for the rotary shutter film 17, which is rotated with respect to the base 15, and made integral with the rotary shutter film 17. The rotary shaft 18 is connected to gears 19 and 20 on the surface of the base 15, which gears are in turn joined to a motor (not shown).

In this arrangement, as the motor (not shown) is driven, the rotary shutter film 17 is rotated around the rotary shaft 18 via the gears 19, 20 and the rotary shaft 18.

This rotary shaft film 17 substantially in a semi-circular form is rotated to shield the opening 16 in the base 15 and come off the same; it plays a shutter role. The shutter speed may be adjusted by changing the speed of rotation of the rotary shutter film 17.

FIGS. 34(a) to 34(d) are illustrative of how the rotary shutter film 17 rotates as viewed from the image plane side. The rotary shutter film 17 rotates in time sequence of (a), (b), (c), (d) and (a).

By locating the aperture stop of fixed shape and the light quantity control filter or shutter at different positions in the zoom lens as described above, it is possible to adjust the quantity of light by means of the filter or shutter while the influences of diffractions are minimized thereby keeping image quality, and to achieve an electronic image pickup system with which the whole length of the associated zoom lens can be shortened, too.

The electronic image pickup system constructed as described above may be applied to phototaking systems where object images formed through zoom lenses are received at image pickup devices such as CCDs or silver salt films, especially, digital cameras or video cameras as well as PCs and telephone sets which are typical information processors, in particular, easy-to-carry cellular phones. Given below are some such embodiments.

Figure 35:
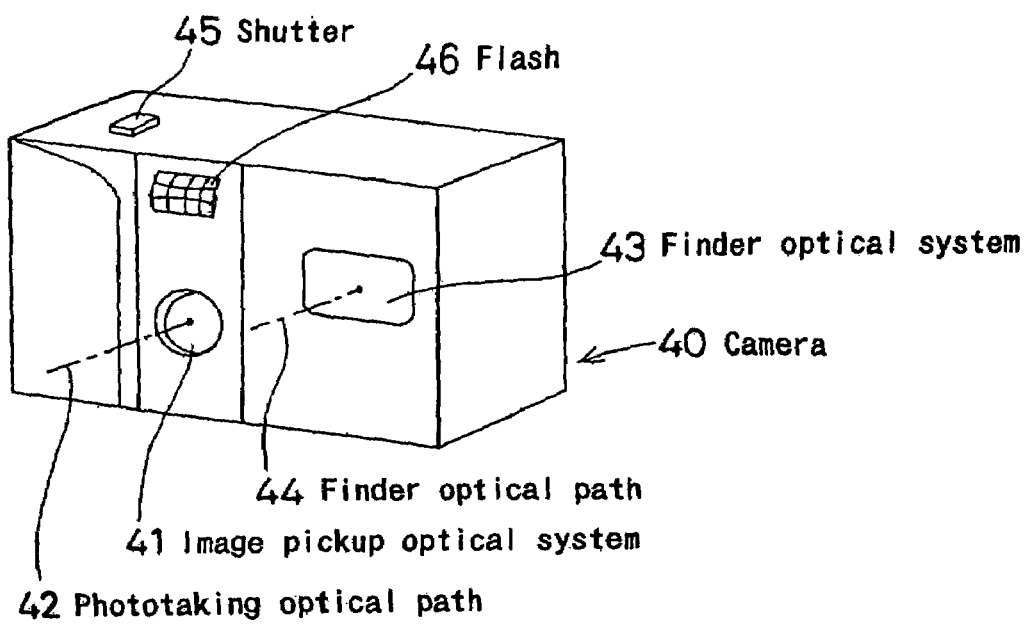
FIG. 35 is a front perspective schematic illustrative of the outside shape of a digital camera with the inventive zoom lens built therein.
Figure 36:
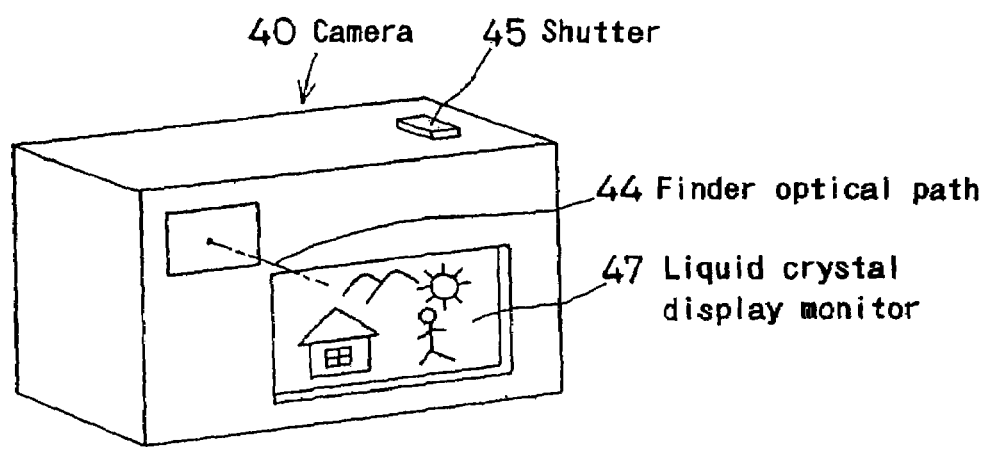
FIG. 36 is a rear perspective schematic of the digital camera of FIG. 35.
Figure 37:
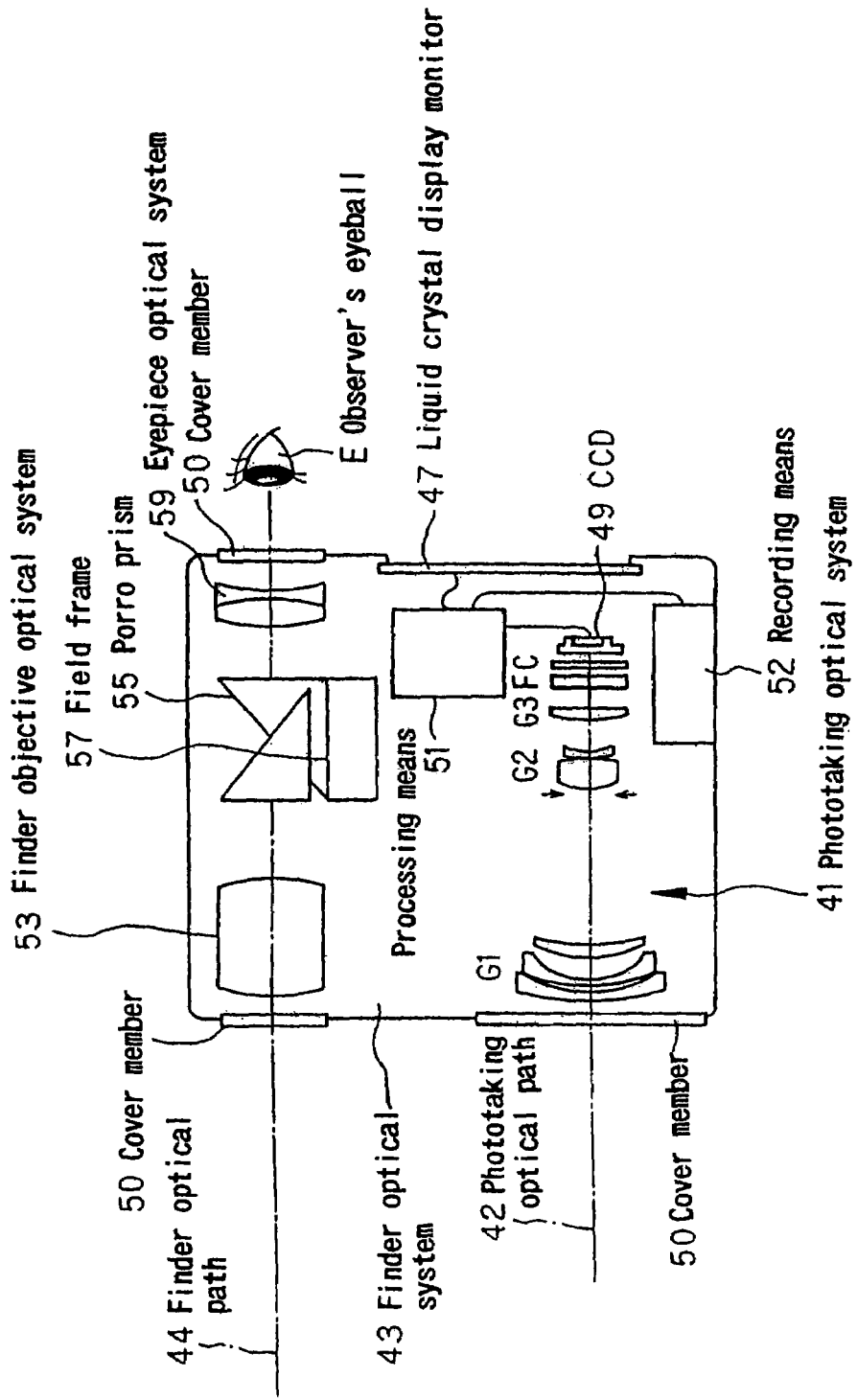
FIG. 37 is a sectional schematic of the digital camera of FIG. 35.

FIGS. 35 to 37 are conceptual illustrations of a phototaking optical system 41 for digital cameras, in which the zoom lens of the invention is incorporated. FIG. 35 is a front perspective view of the outside shape of a digital camera 40, and FIG. 34 is a rear perspective view of the same. FIG. 37 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an optical low-pass filter F provided thereon with a near-infrared cut coat. The object image received at CCD 49 is displayed as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver salt camera using a silver salt camera in place of CCD 49.

Moreover, a finder objective optical system 53 is located on the finder optical path 44. An object image formed by the finder objective optical path 53 is in turn formed on the field frame 54 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 37, plane-parallel plates are used as the cover members 50; however, it is acceptable to use powered lenses.

Figure 38:
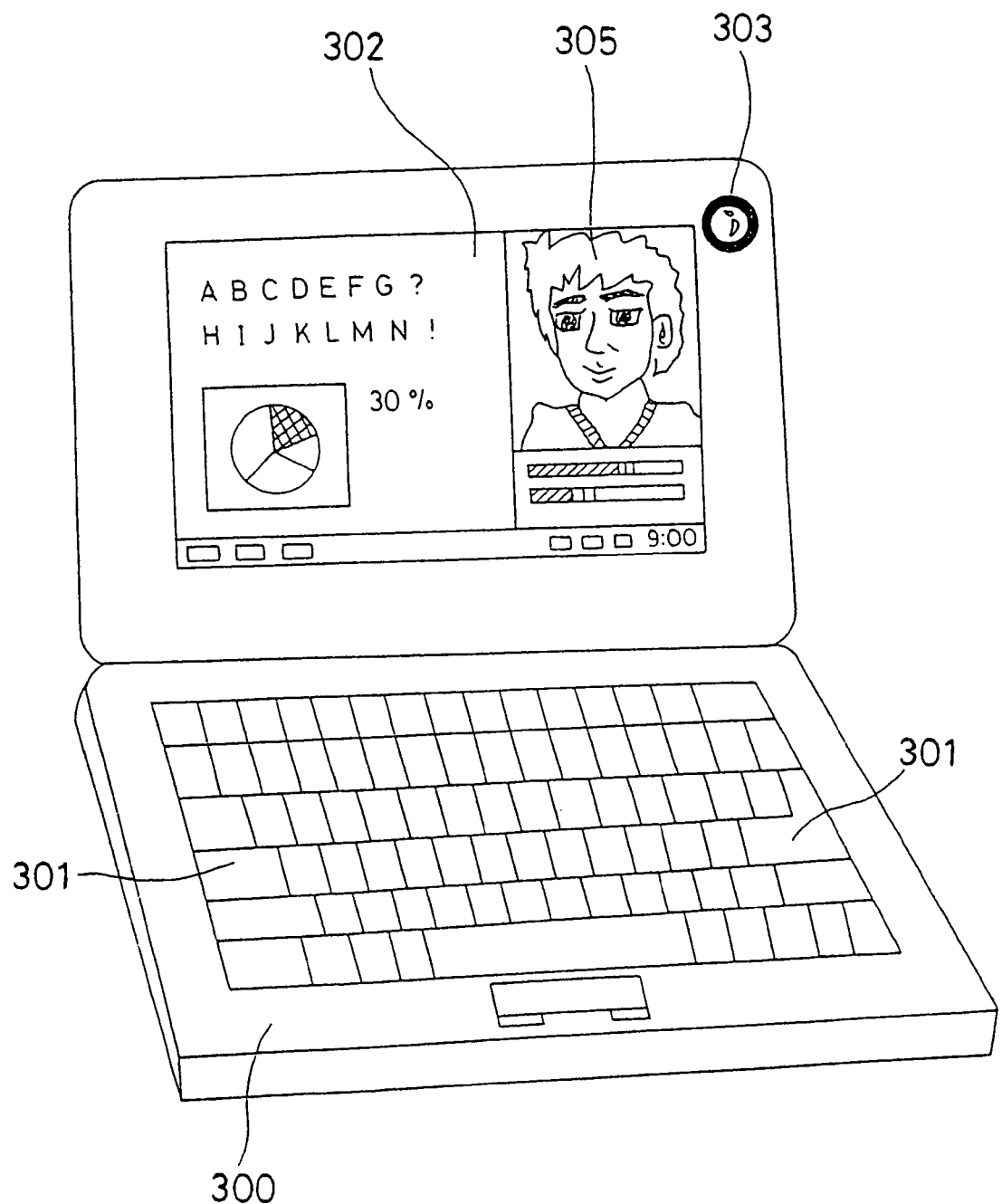
FIG. 38 is a front perspective view of an uncovered personal computer in which the inventive zoom lens is built in the form of an objective optical system.
Figure 39:
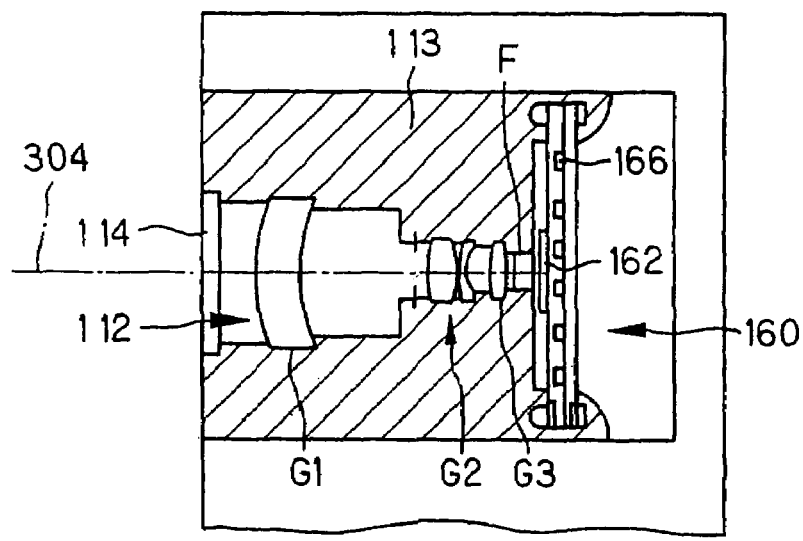
FIG. 39 is a sectional schematic of a phototaking optical system for a personal computer.
Figure 40:
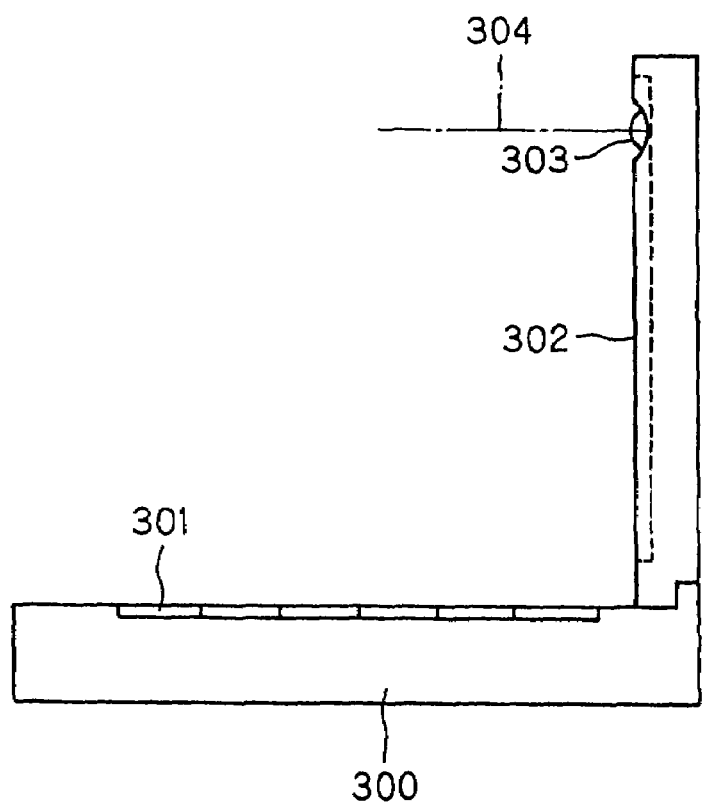
FIG. 40 is a side view of FIG. 38.

FIGS. 38 to 40 illustrates a personal computer that is one embodiment of information processors in which the zoom lens of the invention is built in the form of an objective optical system. FIG. 38 is a front perspective view of a personal computer or PC 300 in an uncovered state, FIG. 39 is a sectional view of a phototaking optical system 303 in PC 300, and FIG. 40 is a side view of FIG. 38. As shown in FIGS. 38 to 40, PC 300 comprises a keyboard 301 for allowing an operator to enter information therein from outside, information processing and recording means (not illustrated), a monitor 302 for displaying the information to the operator, and a phototaking optical system 303 for phototaking an image of the operator per se and nearby images. The monitor 302 used herein may be a transmission type liquid crystal display illuminated from its back side by means of a backlight (not shown), a reflection type liquid crystal display designed to reflect light from its front side for display purposes, a CRT display or the like. As shown, the phototaking optical system 303 is built in the right upper portion of the monitor 302; however, it may be located at any desired position, for instance, around the monitor 302 or the keyboard 301.

This phototaking optical system 303 comprises an objective lens 112 mounted on a phototaking optical path 304 and formed of the zoom lens of the invention (roughly shown) and an image pickup chip 162 for receiving images, which are built in PC 300.

In this embodiment, a low-pass filter F is additionally applied onto the image pickup chip 162 to form a one-piece unit 160 that can be mounted at the rear end of the lens barrel 113 of the objective lens 112 in one-touch snap operation. Thus, any centering or inter-surface adjustment for the objective lens 112 and image pickup chip 162 can be dispensed with, and so smooth assembly is achieved. Further, the lens barrel 113 is provided at the other end with a cover glass 114 for protection of the objective lens 112. It is here noted that the zoom lens drive mechanism in the lens barrel 113 is not shown.

An object image received at the image pickup chip 162 is entered into the processing means of PC 300 via a terminal 166 and displayed as an electronic image on the monitor 302. As an example, an image 305 phototaken of the operator is shown in FIG. 38. The image 305 may be displayed on a personal computer on the other end of the line by way of processing means and the Internet or a telephone.

FIG. 41 is illustrative of a telephone set, especially a convenient-to-carry cellular phone that is one exemplary information processor in which the zoom lens of the invention is built as a phototaking optical system. FIGS. 41(a) and 41(b) are a front view and a side view of a cellular phone 400, and FIG. 41(c) is a sectional view of a phototaking optical system 405. As shown, the cellular phone 400 comprises a microphone 401 through which the voice of an operator is entered as information, a speaker 402 through which the voice of a person on the other end of the like is produced, an input dial 403 through which the information is entered by the operator, a monitor 404 for displaying images phototaken of the operator per se, the person on the other end of the line and so on as well as information such as telephone numbers, a phototaking optical system 405, an antenna 406 for transmission and reception of radio waves for communications, and processing means (not shown) for processing image information, communications information, input signals, etc. Here a liquid crystal display is used for the monitor 404. How the respective devices are arranged is not particularly limited to the arrangement shown in FIG. 41. This phototaking optical system 405 comprises an objective lens 112 mounted on a phototaking optical path 407 and formed of the zoom lens of the invention (roughly shown) and an image pickup chip 162 for receiving object images, which are built in the cellular phone 400.

In this embodiment, a low-pass filter F is additionally applied onto the image pickup chip 162 to form a one-piece unit 160 that can be mounted at the rear end of the lens barrel 113 of the objective lens 112 in one-touch snap operation. Thus, any centering or inter-surface adjustment for the objective lens 112 and image pickup chip 162 can be dispensed with, and so smooth assembly is achieved. Further, the lens barrel 113 is provided at the other end with a cover glass 114 for protection of the objective lens 112. It is here noted that the zoom lens drive mechanism in the lens barrel 113 is not shown.

An object image received at the image pickup device 162 is entered into processing means (not shown) via a terminal 166, so that the image is displayed as an electronic image on the monitor 404 and/or a monitor on the other end of the line. To transmit the image to the person on the other end, the signal processing means has a signal processing function of converting information on the object image received at the image pickup chip 162 to transmittable signals.

As can be appreciated from the foregoing explanation, the present invention can provide a zoom lens that is received in a lens mount with smaller thickness and efficiency, has high magnifications and is excellent in image-formation capability even on rear focusing, and enables video cameras or digital cameras to be thoroughly slimmed down.

What is claimed is:

1. An electronic image pickup system comprising:
   a zoom lens and an electronic image pickup device located on an image plane side of said zoom lens, wherein said zoom lens comprises a plurality of lens groups in which a spacing between adjacent lens groups is varied to change a focal length and an aperture stop located in an optical path to limit a diameter of an axial light beam, wherein:

said aperture stop is of fixed stop shape, and a shutter is located on an optical axis in a space at a position different from that of a space where said aperture stop is located, said zoom lens comprises, at least, a lens group having negative refracting power and a lens group located just after an image side thereof and having positive refracting power, a spacing between said lens group having negative refracting power and said lens group having positive refracting power is narrower at a telephoto end than at a wide-angle end, said aperture stop is located between the surface located nearest to an image plane side of said lens group having negative refracting power and the surface located nearest to an image plane side of said lens group having positive refracting power, and said shutter is located nearer to the image plane side rather than to said aperture stop, said shutter is located in an air separation just after said lens group having positive refracting power, and said system constantly satisfies the following condition (26):

$$0.01 < \alpha'/\beta' < 1.0 \tag{26}$$

where $\alpha'$ is an axial distance from said aperture stop to said shutter located nearer to an image side, and $\beta'$ is an axial distance from said shutter to an image pickup plane of said electronic image pickup device.

2. An electronic image pickup system comprising:

a zoom lens and an electronic image pickup device located on an image plane side of said zoom lens, wherein said zoom lens comprises a plurality of lens groups in which a spacing between adjacent lens groups is varied to change a focal length and an aperture stop located in an optical path to limit a diameter of an axial light beam, wherein:

said aperture stop is of fixed stop shape, and a shutter is located on an optical axis in a space at a position different from that of a space where said aperture stop is located, and said system satisfies the following condition (27):

$$0.5 < \phi\beta'/\phi_\alpha < 1.5 \tag{27}$$

where $\phi_\alpha$ is the maximum aperture diameter of said aperture stop, and $\phi\beta'$ is the maximum effective length (diagonal length) of said shutter.

3. The electronic image pickup system according to claim 1 or 2, wherein said aperture stop is positioned between adjacent lens groups with a variable air separation therebetween upon zooming or focusing, and said shutter is located at a position different from that of said air separation.

4. The electronic image pickup system according to claim 1 or 2, wherein a position where a perpendicular coming down from said aperture stop towards an optical axis intersects said optical axis is found in a lens medium in the lens groups.

5. The electronic image pickup system according to claim 4, wherein said aperture stop is located contiguously to any one of lens surfaces in said lens groups.

6. The electronic image pickup system according to claim 1 or 2, wherein said aperture stop is defined by an aperture plate open on an optical axis side.

7. The electronic image pickup system according to claim 1 or 2, wherein said negative lens group is located nearest to the object side.

8. The electronic image pickup system according to claim 1 or 2, wherein said zoom lens comprises, in order from an object side thereof, said lens group having negative refracting power and said lens group having positive refracting power, and lens groups movable for zooming are defined by two lens groups alone or said lens group having negative refracting power and said lens group having positive refracting power.

9. The electronic image pickup system according to claim 1 or 2, wherein said zoom lens consists of two lens groups alone or, in order from an object side thereof, said lens group having negative refracting power and said lens group having positive refracting power.

10. The electronic image pickup system according to claim 1 or 2, wherein said aperture stop is located in an air separation just before said lens group having positive refracting power.

11. The electronic image pickup system according to claim 1 or 2, wherein said aperture stop is located in a variable spacing, both lens surfaces located just before and just after said aperture stop are concave on an image side, and said aperture stop has a funnel-form outer shape in which its inclination with respect to the image side becomes sharper off and off an optical axis.

* * * * *